United States Patent
Berkovich et al.

(10) Patent No.: US 12,141,888 B1
(45) Date of Patent: Nov. 12, 2024

(54) DYNAMIC AND HIERARCHICAL IMAGE SENSING AND PROCESSING

(71) Applicant: Meta Platforms Technologies, LLC, Menlo Park, CA (US)

(72) Inventors: Andrew Samuel Berkovich, Bellevue, WA (US); Allie Del Giorno, Menlo Park, CA (US)

(73) Assignee: Meta Platforms Technologies, LLC, Menlo Park, CA (US)

(*) Notice: Subject to any disclaimer, the term of this patent is extended or adjusted under 35 U.S.C. 154(b) by 0 days.

(21) Appl. No.: 17/127,670

(22) Filed: Dec. 18, 2020

Related U.S. Application Data

(60) Provisional application No. 62/949,694, filed on Dec. 18, 2019.

(51) Int. Cl.
*G06T 1/20* (2006.01)
*G06T 3/40* (2006.01)
(Continued)

(52) U.S. Cl.
CPC .............. *G06T 1/20* (2013.01); *G06T 3/4053* (2013.01); *G06T 7/55* (2017.01)

(58) Field of Classification Search
CPC ............ G06T 1/20; G06T 3/4053; G06T 7/55
(Continued)

(56) References Cited

U.S. PATENT DOCUMENTS 6,384,905 B1 5/2002 Barrows
7,362,355 B1 4/2008 Yang et al.
(Continued)

FOREIGN PATENT DOCUMENTS

CN 103207716 A 7/2013
CN 103907133 A 7/2014
(Continued)

OTHER PUBLICATIONS

Amir M.F., et al., "3-D Stacked Image Sensor With Deep Neural Network Computation," IEEE Sensors Journal, IEEE Service Center, New York, NY, US, May 15, 2018, vol. 18 (10), pp. 4187-4199, XP011681876.
(Continued)

*Primary Examiner* — James A Thompson
*Assistant Examiner* — Kim T Tran
(74) *Attorney, Agent, or Firm* — Kilpatrick Townsend & Stockton LLP

(57) ABSTRACT

In one example, an apparatus is provided. The apparatus is part of a mobile device and comprises: an array of pixel cells each configured to perform an image sensing operation, one or more attributes of the image sensing operation being configurable based on an image sensing configuration; a sensor data processor configured to execute a hierarchical set of processing operations; and a controller configured to: receive, from the sensor data processor, a first-level processing output from a first-level processing operation of the hierarchical set of processing operations; and based on the first-level processing output satisfying a condition, control the sensor data processor to execute a second-level processing operation on at least one image frame captured by the array of pixel cells to generate a second-level processing output.

18 Claims, 27 Drawing Sheets

(51) Int. Cl.
*G06T 3/4053* (2024.01)
*G06T 7/55* (2017.01)

(58) Field of Classification Search
USPC ........................................................ 345/522
See application file for complete search history.

(56) References Cited

U.S. PATENT DOCUMENTS

| | | |
|---|---|---|
| 7,659,925 B2 | 2/2010 | Krymski |
| 7,956,914 B2 | 6/2011 | Xu |
| 8,134,623 B2 | 3/2012 | Purcell et al. |
| 8,441,535 B2 | 5/2013 | Morin |
| 8,675,110 B2 | 3/2014 | Hirai et al. |
| 8,779,346 B2 | 7/2014 | Fowler et al. |
| 9,094,629 B2 | 7/2015 | Ishibashi |
| 9,210,330 B2 | 12/2015 | Seo |
| 9,282,264 B2 | 3/2016 | Park et al. |
| 9,363,454 B2 | 6/2016 | Ito et al. |
| 9,560,296 B2 | 1/2017 | Hseih et al. |
| 9,723,233 B2 | 8/2017 | Grauer et al. |
| 9,743,024 B2 | 8/2017 | Tyrrell et al. |
| 9,826,175 B2 | 11/2017 | Isobe |
| 9,832,370 B2 | 11/2017 | Cho et al. |
| 9,912,885 B2 | 3/2018 | Isobe |
| 9,955,091 B1 | 4/2018 | Dai et al. |
| 10,090,342 B1 | 10/2018 | Gambino et al. |
| 10,096,631 B2 | 10/2018 | Ishizu |
| 10,154,221 B2 | 12/2018 | Ogino et al. |
| 10,157,951 B2 | 12/2018 | Kim et al. |
| 10,321,081 B2 | 6/2019 | Watanabe et al. |
| 10,345,447 B1 | 7/2019 | Hicks |
| 10,419,701 B2 | 9/2019 | Liu |
| 10,484,628 B2 | 11/2019 | Zhang et al. |
| 10,594,974 B2 | 3/2020 | Ivarsson et al. |
| 10,715,824 B2 | 7/2020 | Tall et al. |
| 10,726,627 B2 | 7/2020 | Liu |
| 10,897,586 B2 | 1/2021 | Liu et al. |
| 10,915,995 B2 | 2/2021 | Moloney |
| 10,939,062 B2 | 3/2021 | Ogawa et al. |
| 10,984,235 B2 | 4/2021 | Gousev et al. |
| 10,999,539 B2 | 5/2021 | Wendel et al. |
| 11,057,581 B2 | 7/2021 | Liu |
| 11,315,330 B1 | 4/2022 | Liu |
| 11,825,228 B2 | 11/2023 | Berkovich et al. |
| 11,888,002 B2 | 1/2024 | Berkovich et al. |
| 11,935,291 B2 | 3/2024 | Berkovich et al. |
| 11,948,089 B2 | 4/2024 | Berkovich et al. |
| 11,960,638 B2 | 4/2024 | Berkovich et al. |
| 11,962,928 B2 | 4/2024 | Reyserhove et al. |
| 2002/0113886 A1 | 8/2002 | Hynecek |
| 2003/0020100 A1 | 1/2003 | Guidash |
| 2005/0057389 A1 | 3/2005 | Krymski |
| 2005/0237380 A1* | 10/2005 | Kakii ................. H04N 7/147 375/240.24 |
| 2007/0076109 A1 | 4/2007 | Krymski |
| 2007/0222881 A1 | 9/2007 | Mentzer |
| 2008/0007731 A1 | 1/2008 | Botchway et al. |
| 2008/0226170 A1 | 9/2008 | Sonoda |
| 2009/0033588 A1 | 2/2009 | Kajita et al. |
| 2009/0245637 A1 | 10/2009 | Barman et al. |
| 2010/0194956 A1 | 8/2010 | Yuan et al. |
| 2010/0276572 A1 | 11/2010 | Iwabuchi et al. |
| 2011/0155892 A1 | 6/2011 | Neter et al. |
| 2011/0254986 A1 | 10/2011 | Nishimura et al. |
| 2012/0044399 A1 | 2/2012 | Hirai et al. |
| 2012/0105475 A1* | 5/2012 | Tseng ................. G01C 21/3632 345/633 |
| 2012/0105668 A1 | 5/2012 | Velarde et al. |
| 2012/0113119 A1 | 5/2012 | Massie |
| 2012/0133807 A1 | 5/2012 | Wu et al. |
| 2012/0200499 A1 | 8/2012 | Osterhout et al. |
| 2012/0212465 A1 | 8/2012 | White et al. |
| 2012/0262616 A1 | 10/2012 | Sa et al. |
| 2013/0056809 A1 | 3/2013 | Mao et al. |
| 2013/0057742 A1 | 3/2013 | Nakamura et al. |
| 2013/0068929 A1 | 3/2013 | Solhusvik et al. |
| 2013/0069787 A1 | 3/2013 | Petrou |
| 2013/0141619 A1 | 6/2013 | Lim et al. |
| 2013/0187027 A1 | 7/2013 | Qiao et al. |
| 2013/0207219 A1 | 8/2013 | Ahn |
| 2013/0215290 A1 | 8/2013 | Solhusvik et al. |
| 2013/0293753 A1 | 11/2013 | Keelan et al. |
| 2013/0299674 A1 | 11/2013 | Fowler et al. |
| 2014/0042299 A1 | 2/2014 | Wan et al. |
| 2014/0063250 A1 | 3/2014 | Park |
| 2014/0247382 A1 | 9/2014 | Moldovan et al. |
| 2014/0368687 A1 | 12/2014 | Yu et al. |
| 2015/0085134 A1 | 3/2015 | Novotny et al. |
| 2015/0189209 A1 | 7/2015 | Yang et al. |
| 2015/0201142 A1 | 7/2015 | Smith et al. |
| 2015/0222827 A1 | 8/2015 | Isobe |
| 2015/0229859 A1 | 8/2015 | Guidash et al. |
| 2015/0279884 A1 | 10/2015 | Kusumoto |
| 2015/0309311 A1 | 10/2015 | Cho |
| 2015/0309316 A1 | 10/2015 | Osterhout et al. |
| 2015/0312502 A1 | 10/2015 | Borremans |
| 2015/0358571 A1 | 12/2015 | Dominguez Castro et al. |
| 2015/0381911 A1 | 12/2015 | Shen et al. |
| 2016/0011422 A1 | 1/2016 | Thurber et al. |
| 2016/0018645 A1 | 1/2016 | Haddick et al. |
| 2016/0021302 A1 | 1/2016 | Cho et al. |
| 2016/0028974 A1 | 1/2016 | Guidash et al. |
| 2016/0078614 A1 | 3/2016 | Ryu et al. |
| 2016/0088253 A1 | 3/2016 | Tezuka |
| 2016/0100115 A1 | 4/2016 | Kusano |
| 2016/0165160 A1 | 6/2016 | Hseih et al. |
| 2016/0210785 A1 | 7/2016 | Balachandreswaran et al. |
| 2016/0360127 A1 | 12/2016 | Dierickx et al. |
| 2017/0039906 A1 | 2/2017 | Jepsen |
| 2017/0041571 A1 | 2/2017 | Tyrrell et al. |
| 2017/0117310 A1 | 4/2017 | Tatani et al. |
| 2017/0154909 A1 | 6/2017 | Ishizu |
| 2017/0161579 A1 | 6/2017 | Gousev et al. |
| 2017/0228345 A1 | 8/2017 | Gupta et al. |
| 2017/0270664 A1 | 9/2017 | Hoogi et al. |
| 2017/0272768 A1 | 9/2017 | Tall et al. |
| 2017/0280031 A1 | 9/2017 | Price et al. |
| 2017/0293799 A1 | 10/2017 | Skogo et al. |
| 2017/0310910 A1 | 10/2017 | Smith et al. |
| 2017/0338262 A1 | 11/2017 | Hirata |
| 2017/0339327 A1 | 11/2017 | Koshkin et al. |
| 2018/0027174 A1 | 1/2018 | Sengoku |
| 2018/0115725 A1* | 4/2018 | Zhang .................. H04N 5/3745 |
| 2018/0136471 A1 | 5/2018 | Miller et al. |
| 2018/0143701 A1 | 5/2018 | Suh et al. |
| 2018/0167575 A1 | 6/2018 | Watanabe et al. |
| 2018/0176545 A1 | 6/2018 | Aflaki Beni |
| 2018/0204867 A1 | 7/2018 | Kim et al. |
| 2018/0224658 A1 | 8/2018 | Teller |
| 2018/0239108 A1 | 8/2018 | Ishii et al. |
| 2018/0241953 A1 | 8/2018 | Johnson |
| 2018/0270436 A1 | 9/2018 | Ivarsson et al. |
| 2018/0276841 A1 | 9/2018 | Krishnaswamy et al. |
| 2018/0376090 A1 | 12/2018 | Liu |
| 2019/0035154 A1 | 1/2019 | Liu |
| 2019/0046044 A1 | 2/2019 | Tzvieli et al. |
| 2019/0098232 A1 | 3/2019 | Mori et al. |
| 2019/0110039 A1 | 4/2019 | Linde et al. |
| 2019/0123088 A1 | 4/2019 | Kwon |
| 2019/0149751 A1 | 5/2019 | Wise |
| 2019/0172227 A1 | 6/2019 | Kasahara |
| 2019/0191116 A1 | 6/2019 | Madurawe |
| 2019/0199946 A1 | 6/2019 | Wendel et al. |
| 2019/0230306 A1 | 7/2019 | Liu |
| 2019/0246036 A1 | 8/2019 | Wu et al. |
| 2019/0253650 A1 | 8/2019 | Kim |
| 2019/0307313 A1 | 10/2019 | Wade |
| 2019/0331914 A1 | 10/2019 | Lee et al. |
| 2019/0363118 A1 | 11/2019 | Berkovich et al. |
| 2020/0053299 A1 | 2/2020 | Zhang et al. |
| 2020/0098096 A1 | 3/2020 | Moloney |
| 2020/0195828 A1 | 6/2020 | Reyserhove et al. |
| 2020/0195875 A1 | 6/2020 | Berkovich et al. |
| 2021/0026796 A1 | 1/2021 | Graif et al. |

(56) References Cited

U.S. PATENT DOCUMENTS

| | | | |
|---|---|---|---|
| 2021/0044742 | A1 | 2/2021 | Berkovich et al. |
| 2021/0133452 | A1 | 5/2021 | Berkovich et al. |
| 2021/0142086 | A1 | 5/2021 | Berkovich et al. |
| 2021/0185264 | A1 | 6/2021 | Wong et al. |
| 2021/0227159 | A1 | 7/2021 | Sambonsugi |
| 2021/0306586 | A1 | 9/2021 | Yamamoto et al. |
| 2021/0368124 | A1 | 11/2021 | Berkovich et al. |
| 2021/0409625 | A1 | 12/2021 | Zhu et al. |
| 2022/0021833 | A1 | 1/2022 | Berkovich |
| 2023/0080288 | A1 | 3/2023 | Berkovich et al. |

FOREIGN PATENT DOCUMENTS

| | | | |
|---|---|---|---|
| CN | 104204904 | A | 12/2014 |
| CN | 106255978 | A | 12/2016 |
| CN | 106791504 | A | 5/2017 |
| CN | 107005641 | A | 8/2017 |
| CN | 109298528 | A | 2/2019 |
| EP | 1746820 | A1 | 1/2007 |
| EP | 1788802 | A1 | 5/2007 |
| EP | 2037505 | A1 | 3/2009 |
| EP | 2804074 | A2 | 11/2014 |
| EP | 3229457 | A1 | 10/2017 |
| JP | 2003319262 | A | 11/2003 |
| JP | 2008270500 | A | 11/2008 |
| WO | 2014055391 | A2 | 4/2014 |
| WO | 2016095057 | A1 | 6/2016 |
| WO | 2017003477 | A1 | 1/2017 |
| WO | 2017013806 | A1 | 1/2017 |
| WO | 2017047010 | A1 | 3/2017 |
| WO | 2019018084 | A1 | 1/2019 |
| WO | 2019111528 | A1 | 6/2019 |
| WO | 2019145578 | A1 | 8/2019 |

OTHER PUBLICATIONS

Cho K., et al., "A Low Power Dual CDS for a Column-Parallel CMOS Image Sensor," Journal of Semiconductor Technology and Science, Dec. 30, 2012, vol. 12 (4), pp. 388-396.
Chuxi L., et al., "A Memristor-Based Processing-in-Memory Architechture for Deep Convolutional Neural Networks Approximate Computation," Journal of Computer Research and Development, Jun. 30, 2017, vol. 54 (6), pp. 1367-1380.
Corrected Notice of Allowability dated Apr. 9, 2021 for U.S. Appl. No. 16/255,528, filed Jan. 23, 2019, 5 Pages.
Extended European Search Report for European Application No. 18179846.3, dated Dec. 7, 2018, 10 Pages.
Extended European Search Report for European Application No. 18179851.3, dated Dec. 7, 2018, 8 Pages.
Extended European Search Report for European Application No. 19743908.6, dated Sep. 30, 2020, 9 Pages.
Final Office Action dated Oct. 18, 2021 for U.S. Appl. No. 16/716,050, filed Dec. 16, 2019, 18 Pages.
Final Office Action dated Oct. 21, 2021 for U.S. Appl. No. 16/421,441, filed May 23, 2019, 23 Pages.
Final Office Action dated Jan. 27, 2021 for U.S. Appl. No. 16/255,528, filed Jan. 23, 2019, 31 Pages.
Final Office Action dated Jul. 28, 2021 for U.S. Appl. No. 17/083,920, filed Oct. 29, 2020, 19 Pages.
International Search Report and Written Opinion for International Application No. PCT/US2018/039350, dated Nov. 15, 2018, 11 Pages.
International Search Report and Written Opinion for International Application No. PCT/US2018/039352, dated Oct. 26, 2018, 8 Pages.
International Search Report and Written Opinion for International Application No. PCT/US2018/039431, dated Nov. 7, 2018, 12 Pages.
International Search Report and Written Opinion for International Application No. PCT/US2020/044807, dated Sep. 30, 2020, 12 Pages.
International Search Report and Written Opinion for International Application No. PCT/US2020/058097, dated Feb. 12, 2021, 09 Pages.
International Search Report and Written Opinion for International Application No. PCT/US2020/059636, dated Feb. 11, 2021, 18 Pages.
International Search Report and Written Opinion for International Application No. PCT/US2021/031201, dated Aug. 2, 2021, 13 Pages.
International Search Report and Written Opinion for International Application No. PCT/US2021/033321, dated Sep. 6, 2021, 11 pages.
Millet L., et al., "A 5500-Frames/s 85-GOPS/W 3-D Stacked BSI Vision Chip Based on Parallel In-Focal-Plane Acquisition and Processing," IEEE Journal of Solid-State Circuits, USA, Apr. 1, 2019, vol. 54 (4), pp. 1096-1105, XP011716786.
Non-Final Office Action dated Sep. 2, 2021 for U.S. Appl. No. 16/910,844, filed Jun. 24, 2020, 7 Pages.
Non-Final Office Action dated May 7, 2021 for U.S. Appl. No. 16/421,441, filed May 23, 2019, 17 Pages.
Non-Final Office Action dated Jul. 10, 2020 for U.S. Appl. No. 16/255,528, filed Jan. 23, 2019, 27 Pages.
Non-Final Office Action dated May 14, 2021 for U.S. Appl. No. 16/716,050, filed Dec. 16, 2019, 16 Pages.
Non-Final Office Action dated Apr. 21, 2021 for U.S. Appl. No. 17/083,920, filed Oct. 29, 2020, 17 Pages.
Non-Final Office Action dated Oct. 21, 2021 for U.S. Appl. No. 17/083,920, filed Oct. 29, 2020, 19 Pages.
Non-Final Office Action dated Nov. 23, 2018 for U.S. Appl. No. 15/847,517, filed Dec. 19, 2017, 21 Pages.
Non-Final Office Action dated Jul. 25, 2019 for U.S. Appl. No. 15/909,162, filed Mar. 1, 2018, 20 Pages.
Notice of Allowance dated Apr. 1, 2021 for U.S. Appl. No. 16/255,528, filed Jan. 23, 2019, 7 Pages.
Notice of Allowance dated Apr. 16, 2021 for U.S. Appl. No. 16/715,792, filed Dec. 16, 2019, 10 Pages.
Notice of Allowance dated Mar. 18, 2020 for U.S. Appl. No. 15/909,162, filed Mar. 1, 2018, 9 Pages.
Notice of Allowance dated Dec. 22, 2021 for U.S. Appl. No. 16/910,844, filed Jun. 24, 2020, 7 pages.
Notice of Allowance dated Nov. 24, 2021 for U.S. Appl. No. 16/910,844, filed Jun. 24, 2020, 8 pages.
Notice of Allowance dated Aug. 25, 2021 for U.S. Appl. No. 16/715,792, filed Dec. 16, 2019, 9 Pages.
Office Action dated Jul. 3, 2020 for Chinese Application No. 201810821296, filed Jul. 24, 2018, 17 Pages.
Office Action dated Mar. 9, 2021 for Chinese Application No. 201810821296, filed Jul. 24, 2018, 10 Pages.
Office Action dated Jun. 28, 2020 for Chinese Application No. 201810821296, filed Jul. 24, 2018, 2 Pages.
Partial European Search Report for European Application No. 18179838.0, dated Dec. 5, 2018, 13 Pages.
Restriction Requirement dated Feb. 2, 2021 for U.S. Appl. No. 16/716,050, filed Dec. 16, 2019, 7 Pages.
Sebastian A., et al., "Memory Devices and Applications for In-memory Computing," Nature Nanotechnology, Nature Publication Group, Inc, London, Mar. 30, 2020, vol. 15 (7), pp. 529-544, XP037194929.
Shi C., et al., "A 1000fps Vision Chip Based on a Dynamically Reconfigurable Hybrid Architecture Comprising a PE Array and Self-Organizing Map Neural Network," International Solid-State Circuits Conference, Session 7, Image Sensors, Feb. 10, 2014, pp. 128-130, XP055826878.
Advisory Action dated Oct. 1, 2021 for U.S. Appl. No. 17/083,920, filed Oct. 29, 2020, 4 pages.
International Preliminary Report on Patentability for International Application No. PCT/US2020/044807, dated Feb. 17, 2022, 10 pages.
Notice of Allowance dated Feb. 14, 2022 for U.S. Appl. No. 16/715,792, filed Dec. 16, 2019, 9 pages.
Notice of Allowance dated Feb. 22, 2022 for U.S. Appl. No. 17/083,920, filed Oct. 29, 2020, 10 pages.

(56) References Cited

OTHER PUBLICATIONS

U.S. Appl. No. 16/715,792, "Non-Final Office Action", dated Jan. 1, 2021, 15 pages.
PCT/US2019/034007, "International Search Report and Written Opinion", dated Oct. 28, 2019, 19 pages.
PCT/US2019/066805, "International Search Report and Written Opinion", dated Mar. 6, 2020, 13 pages.
PCT/US2019/066831, "International Search Report and Written Opinion", dated Feb. 27, 2020, 15 pages.
Invitation to Pay Additional Fees and Where Applicable, Protest Fee for International Application No. PCT/US2021/041775, Oct. 8, 2021, 12 pages.
Notice of Allowance dated Jun. 17, 2022 for U.S. Appl. No. 16/715,792, filed Dec. 16, 2019, 2 pages.
Notice of Allowance dated Jun. 2, 2022 for U.S. Appl. No. 16/716,050, filed Dec. 16, 2019, 13 pages.
Notice of Allowance dated May 23, 2022 for U.S. Appl. No. 17/324,803, filed May 19, 2021, 9 pages.
Notice of Allowance dated Jun. 24, 2022 for U.S. Appl. No. 16/421,441, filed May 23, 2019, 17 pages.
Notice of Allowance dated May 24, 2022 for U.S. Appl. No. 16/715,792, filed Dec. 16, 2019, 9 pages.
Notice of Allowance dated Jun. 3, 2022 for U.S. Appl. No. 17/324,803, filed May 19, 2021, 6 pages.
Office Action dated Apr. 5, 2022 for European Patent Application No. 19731047.7, filed May 24, 2019, 7 pages.
Corrected Notice of Allowance dated Mar. 22, 2022 for U.S. Appl. No. 16/716,050, filed Dec. 16, 2019, 2 Pages.
Notice of Allowance dated Feb. 7, 2022 for U.S. Appl. No. 17/324,803, filed May 19, 2021, 8 pages.
Notice of Allowance dated Mar. 7, 2022 for U.S. Appl. No. 16/421,441, filed May 23, 2019, 18 pages.
Notice of Allowance dated Mar. 11, 2022 for U.S. Appl. No. 16/716,050, filed Dec. 16, 2019, 13 pages.
Notice of Allowance dated Aug. 24, 2022 for U.S. Appl. No. 17/091,331, filed Nov. 6, 2020, 9 pages.
Office Action dated Aug. 11, 2022 for European Patent Application No. 19731047.7, filed May 24, 2019, 10 pages.
Office Action dated Jul. 29, 2022 for Taiwan Application No. 108118209, filed May 27, 2019, 15 pages.
Notice of Allowance dated Sep. 2, 2022 for U.S. Appl. No. 16/715,792, filed Dec. 16, 2019, 9 pages.
Office Action dated Aug. 17, 2022 for Chinese Application No. 201980083991.5, filed Jun. 17, 2021, 24 pages.
U.S. Appl. No. 16/421,441, "Notice of Allowance", Jan. 3, 2023, 11 pages.
U.S. Appl. No. 16/421,441, "Notice of Allowance", May 15, 2023, 10 pages.
U.S. Appl. No. 16/421,441, "Notice of Allowance", Sep. 6, 2022, 17 pages.
U.S. Appl. No. 16/715,792, "Notice of Allowance", Apr. 19, 2023, 9 pages.
U.S. Appl. No. 16/715,792, "Notice of Allowance", Jan. 3, 2023, 9 pages.
U.S. Appl. No. 16/716,050, "Corrected Notice of Allowability", Sep. 28, 2022, 2 pages.
U.S. Appl. No. 16/716,050, "Notice of Allowance", Jan. 26, 2023, 14 pages.
U.S. Appl. No. 16/716,050, "Notice of Allowance", Jun. 7, 2023, 19 pages.
U.S. Appl. No. 16/716,050, "Notice of Allowance", Sep. 19, 2022, 13 pages.
U.S. Appl. No. 16/983,863, "Final Office Action", Apr. 12, 2023, 21 pages.
U.S. Appl. No. 16/983,863, "Non-Final Office Action", Nov. 2, 2022, 20 pages.
U.S. Appl. No. 17/083,920, "Corrected Notice of Allowability", Apr. 20, 2022, 7 pages.
U.S. Appl. No. 17/083,920, "Notice of Allowance", Feb. 7, 2023, 10 pages.
U.S. Appl. No. 17/083,920, "Notice of Allowance", Sep. 9, 2022, 10 pages.
U.S. Appl. No. 17/091,331, "Corrected Notice of Allowability", Sep. 9, 2022, 2 pages.
U.S. Appl. No. 17/091,331, "Notice of Allowance", Dec. 15, 2022, 8 pages.
U.S. Appl. No. 17/091,331, "Notice of Allowance", Mar. 28, 2023, 5 pages.
U.S. Appl. No. 17/324,803, "Notice of Allowance", Feb. 8, 2023, 8 pages.
U.S. Appl. No. 17/324,803, "Notice of Allowance", May 22, 2023, 5 pages.
U.S. Appl. No. 17/324,803, "Notice of Allowance", Sep. 8, 2022, 8 pages.
U.S. Appl. No. 17/469,258, "Non-Final Office Action", Feb. 2, 2023, 17 pages.
U.S. Appl. No. 17/992,648, "Non-Final Office Action", Mar. 6, 2023, 24 pages.

* cited by examiner

DYNAMIC AND HIERARCHICAL IMAGE SENSING AND PROCESSING

RELATED APPLICATION

This patent application claims priority to U.S. Provisional Patent Application Ser. No. 62/949,694, titled "OBJECT TRACKING AND ANOMALIES DETECTION WITH SMART SENSOR" and filed on Dec. 18, 2019, which is assigned to the assignee hereof and is incorporated herein by reference in its entirety for all purposes.

BACKGROUND

A typical image sensor includes an array of pixel cells. Each pixel cell may include a photodiode to sense light by converting photons into charge (e.g., electrons or holes). The charge converted at each pixel cell can be quantized to become a digital pixel value, and an image can be generated from an array of digital pixel values.

The images generated by the image sensor can be processed to support different applications such as, for example, a virtual-reality (VR) application, an augmented-reality (AR), or a mixed reality (MR) application. An image-processing operation can be performed on the images to detect and/or identify certain objects of interest and their locations in the images. The detection/identification can be based on certain features of those objects. Based on the detection/identification of the object as well as their locations in the images, various contextual information of a scene can be determined. The VR/AR/MR application can then determine output contents based on the contextual information to provide, for example, assistance information, interactive experience, etc., to the user.

The VR/AR/MR application can benefit from improved spatial and temporal resolutions of the imaging sensing operations. Specifically, by improving the spatial resolutions of the imaging sensing operations, each image frame can include more pixels to capture object features at high resolution, which can improve the accuracy of the object detection and identification operations. Moreover, by improving the temporal resolution of the image sensing operations, the images can be captured and processed at a higher frame rate, which allow detection of high speed events/objects (e.g., a fast-moving object, an abrupt event). All these can improve the determination of the contextual information of the scene.

However, the generation of high-resolution image frames at a high frame rate as well as the transmission and processing of these high-resolution image frames can lead to huge power consumption by the image sensor and by the image processor and require a huge amount of computation and memory resources. Moreover, given that typically only a small subset of the pixel cells receive light from the object of interest, a lot of the power is wasted in generating, transmitting, and processing pixel data that are not useful for the object detection/tracking operation, which degrades the overall efficiency of the image sensing and processing operations. All these make it challenging to implement a high-resolution image sensing and processing system to support a VR/AR/MR application on a mobile/wearable platform which typically only provides limited power as well as computation and memory resources.

SUMMARY

The present disclosure relates to an imaging system. More specifically, and without limitation, this disclosure relates to techniques to perform dynamic and hierarchical image sensing and processing operations.

In one example, an apparatus is provided. The apparatus is part of a mobile device. The apparatus comprises: an array of pixel cells each configured to perform an image sensing operation, one or more attributes of the image sensing operation being configurable based on an image sensing configuration; a sensor data processor configured to execute a hierarchical set of processing operations; and a controller configured to: receive, from the sensor data processor, a first-level processing output from a first-level processing operation of the hierarchical set of processing operations; and based on the first-level processing output satisfying a condition, control the sensor data processor to execute a second-level processing operation on at least one image frame captured by the array of pixel cells to generate a second-level processing output.

In some aspects, the first-level processing operation and the second-level processing operation has different computational complexities.

In some aspects, the sensor data processor is configured to execute the first-level processing operation at a lower speed than the second-level processing operation.

In some aspects, the sensor data processor is configured to execute the first-level processing operation at a higher speed than the second-level processing operation.

In some aspects, the first-level processing operation is performed on one or more first image frames captured by the array of pixel cells based on a first image sensing configuration. The controller is configured to, based on the first-level processing output satisfying the condition: generate a second image sensing configuration; control the array of pixel cells to capture one or more second image frames based on the second image sensing configuration; and control the sensor data processor to execute the second-level processing operation on the one or more second image frames to generate the second-level processing output.

In some aspects, wherein the first image sensing configuration selects a first subset of pixel cells of the array of pixel cells to perform the image sensing operation. The second image sensing configuration selects a second subset of pixel cells of the array of pixel cells to perform the image sensing operation. The second subset is determined based on the first subset.

In some aspects, the first image sensing configuration configures each pixel cell of the array of pixel cells to perform the image sensing operation to generate pixel data of the one or more first image frames, and to generate the one or more first image frames at a first frame rate. The second image sensing configuration configures a first subset of the array of pixel cells to perform the image sensing operation to generate pixel data of the one or more second image frames and to disable a second subset of the array of pixel cells, and to generate the one or more second image frames at a second frame rate. The first frame rate is lower than the second frame rate.

In some aspects, the first image sensing configuration further configures each pixel cell of the array of pixel cells to generate the pixel data of the one or more first image frames at a first quantization resolution. The second image sensing configuration further configures the first subset of the array of pixel cells to generate the pixel data of the one or more second image frames at a second quantization resolution. The first quantization resolution is lower than the second quantization resolution.

In some aspects, the controller is configured to update the second image sensing configuration for capturing subsequent one or more second image frames based on the second-level processing output from the one or more second image frames.

In some aspects, the first-level processing output indicates first pixel locations of one or more objects belonging to a particular class. The condition comprises the one or more first image frames including pixels of a target object. The controller is configured to, based on determining that the one or more first image frames include the pixels of the target object: determine second pixel locations of the target object in the one or more first image frames; and generate the second image sensing configuration to select the first subset of the array of pixel cells corresponding to the second pixel locations.

In some aspects, the second-level processing operation comprises identifying the target object in the one or more second image frames. The second-level processing output indicates a result of identifying the target object in the one or more second image frames.

In some aspects, the controller is configured to update the second image sensing configuration to select a different first subset of the array of pixel cells for capturing subsequent one or more second image frames based on the result of identifying the target object in the one or more second image frames, and based on a motion model of the target object.

In some aspects, the first-level processing output indicates first pixel locations of a body part. The condition comprises the body part corresponding to a hand. The controller is configured to generate the second image sensing configuration to select the first subset of the array of pixel cells corresponding to the hand.

In some aspects, the second-level processing operation comprises identifying a gesture of the hand in the one or more second image frames. The second-level processing output indicates a result of identifying the gesture of the hand in the one or more second image frames.

In some aspects, the second-level processing output indicates a first image location of a first object and a second image location of a second object in the one or more second image frames. The sensor data processor is configured to perform a third-level processing operation of the hierarchical set of processing operations based on the first image location and the second image location to generate contextual information of a scene.

In some aspects, the context information includes at least one of: an interaction between the first object and the second object, or an anomaly event.

In some aspects, the first-level processing operation is performed on a map of an environment including locations of one or more physical objects and location data of the apparatus. The condition comprises the first-level processing output indicating a particular positional relationship between the apparatus and the one or more physical objects.

In some examples, a method is provided. The method is performed at a mobile device and comprises: receiving, from a sensor data processor of the mobile device, a first-level processing output from a first-level processing operation of a hierarchical set of processing operations; determining, by a controller of the mobile device, that the first-level processing output satisfies a condition; and based on the first-level processing output satisfying the condition, controlling, by the controller, the sensor data processor to execute a second-level processing operation of the hierarchical set of processing operations on at least one image frame captured by an array of pixel cells to generate a second-level processing output.

In some aspects, the first-level processing operation is performed on one or more first image frames captured by the array of pixel cells based on a first image sensing configuration. The method further comprises, based on the first-level processing output satisfying the condition: generating, by the controller, a second image sensing configuration; controlling, by the controller, the array of pixel cells to capture one or more second image frames based on a second image sensing configuration; and controlling, by the controller, the sensor data processor to execute the second-level processing operation on the one or more second image frames to generate the second-level processing output.

In some aspects, the first-level processing operation is performed on a map of an environment including locations of one or more physical objects and location data of the mobile device. The condition comprises the first-level processing output indicating a particular positional relationship between the mobile device and the one or more physical objects.

BRIEF DESCRIPTION OF THE DRAWINGS

Illustrative examples are described with reference to the following figures.

Figure 1A:
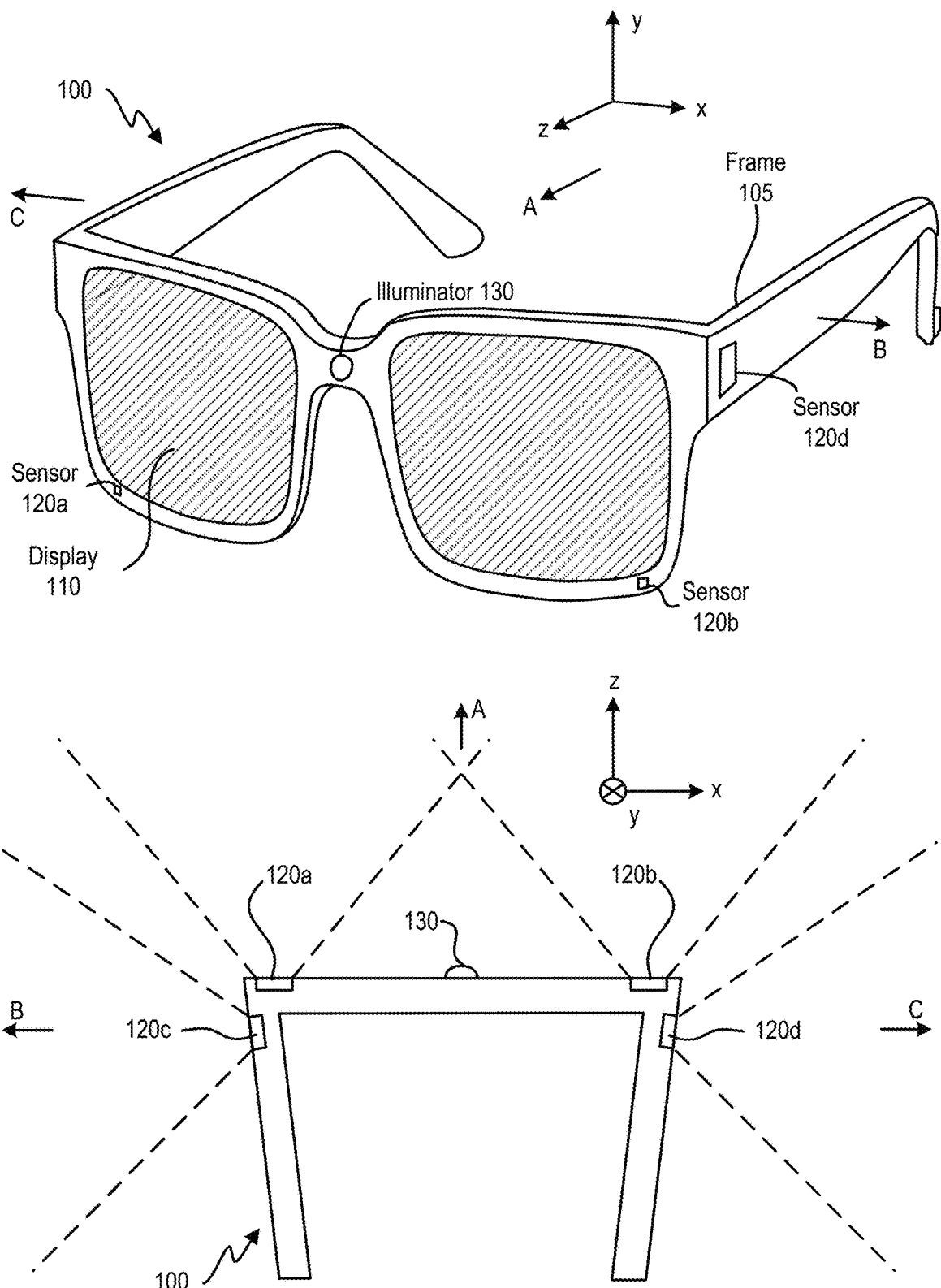
FIG. 1A and FIG. 1B are diagrams of an example of a near-eye display.

The figures depict examples of the present disclosure for purposes of illustration only. One skilled in the art will readily recognize from the following description that alternative examples of the structures and methods illustrated may be employed without departing from the principles of or benefits touted in this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description for the purposes of explanation, specific details are set forth to provide a thorough understanding of certain inventive examples. However, it will be apparent that various examples may be practiced without these specific details. The figures and description are not intended to be restrictive.

As discussed above, an image sensor typically includes an array of pixel cells. Each pixel cell may include a photodiode to sense light by converting photons into charge (e.g., electrons or holes). The charge converted at each pixel cell can be quantized to become a digital pixel value, and an image can be generated from an array of digital pixel values.

The images captured by the image sensor can be processed by a hierarchical set of image processing operations, in which a lower-level image processing operation can be performed on the images to generate lower-level processing outputs and are then provided to a higher-level image processing operation to generate higher-level processing outputs. The higher-level processing outputs can then be provided to support the VR/AR/MR application. For example, a lower-level image processing operations can include an image segmentation operation to segment an image into pixel segments belonging to objects of different classes, an image detection operation to distinguish different objects of the same class within a pixel segment, etc. A higher-level image processing operation can process the lower-level processing outputs. Examples of higher-level image processing operations can include an object identification operation to identify a particular object among the different objects detected by the image detection operation, a tracking operation to track the movement of an identified object across image frames, a gesture identification operation (if the identified object is a hand), determination of scene context, etc. Various contextual information of a scene, such as an interaction between identified objects, an event involving the identified objects, etc., can also be determined. The contextual information can then be provided to an upstream application, such as an VR/AR/MR application.

The VR/AR/MR application can benefit from improved spatial and temporal resolutions of the imaging sensing operations. Specifically, by improving the spatial resolutions of the imaging sensing operations each image can include more pixels to capture object features at high resolution, which can improve the accuracies of the aforementioned object/gesture detection and identification operations. Moreover, by improving the temporal resolution of the image sensing operations, the images can be captured and processed at a higher frame rate, which allow detection/tracking of high speed events/objects (e.g., a fast-moving object, an abrupt event) across image frames. All these can improve the accuracy of contextual information determination, as well as the performance of the VR/AR/MR application that relies on the contextual information.

However, the generation of high-resolution image frames at a high frame rate, as well as the transmission and processing of these high-resolution image frames, can lead to huge power consumption by the image sensor and by the image processor and require huge amount of computation and memory resources. Specifically, to increase the spatial resolution, the image sensor may need to include a larger number of pixel cells, which consumes more power. Moreover, as huge volume of pixel data is generated and transmitted for each image frame, more power is consumed in the transmission of the pixel data from the image sensor to the image processor. More memory resources are needed to store the huge volume of pixel data, and more computation resources are needed to perform the entire hierarchical set of image processing operations on the huge volume of pixel data. The power consumption of the image sensing and processing operations, as well as the amount of computation and memory resources required by the operations, can further increase when the high-resolution image frames are generated and processed at a high frame rate as more pixel data are generated, transferred, and processed within a given period of time.

Moreover, statically capturing full-pixel image frames and performing the entire hierarchical set of image process operations on the full-pixel image frames can lead to inefficiency. Specifically, typically only a small subset of the pixels contains the image of the objects of interest, while the rest of the pixels either do not include relevant data for the contextual information or otherwise do not include useful information for the upstream application. Spending power to repeatedly capture and process pixels that are not useful for the upstream application can lead to waste of power and degrade the overall efficiency of the image sensing and processing operations. All these make it challenging to implement a high-resolution image sensing and processing system on a mobile/wearable platform where available power as well as computation and memory resources are limited.

This disclosure proposes image sensing and processing techniques that can address at least some of the issues above. In some examples, an apparatus comprises an array of pixel cells each configured to perform an image sensing operation, one or more attributes of the image sensing operation being configurable based on an image sensing configuration. The one or more attributes may include, for example, whether the entirety of the array of pixel cells or a subset of the pixel cells is enabled to perform the image sensing operation, a quantization resolution of the pixel cell output, exposure period duration, frame rate, etc., and can be configured based on different image sensing configurations.

The apparatus further comprises a sensor data processor configured to execute a hierarchical set of processing operations. The hierarchical set of processing operations may include, for example, a first-level processing operation to generate first-level processing outputs, a second-level processing operation to generate second-level processing outputs, etc. In the hierarchical set of processing operations, a higher-level processing operation (e.g., second-level processing operation) can be gated or otherwise has a dependency on lower-level processing outputs by a lower-level processing operation (e.g., first-level processing operation). The first-level processing operation may also have a different computational complexity from the second-level processing operation. Different levels of processing operations may process different amounts/types of data, or otherwise require different amounts of computation/memory resources and/or different amounts of computation time to complete.

In some examples, the first-level processing operations can include an image segmentation operation to segment an image into pixel segments belonging to objects of different classes, an image detection operation to distinguish different objects of the same class within a pixel segment, etc. The first-level processing operations can be performed on a full-pixel image frame, and the first-level processing outputs can indicate pixel locations of segments of pixels of a particular class of objects (e.g., a vehicle, a person, a body part, etc.). The second-level processing operations can include an object identification operation to identify a particular object among the different objects detected by the image detection operation, a tracking operation to track the movement of an identified object across image frames, a gesture identification operation (if the identified object is a hand), etc. The second-level processing operations can be performed on, for example, segments of pixels of a particular objects instead of the full-pixel image frame. In such examples, the first-level processing operations can process more data and can have a higher computational complexity than the second-level processing operations.

In some examples, the first-level processing operations can include a context determination operation. For example, based on a pre-scanned map of an environment including the locations of various physical objects, as well as location/motion data of the user, a context determination operation can be performed to determine, for example, a location of the user within the environment, a positional relationship between the user and the physical objects, an interaction of the user with one of the physical objects in the environment, etc. As another example, the first-level processing operation can be performed on samples of a full-pixel image frame to determine approximate locations of objects of interests. The second-level processing operations can include an image processing operation on an image frame based on the output of the context determination operation output. For example, first-level processing outputs can indicate a particular class of objects to be detected and tracked in the image frame given the location of the user in the environment, whiles the second-level processing operations performs the detection and tracking of a particular object of the class.

As an illustrative example, based on a determination, from the first-level processing operations, that the user is near a stove in a kitchen, an image processing operation can be configured to detect, for example, hand poses of the user, utensils handled by the user, etc. The image processing operation can be performed on a full-pixel image frame to perform image segmentation and object detection operations, or on a subset of pixels of the image frame determined to be likely to include the pixels of objects of interest (e.g., based on the location of the user, based on the pixel locations of the objects in prior image frames, etc.). In such examples, the first-level processing operations can process a different type of data (e.g., map data, location/motion data versus image data) from the second-level processing operations. Moreover, the first-level processing operations can have a lower computational complexity than the second-level processing operations.

The apparatus further includes a controller configured to control the array of pixel cells and the sensor data processor to perform a dynamic and hierarchical sensing and processing operation. In some examples, the controller can receive from the sensor data processor the first-level processing outputs from the first-level processing operation. Based on the first-level processing outputs satisfying a condition, the controller can configure the array of pixel cells to perform an image sensing operation to generate image frames, and configure the sensor data processor to perform the second-level processing operations on the image frames to generate second-level processing outputs.

In some examples, the controller can control the array of pixel cells and the sensor data processor to perform the first-level processing operation and the second-level processing operation as two hierarchical image processing operations having different complexities. Specifically, the first-level processing operation can be performed on one or more first image frames. The first image frames are captured by the array of pixel cells based on a first image sensing configuration. The first-image sensing configuration can configure each pixel cell of the array of pixel cells to perform the image sensing operation to generate pixel data of the one or more first image frames as full-pixel images, and to generate the one or more first image frames at a low frame rate. The first-level processing operations can be performed on the first image frames, which contain full-pixel frames, to detect one or more objects of a target class (e.g., a vehicle, a person, a body part) from the first image frames.

If the controller determines, based on the first-level processing outputs, that a target object is in the first image frames, the controller can generate the second image sensing configuration to indicate pixel locations of regions of interests (ROI) including the pixels of the target object in the first image frames. Using the second image sensing configuration, the controller can select a subset of the array of pixel cells corresponding to the ROIs to perform the image sensing operation to generate the one or more second image frames as sparse images at a high frame rate, while the rest of the array of pixel cells are not selected to perform the image sensing operation. In some examples, the controller can also select the subset of pixel cells based on a sub-sampling operation to lower the spatial resolution of the image sensing operation, where the first and second image sensing configurations have different sampling rate and different spatial resolutions. The controller can then control the sensor data processor to perform the second-level processing operations on the active pixels of the second image frames to, for example, identify the target object, track a movement of the target object, determine a gesture/pose of the target object, etc. A context determination operation can also be performed based on the second-level processing operations to detect, for example, the occurrence of an event (e.g., an anomaly event) based on positional relationships among target objects.

In some examples, the controller can control the array of pixel cells and the sensor data processor to perform the context determination operation as the first-level processing operation and an image processing operation as the second-level processing operation. For example, based on a pre-scanned map of an environment including the locations of various physical objects, as well as location/motion data of the user, the sensor data processor can perform a context determination operation to generate the first-level processing outputs including, for example, a location of the user within the environment, a positional relationship between the user and the physical objects, an interaction of the user with one of the physical objects in the environment, etc. The controller can then determine an image sensing configuration based on the first-level processing outputs. For example, if the first-level processing outputs indicate that a substantial change in the user's location has occurred, the controller can change the image sensing configuration to increase the spatial resolution and/or quantization resolution of the image sensing operations at the array of pixel cells, whereas if the user is static, the controller can reduce the spatial resolution and/or quantization of the image sensing operations. The controller can also provide information of objects of interests to be detected/tracked based on the first-level processing outputs. For example, if the first-level processing outputs indicate that the user is in a kitchen, the controller can configure the sensor data processor to detect/track objects related to kitchen, such as user's hands, utensils, etc.

In some examples, the apparatus can implement a two-tier feedback system comprising a slow feedback loop and a fast feedback loop. The apparatus can operate in a slow feedback loop to support a processing operation of relatively high computation complexity, and operate in a fast feedback loop to support a processing operation of relatively low computation complexity.

In some examples, the slow feedback loop can control the start of the fast feedback loop. For example, the apparatus can capture and process full-pixel image frames in a slow feedback loop until a particular class of objects is detected. Once the particular class of objects is detected, the apparatus can stop the slow feedback loop and proceed to the fast feedback loop, in which the apparatus can capture and process sparse image frames to track a particular object, and the subset of pixel cells enabled to capture the sparse image frames is updated based on the tracking result.

In some examples, the fast feedback loop can control the start of the slow feedback loop. For example, the apparatus can perform the context determination operation to determine the location of a user in an environment until the user is at a particular location (e.g., in a kitchen). When the user reaches the particular location, the apparatus can stop the fast feedback loop and proceed to the slow feedback loop, in which the apparatus can capture and process full-pixel image frames to, for example, identify the hands of the user from the image frames, determine the hand poses of the user, and to determine an activity engaged by the user based on the hand poses (e.g., cooking). The slow feedback loop can stop when, for example, a particular hand pose of the user is detected which indicates the end of the activity (e.g., cooking completes).

The array of pixel cells, the controller, and the sensor data processor can be implemented in an imaging system comprising a host processor and an image sensor. The host processor can execute the application. In some examples, the host processor can also implement an image processing application to execute the first-level processing operation. The image sensor includes a sensor compute circuit and the plurality of pixel cells. The sensor compute circuit can include an image processor to execute the second-level processing operation, as well as the controller. The host processor can be connected with the image sensor via an off-chip interconnect (e.g., I3C bus), which can transmit the first image frames at the low frame rate. Within the image sensor, the sensor compute circuit and the array of pixel cells can be implemented on two different substrates forming a stack and can be connected via on-chip interconnects, such as through silicon vias (TSVs), micro-TSVs, Copper-Copper bumps, etc., to transmit the second image frames at the high frame rate as well as the image sensing configurations.

With the disclosed techniques, a dynamic and hierarchical sensing and processing operation can be performed, in which the apparatus can dynamically switch between a high-complexity sensing and processing operation and a low-complexity sensing and processing operation. The high-complexity sensing and processing operation, which can include capturing and processing of full-pixel (or having a larger subset of active pixels) frames, can provide improved spatial resolution. But given that the high-complexity sensing and processing operation can be gated and/or performed at a lower rate, the power consumption as well as the required computation and memory resources can be limited. Further, the low-complexity sensing and processing operation, which can include capturing and processing of sparse frames, or other types of data that require less computation power to capture and process (e.g., motion/location data), can be performed at a high frame rate to improve temporal resolution with limited power consumption and computation and memory resources usage. All these can improve the performance of the imaging system as well as the applications that depend on the imaging system while limiting power consumption as well computation and memory resources usage.

The disclosed techniques may include or be implemented in conjunction with an artificial reality system. Artificial reality is a form of reality that has been adjusted in some manner before presentation to a user, which may include, for example, a VR, an AR, a MR, a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some examples, artificial reality may also be associated with applications, products, accessories, services, or some combination thereof, that are used to, for example, create content in an artificial reality and/or are otherwise used in (e.g., perform activities) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

FIG. 1A is a diagram of an example of a near-eye display 100. Near-eye display 100 presents media to a user. Examples of media presented by near-eye display 100 include one or more images, video, and/or audio. In some examples, audio is presented via an external device (e.g., speakers and/or headphones) that receives audio information from the near-eye display 100, a console, or both, and presents audio data based on the audio information. Near-eye display 100 is generally configured to operate as a virtual reality (VR) display. In some examples, near-eye display 100 is modified to operate as an augmented reality (AR) display and/or a mixed reality (MR) display.

Near-eye display 100 includes a frame 105 and a display 110. Frame 105 is coupled to one or more optical elements. Display 110 is configured for the user to see content presented by near-eye display 100. In some examples, display 110 comprises a waveguide display assembly for directing light from one or more images to an eye of the user.

Near-eye display 100 further includes image sensors 120*a*, 120*b*, 120*c*, and 120*d*. Each of image sensors 120*a*, 120*b*, 120*c*, and 120*d* may include a pixel array configured to generate image data representing different fields of views along different directions. For example, sensors 120*a* and 120*b* may be configured to provide image data representing two fields of view towards a direction A along the Z axis, whereas sensor 120*c* may be configured to provide image data representing a field of view towards a direction B along the X axis, and sensor 120*d* may be configured to provide image data representing a field of view towards a direction C along the X axis.

In some examples, sensors 120*a*-120*d* can be configured as input devices to control or influence the display content of the near-eye display 100, to provide an interactive VR/AR/MR experience to a user who wears near-eye display 100. For example, sensors 120*a*-120*d* can generate physical image data of a physical environment in which the user is located. The physical image data can be provided to a location tracking system to track a location and/or a path of movement of the user in the physical environment. A system can then update the image data provided to display 110 based on, for example, the location and orientation of the user to provide the interactive experience. In some examples, the location tracking system may operate a simultaneous localization and mapping (SLAM) algorithm to track a set of objects in the physical environment and within a field of view of the user as the user moves within the physical environment. The location tracking system can construct and update a map of the physical environment based on the set of objects, and track the location of the user within the map. By providing image data corresponding to multiple fields of view, sensors 120a-120d can provide the location tracking system with a more holistic view of the physical environment, which can lead to more objects included in the construction and updating of the map. With such an arrangement, the accuracy and robustness of tracking a location of the user within the physical environment can be improved.

In some examples, near-eye display 100 may further include one or more active illuminators 130 to project light into the physical environment. The light projected can be associated with different frequency spectrums (e.g., visible light, infrared (IR) light, ultraviolet light), and can serve various purposes. For example, illuminator 130 may project light in a dark environment (or in an environment with low intensity of IR light, ultraviolet light) to assist sensors 120a-120d in capturing images of different objects within the dark environment to, for example, enable location tracking of the user. Illuminator 130 may project certain markers onto the objects within the environment to assist the location tracking system in identifying the objects for map construction/updating.

In some examples, illuminator 130 may also enable stereoscopic imaging. For example, one or more sensors 120a or 120b can include both a first pixel array for visible light sensing and a second pixel array for IR light sensing. The first pixel array can be overlaid with a color filter (e.g., a Bayer filter), with each pixel of the first pixel array being configured to measure intensity of light associated with a particular color (e.g., one of red, green or blue (RGB) colors). The second pixel array (for IR light sensing) can also be overlaid with a filter that allows only IR light through, with each pixel of the second pixel array being configured to measure intensity of IR lights. The pixel arrays can generate an RGB image and an IR image of an object, with each pixel of the IR image being mapped to each pixel of the RGB image. Illuminator 130 may project a set of IR markers on the object, the images of which can be captured by the IR pixel array. Based on a distribution of the IR markers of the object as shown in the image, the system can estimate a distance of different parts of the object from the IR pixel array and generate a stereoscopic image of the object based on the distances. Based on the stereoscopic image of the object, the system can determine, for example, a relative position of the object with respect to the user, and can update the image data provided to display 100 based on the relative position information to provide the interactive experience.

As discussed above, near-eye display 100 may be operated in environments associated with a wide range of light intensities. For example, near-eye display 100 may be operated in an indoor environment or in an outdoor environment, and/or at different times of the day. Near-eye display 100 may also operate with or without active illuminator 130 being turned on. As a result, image sensors 120a-120d may need to have a wide dynamic range to be able to operate properly (e.g., to generate an output that correlates with the intensity of incident light) across a wide range of light intensities associated with different operating environments for near-eye display 100.

Figure 1B:
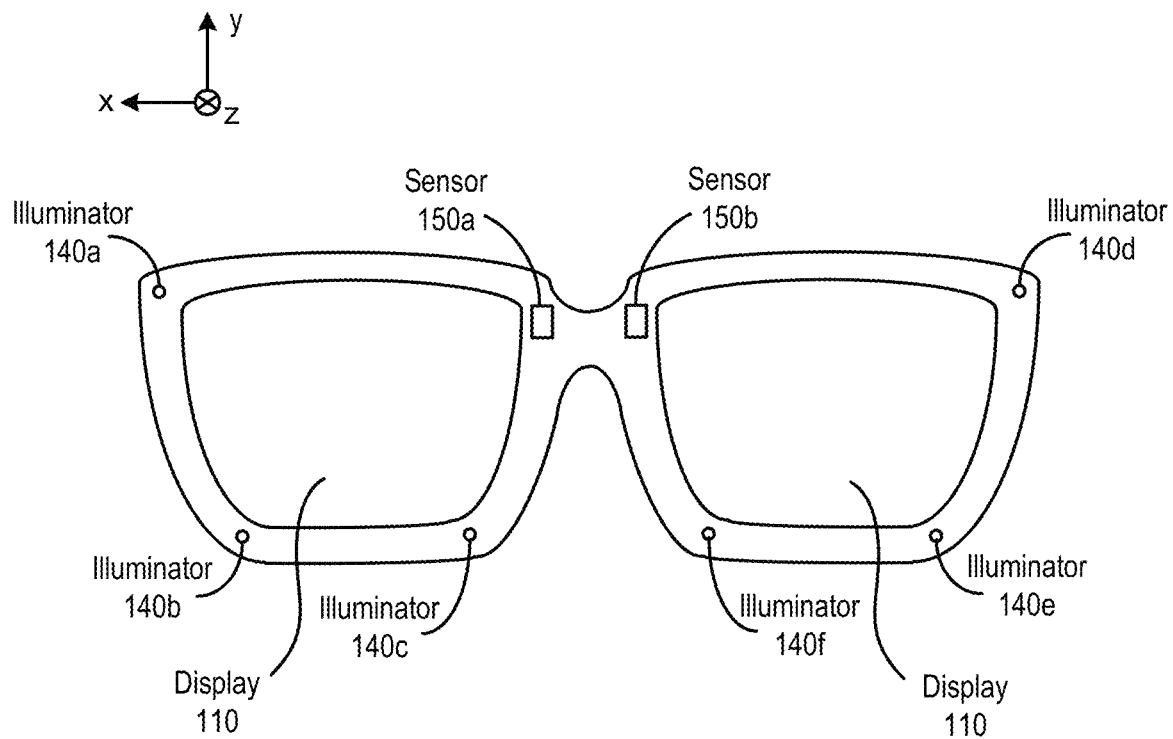

FIG. 1B is a diagram of another example of near-eye display 100. FIG. 1B illustrates a side of near-eye display 100 that faces the eyeball(s) 135 of the user who wears near-eye display 100. As shown in FIG. 1B, near-eye display 100 may further include a plurality of illuminators 140a, 140b, 140c, 140d, 140e, and 140f. Near-eye display 100 further includes a plurality of image sensors 150a and 150b. Illuminators 140a, 140b, and 140c may emit lights of certain frequency range (e.g., near-infra red (NIR)) towards direction D (which is opposite to direction A of FIG. 1A). The emitted light may be associated with a certain pattern, and can be reflected by the left eyeball of the user. Sensor 150a may include a pixel array to receive the reflected light and generate an image of the reflected pattern. Similarly, illuminators 140d, 140e, and 140f may emit NIR lights carrying the pattern. The NIR lights can be reflected by the right eyeball of the user, and may be received by sensor 150b. Sensor 150b may also include a pixel array to generate an image of the reflected pattern. Based on the images of the reflected pattern from sensors 150a and 150b, the system can determine a gaze point of the user and update the image data provided to display 100 based on the determined gaze point to provide an interactive experience to the user.

As discussed above, to avoid damaging the eyeballs of the user, illuminators 140a, 140b, 140c, 140d, 140e, and 140f are typically configured to output lights of low intensities. In a case where image sensors 150a and 150b comprise the same sensor devices as image sensors 120a-120d of FIG. 1A, the image sensors 120a-120d may need to be able to generate an output that correlates with the intensity of incident light when the intensity of the incident light is low, which may further increase the dynamic range requirement of the image sensors.

Moreover, the image sensors 120a-120d may need to be able to generate an output at a high speed to track the movements of the eyeballs. For example, a user's eyeball can perform a very rapid movement (e.g., a saccade movement) in which there can be a quick jump from one eyeball position to another. To track the rapid movement of the user's eyeball, image sensors 120a-120d need to generate images of the eyeball at high speed. For example, the rate at which the image sensors generate an image frame (the frame rate) needs to at least match the speed of movement of the eyeball. The high frame rate requires short total exposure time for all of the pixel cells involved in generating the image frame, as well as high speed for converting the sensor outputs into digital values for image generation. Moreover, as discussed above, the image sensors also need to be able to operate at an environment with low light intensity.

Figure 1B:
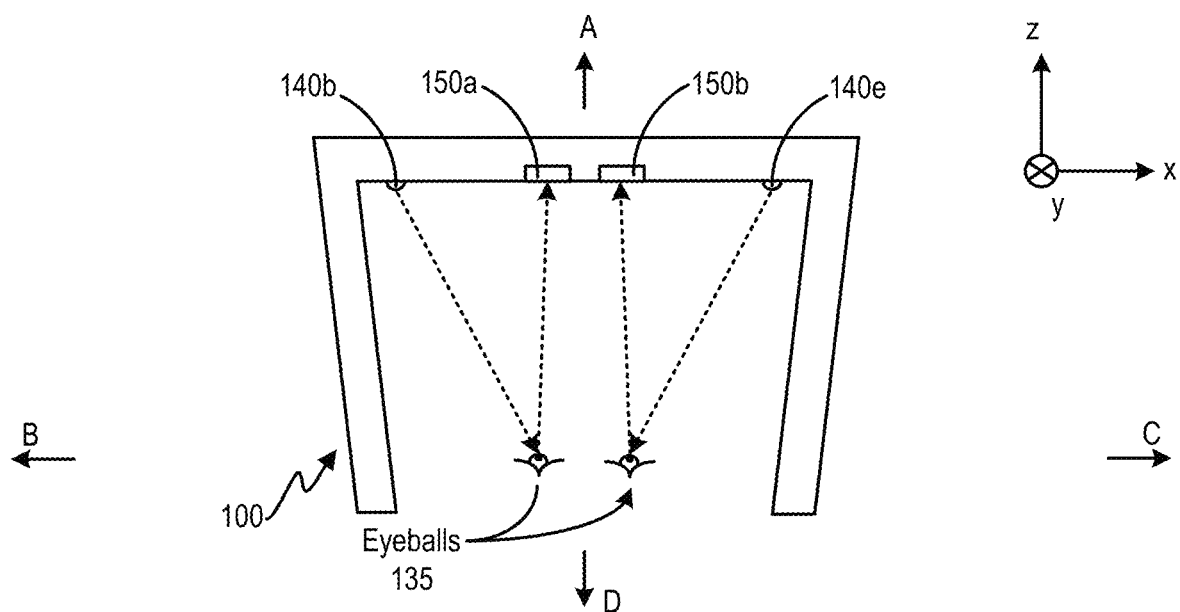
Figure 2:
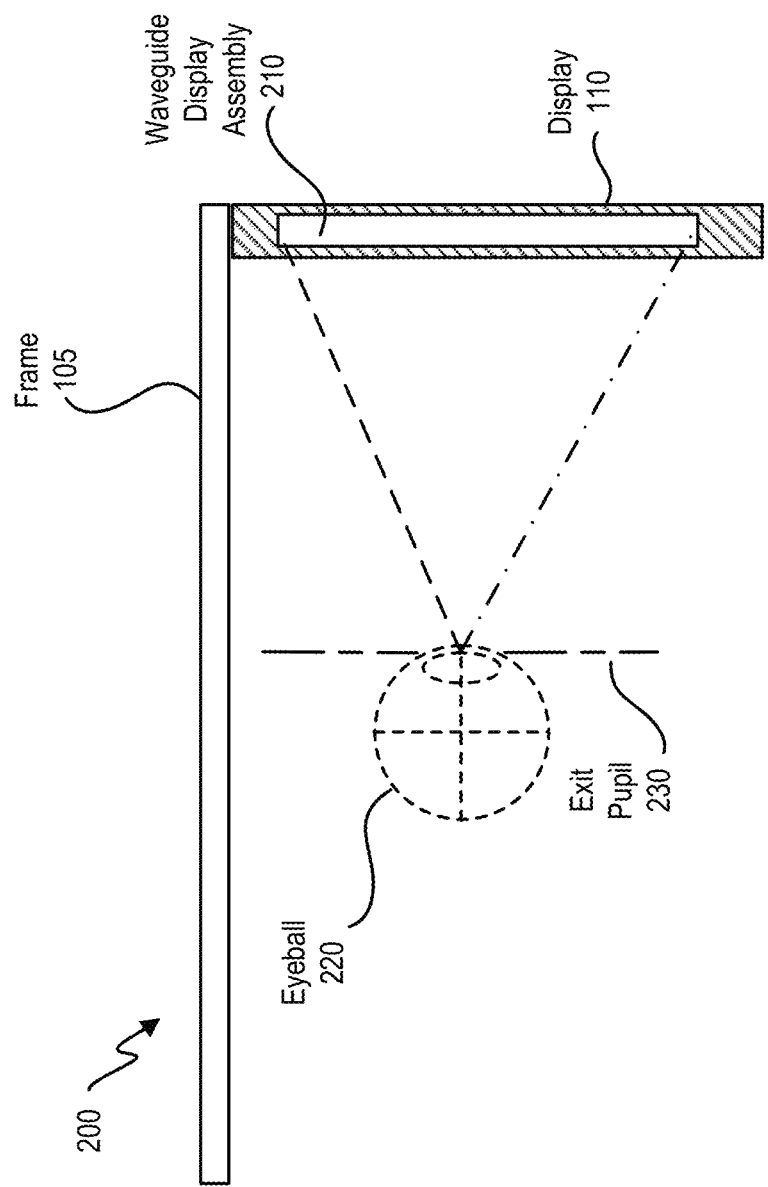
FIG. 2 is an example of a cross section of the near-eye display.

FIG. 2 is an example of a cross section 200 of near-eye display 100 illustrated in FIG. 1. Display 110 includes at least one waveguide display assembly 210. An exit pupil 230 is a location where a single eyeball 220 of the user is positioned in an eyebox region when the user wears the near-eye display 100. For purposes of illustration, FIG. 2 shows the cross section 200 associated eyeball 220 and a single waveguide display assembly 210, but a second waveguide display is used for a second eye of a user.

Waveguide display assembly 210 is configured to direct image light to an eyebox located at exit pupil 230 and to eyeball 220. Waveguide display assembly 210 may be composed of one or more materials (e.g., plastic, glass) with one or more refractive indices. In some examples, near-eye display 100 includes one or more optical elements between waveguide display assembly 210 and eyeball 220.

In some examples, waveguide display assembly 210 includes a stack of one or more waveguide displays including, but not restricted to, a stacked waveguide display, a varifocal waveguide display, etc. The stacked waveguide display is a polychromatic display (e.g., a RGB display) created by stacking waveguide displays whose respective monochromatic sources are of different colors. The stacked waveguide display is also a polychromatic display that can be projected on multiple planes (e.g., multiplanar colored display). In some configurations, the stacked waveguide display is a monochromatic display that can be projected on multiple planes (e.g., multiplanar monochromatic display). The varifocal waveguide display is a display that can adjust a focal position of image light emitted from the waveguide display. In alternate examples, waveguide display assembly 210 may include the stacked waveguide display and the varifocal waveguide display.

Figure 3:
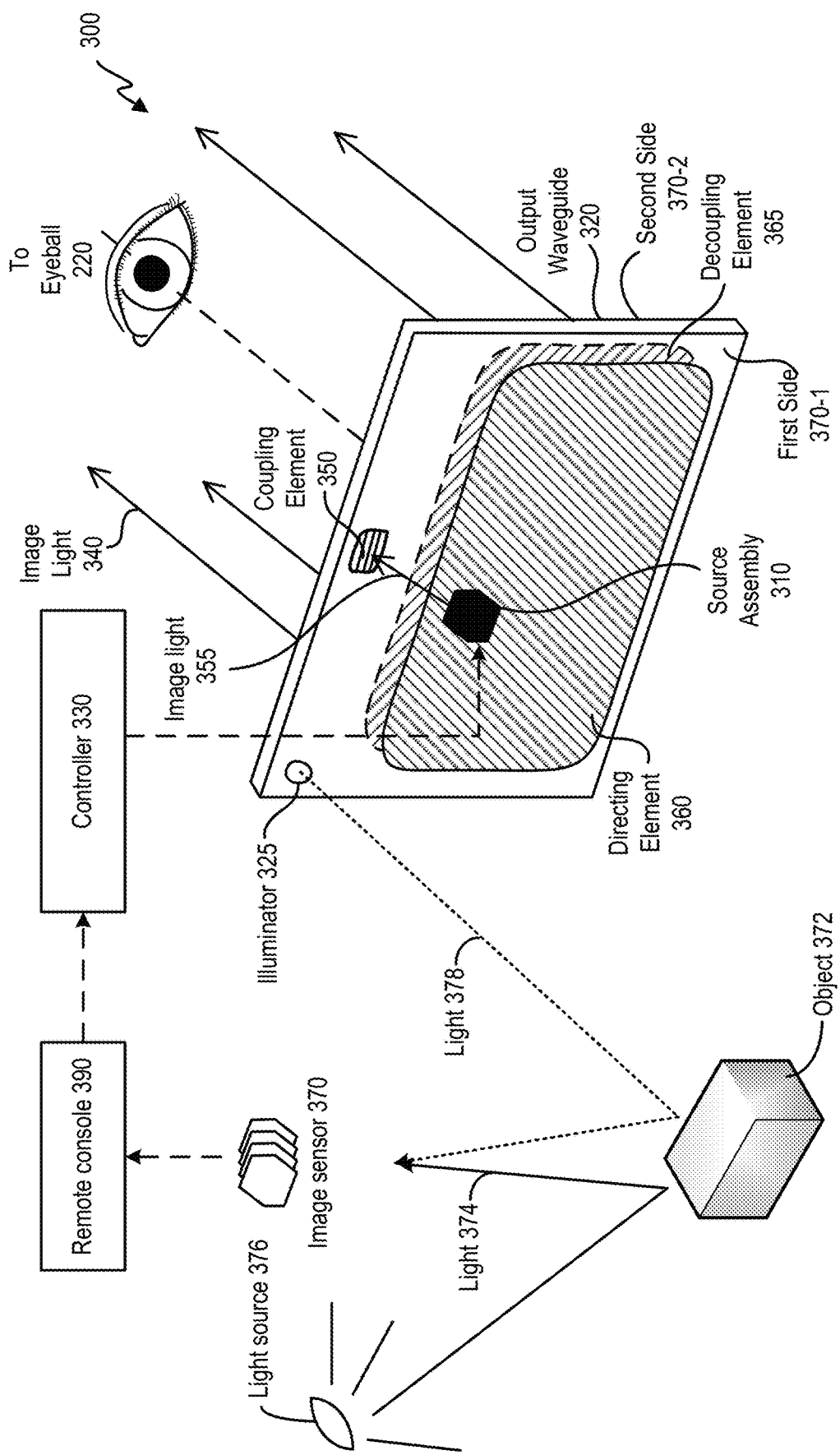
FIG. 3 illustrates an isometric view of an example of a waveguide display with a single source assembly.

FIG. 3 illustrates an isometric view of an example of a waveguide display 300. In some examples, waveguide display 300 is a component (e.g., waveguide display assembly 210) of near-eye display 100. In some examples, waveguide display 300 is part of some other near-eye display or other system that directs image light to a particular location.

Waveguide display 300 includes a source assembly 310, an output waveguide 320, and a controller 330. For purposes of illustration, FIG. 3 shows the waveguide display 300 associated with a single eyeball 220, but in some examples, another waveguide display separate, or partially separate, from the waveguide display 300 provides image light to another eye of the user.

Source assembly 310 generates image light 355. Source assembly 310 generates and outputs image light 355 to a coupling element 350 located on a first side 370-1 of output waveguide 320. Output waveguide 320 is an optical waveguide that outputs expanded image light 340 to an eyeball 220 of a user. Output waveguide 320 receives image light 355 at one or more coupling elements 350 located on the first side 370-1 and guides received input image light 355 to a directing element 360. In some examples, coupling element 350 couples the image light 355 from source assembly 310 into output waveguide 320. Coupling element 350 may be, for example, a diffraction grating, a holographic grating, one or more cascaded reflectors, one or more prismatic surface elements, and/or an array of holographic reflectors.

Directing element 360 redirects the received input image light 355 to decoupling element 365 such that the received input image light 355 is decoupled out of output waveguide 320 via decoupling element 365. Directing element 360 is part of, or affixed to, the first side 370-1 of output waveguide 320. Decoupling element 365 is part of, or affixed to, the second side 370-2 of output waveguide 320, such that directing element 360 is opposed to the decoupling element 365. Directing element 360 and/or decoupling element 365 may be, for example, a diffraction grating, a holographic grating, one or more cascaded reflectors, one or more prismatic surface elements, and/or an array of holographic reflectors.

Second side 370-2 represents a plane along an x-dimension and ay-dimension. Output waveguide 320 may be composed of one or more materials that facilitate total internal reflection of image light 355. Output waveguide 320 may be composed of, for example, silicon, plastic, glass, and/or polymers. Output waveguide 320 has a relatively small form factor. For example, output waveguide 320 may be approximately 50 mm wide along x-dimension, 30 mm long along y-dimension and 0.5-1 mm thick along a z-dimension.

Controller 330 controls scanning operations of source assembly 310. The controller 330 determines scanning instructions for the source assembly 310. In some examples, the output waveguide 320 outputs expanded image light 340 to the user's eyeball 220 with a large field of view (FOV). For example, the expanded image light 340 is provided to the user's eyeball 220 with a diagonal FOV (in x and y) of 60 degrees and/or greater and/or 150 degrees and/or less. The output waveguide 320 is configured to provide an eyebox with a length of 20 mm or greater and/or equal to or less than 50 mm; and/or a width of 10 mm or greater and/or equal to or less than 50 mm.

Moreover, controller 330 also controls image light 355 generated by source assembly 310 based on image data provided by image sensor 370. Image sensor 370 may be located on first side 370-1 and may include, for example, image sensors 120a-120d of FIG. 1A. Image sensors 120a-120d can be operated to perform 2D sensing and 3D sensing of, for example, an object 372 in front of the user (e.g., facing first side 370-1). For 2D sensing, each pixel cell of image sensors 120a-120d can be operated to generate pixel data representing an intensity of light 374 generated by a light source 376 and reflected off object 372. For 3D sensing, each pixel cell of image sensors 120a-120d can be operated to generate pixel data representing a time-of-flight measurement for light 378 generated by illuminator 325. For example, each pixel cell of image sensors 120a-120d can determine a first time when illuminator 325 is enabled to project light 378 and a second time when the pixel cell detects light 378 reflected off object 372. The difference between the first time and the second time can indicate the time-of-flight of light 378 between image sensors 120a-120d and object 372, and the time-of-flight information can be used to determine a distance between image sensors 120a-120d and object 372. Image sensors 120a-120d can be operated to perform 2D and 3D sensing at different times, and provide the 2D- and 3D-image data to a remote console 390 that may be (or may be not) located within waveguide display 300. The remote console may combine the 2D and 3D images to, for example, generate a 3D model of the environment in which the user is located to track a location and/or orientation of the user, etc. The remote console may determine the content of the images to be displayed to the user based on the information derived from the 2D and 3D images. The remote console can transmit instructions to controller 330 related to the determined content.

Based on the instructions, controller 330 can control the generation and outputting of image light 355 by source assembly 310, to provide an interactive experience to the user.

Figure 4:
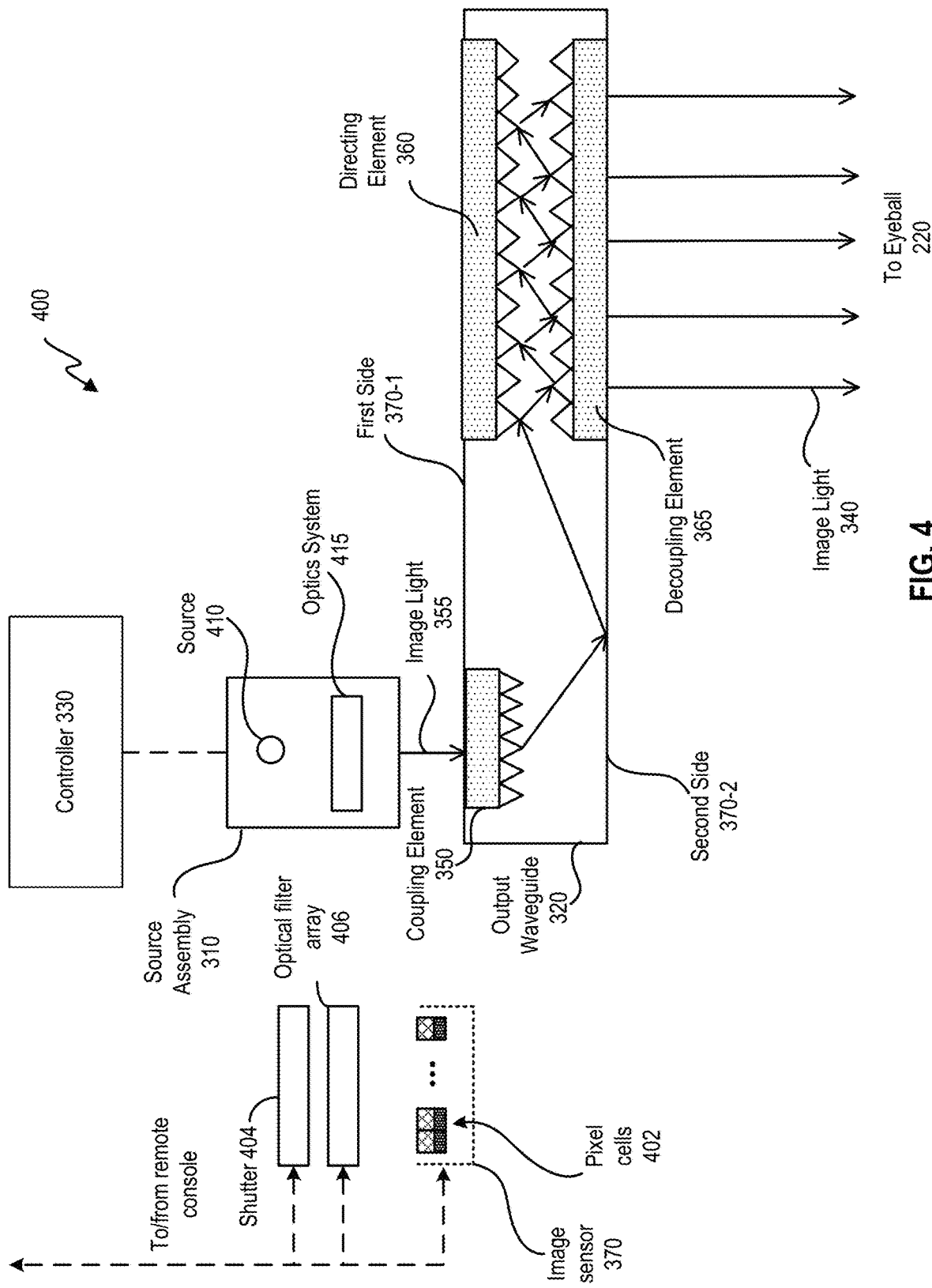
FIG. 4 illustrates a cross section of an example of the waveguide display.

FIG. 4 illustrates an example of a cross section 400 of the waveguide display 300. The cross section 400 includes source assembly 310, output waveguide 320, and image sensor 370. In the example of FIG. 4, image sensor 370 may include a set of pixel cells 402 located on first side 370-1 to generate an image of the physical environment in front of the user. In some examples, there can be a mechanical shutter 404 and an optical filter array 406 interposed between the set of pixel cells 402 and the physical environment. Mechanical shutter 404 can control the exposure of the set of pixel cells 402. In some examples, the mechanical shutter 404 can be replaced by an electronic shutter gate, as discussed below. Optical filter array 406 can control an optical wavelength range of light the set of pixel cells 402 is exposed to, as discussed below. Each of pixel cells 402 may correspond to one pixel of the image. Although not shown in FIG. 4, it is understood that each of pixel cells 402 may also be overlaid with a filter to control the optical wavelength range of the light to be sensed by the pixel cells.

After receiving instructions from the remote console, mechanical shutter 404 can open and expose the set of pixel cells 402 in an exposure period. During the exposure period, image sensor 370 can obtain samples of lights incident on the set of pixel cells 402, and generate image data based on an intensity distribution of the incident light samples detected by the set of pixel cells 402. Image sensor 370 can then provide the image data to the remote console, which determines the display content, and provide the display content information to controller 330. Controller 330 can then determine image light 355 based on the display content information.

Source assembly 310 generates image light 355 in accordance with instructions from the controller 330. Source assembly 310 includes a source 410 and an optics system 415. Source 410 is a light source that generates coherent or partially coherent light. Source 410 may be, for example, a laser diode, a vertical cavity surface emitting laser, and/or a light emitting diode.

Optics system 415 includes one or more optical components that condition the light from source 410. Conditioning light from source 410 may include, for example, expanding, collimating, and/or adjusting orientation in accordance with instructions from controller 330. The one or more optical components may include one or more lenses, liquid lenses, mirrors, apertures, and/or gratings. In some examples, optics system 415 includes a liquid lens with a plurality of electrodes that allows scanning of a beam of light with a threshold value of scanning angle to shift the beam of light to a region outside the liquid lens. Light emitted from the optics system 415 (and also source assembly 310) is referred to as image light 355.

Output waveguide 320 receives image light 355. Coupling element 350 couples image light 355 from source assembly 310 into output waveguide 320. In examples where coupling element 350 is a diffraction grating, a pitch of the diffraction grating is chosen such that total internal reflection occurs in output waveguide 320 and image light 355 propagates internally in output waveguide 320 (e.g., by total internal reflection) toward decoupling element 365.

Directing element 360 redirects image light 355 toward decoupling element 365 for decoupling from output waveguide 320. In examples where directing element 360 is a diffraction grating, the pitch of the diffraction grating is chosen to cause incident image light 355 to exit output waveguide 320 at angle(s) of inclination relative to a surface of decoupling element 365.

In some examples, directing element 360 and/or decoupling element 365 are structurally similar. Expanded image light 340 exiting output waveguide 320 is expanded along one or more dimensions (e.g., may be elongated along x-dimension). In some examples, waveguide display 300 includes a plurality of source assemblies 310 and a plurality of output waveguides 320. Each of source assemblies 310 emits a monochromatic image light of a specific band of wavelength corresponding to a primary color (e.g., red, green, or blue). Each of output waveguides 320 may be stacked together with a distance of separation to output an expanded image light 340 that is multicolored.

Figure 5:
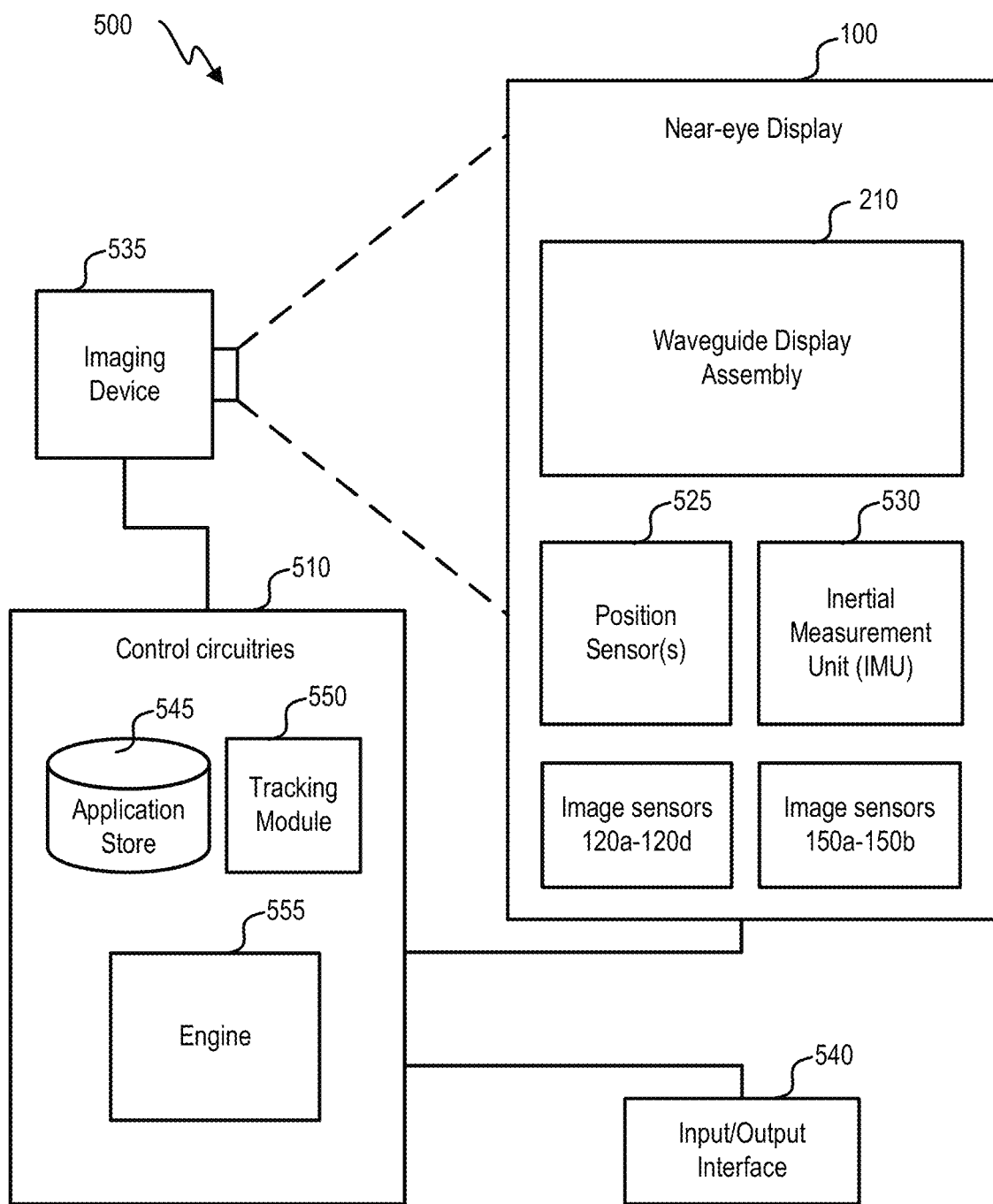
FIG. 5 is a block diagram of an example of a system including the near-eye display.

FIG. 5 is a block diagram of an example of a system 500 including the near-eye display 100. The system 500 comprises near-eye display 100, an imaging device 535, an input/output interface 540, and image sensors 120a-120d and 150a-150b that are each coupled to control circuitries 510. System 500 can be configured as a head-mounted device, a mobile device, a wearable device, etc.

Near-eye display 100 is a display that presents media to a user. Examples of media presented by the near-eye display 100 include one or more images, video, and/or audio. In some examples, audio is presented via an external device (e.g., speakers and/or headphones) that receives audio information from near-eye display 100 and/or control circuitries 510 and presents audio data based on the audio information to a user. In some examples, near-eye display 100 may also act as an AR eyewear glass. In some examples, near-eye display 100 augments views of a physical, real-world environment with computer-generated elements (e.g., images, video, sound).

Near-eye display 100 includes waveguide display assembly 210, one or more position sensors 525, and/or an inertial measurement unit (IMU) 530. Waveguide display assembly 210 includes source assembly 310, output waveguide 320, and controller 330.

IMU 530 is an electronic device that generates fast calibration data indicating an estimated position of near-eye display 100 relative to an initial position of near-eye display 100 based on measurement signals received from one or more of position sensors 525.

Imaging device 535 may generate image data for various applications. For example, imaging device 535 may generate image data to provide slow calibration data in accordance with calibration parameters received from control circuitries 510. Imaging device 535 may include, for example, image sensors 120a-120d of FIG. 1A for generating image data of a physical environment in which the user is located for performing location tracking of the user. Imaging device 535 may further include, for example, image sensors 150a-150b of FIG. 1B for generating image data for determining a gaze point of the user to identify an object of interest of the user.

The input/output interface 540 is a device that allows a user to send action requests to the control circuitries 510. An action request is a request to perform a particular action. For example, an action request may be to start or end an application or to perform a particular action within the application.

Control circuitries 510 provide media to near-eye display 100 for presentation to the user in accordance with information received from one or more of: imaging device 535, near-eye display 100, and/or input/output interface 540. In some examples, control circuitries 510 can be housed within system 500 configured as a head-mounted device. In some examples, control circuitries 510 can be a standalone console device communicatively coupled with other components of system 500. In the example shown in FIG. 5, control circuitries 510 include an application store 545, a tracking module 550, and an engine 555.

The application store 545 stores one or more applications for execution by the control circuitries 510. An application is a group of instructions that when executed by a processor generates content for presentation to the user. Examples of applications include: gaming applications, conferencing applications, video playback applications, or other suitable applications.

Tracking module 550 calibrates system 500 using one or more calibration parameters and may adjust one or more calibration parameters to reduce error in determination of the position of the near-eye display 100.

Tracking module 550 tracks movements of near-eye display 100 using slow calibration information from the imaging device 535. Tracking module 550 also determines positions of a reference point of near-eye display 100 using position information from the fast calibration information.

Engine 555 executes applications within system 500 and receives position information, acceleration information, velocity information, and/or predicted future positions of near-eye display 100 from tracking module 550. In some examples, information received by engine 555 may be used for producing a signal (e.g., display instructions) to waveguide display assembly 210 that determines a type of content presented to the user. For example, to provide an interactive experience, engine 555 may determine the content to be presented to the user based on a location of the user (e.g., provided by tracking module 550), or a gaze point of the user (e.g., based on image data provided by imaging device 535), or a distance between an object and user (e.g., based on image data provided by imaging device 535).

Figure 6A:
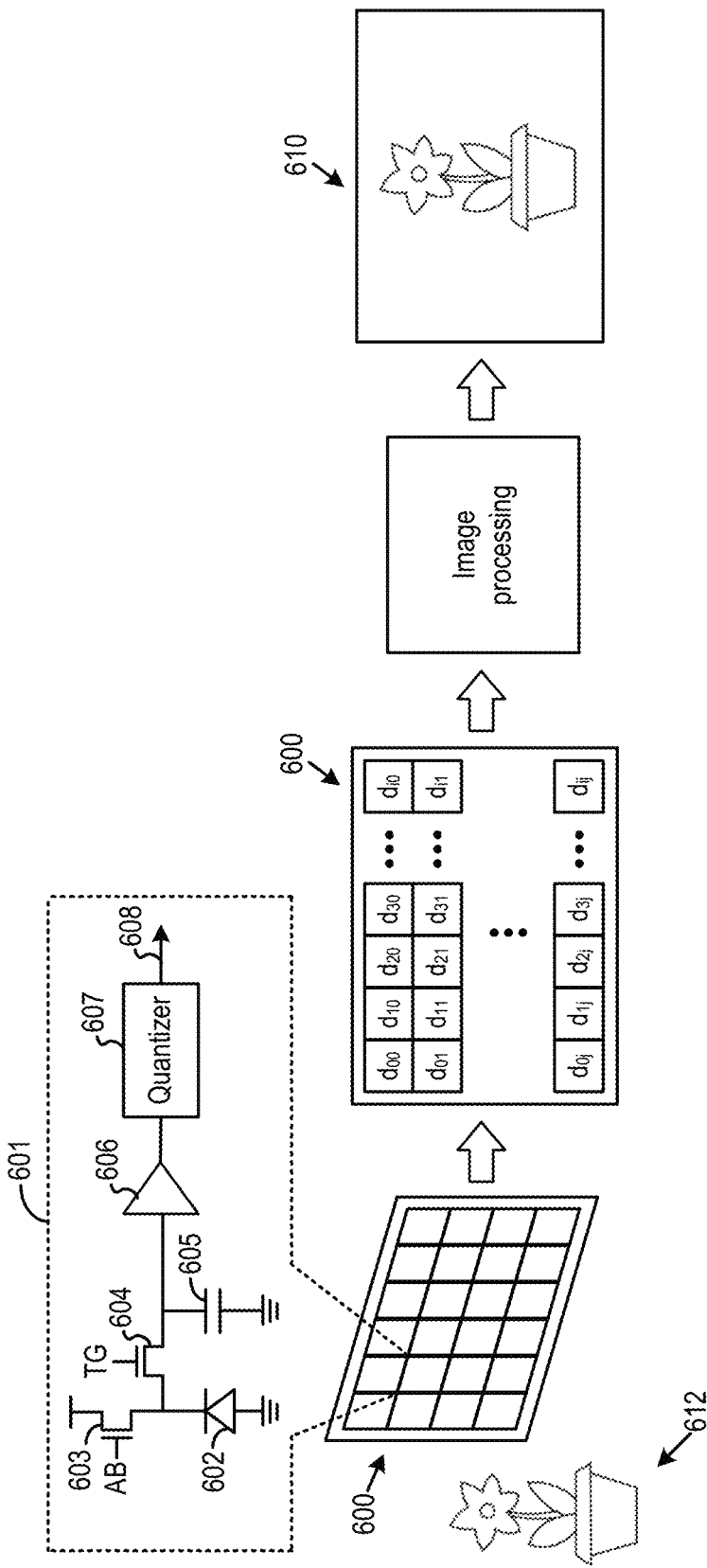
FIG. 6A and FIG. 6B illustrate examples of an image sensor and its operations.
Figure 6B:
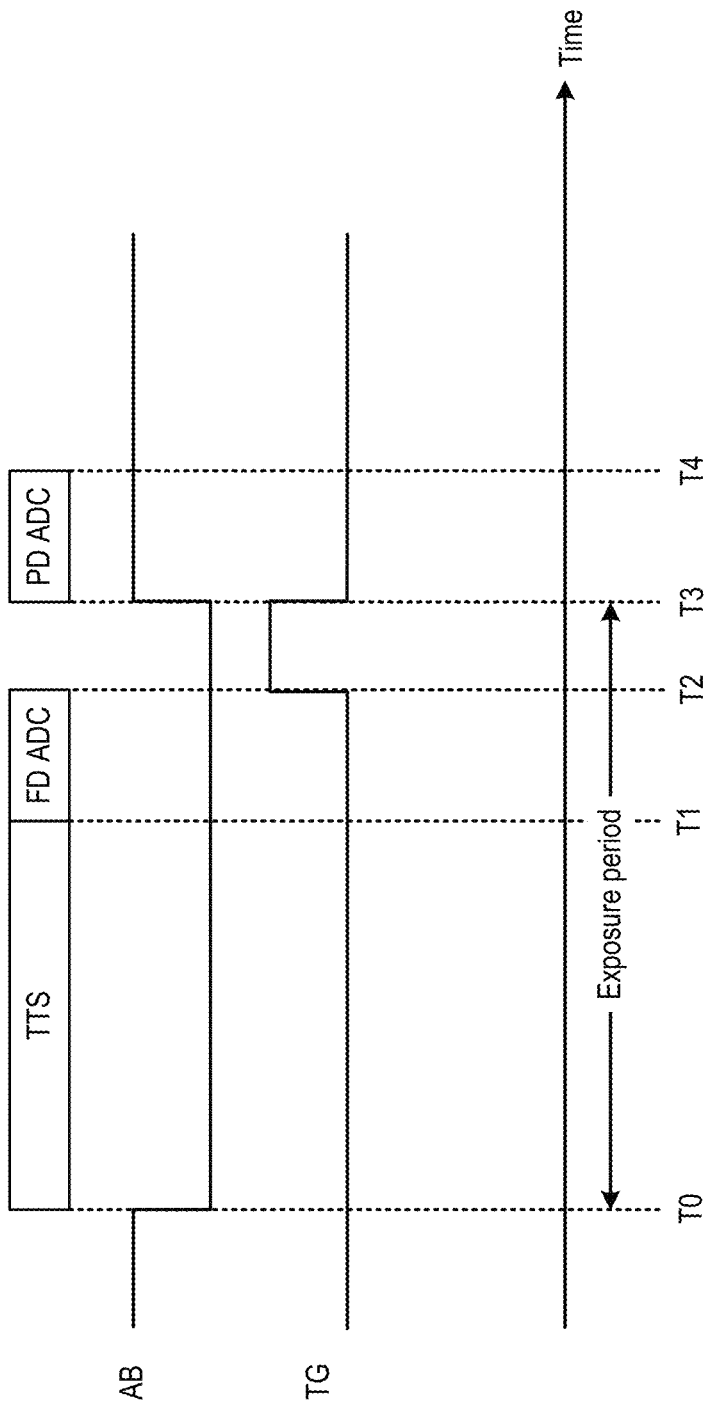

FIG. 6A and FIG. 6B illustrate examples of an image sensor 600 and its operations.

As shown in FIG. 6A, image sensor 600 can include an array of pixel cells, including pixel cell 601, and can generate digital intensity data corresponding to pixels of an image. Pixel cell 601 may be part of pixel cells 402 of FIG. 4. As shown in FIG. 6A, pixel cell 601 may include a photodiode 602, an electronic shutter switch 603, a transfer switch 604, a charge storage device 605, a buffer 606, and a quantizer 607. Photodiode 602 may include, for example, a P-N diode, a P-I-N diode, a pinned diode, etc., whereas charge storage device 605 can be a floating drain node of transfer switch 604. Photodiode 602 can generate and accumulate residual charge upon receiving light within an exposure period. Upon saturation by the residual charge within the exposure period, photodiode 602 can output overflow charge to charge storage device 605 via transfer switch 604. Charge storage device 605 can convert the overflow charge to a voltage, which can be buffered by buffer 606. The buffered voltage can be quantized by quantizer 607 to generate measurement data 608 to represent, for example, the intensity of light received by photodiode 602 within the exposure period.

Quantizer 607 may include a comparator to compare the buffered voltage with different thresholds for different quantization operations associated with different intensity ranges. For example, for a high intensity range where the quantity of overflow charge generated by photodiode 602 exceeds a saturation limit of charge storage device 605, quantizer 607 can perform a time-to-saturation (TTS) measurement operation by detecting whether the buffered voltage exceeds a static threshold representing the saturation limit, and if it does, measuring the time it takes for the buffered voltage to exceed the static threshold. The measured time can be inversely proportional to the light intensity. Also, for a medium intensity range in which the photodiode is saturated by the residual charge but the overflow charge remains below the saturation limit of charge storage device 605, quantizer 607 can perform a fully digital analog to digital converter (FD ADC) operation to measure a quantity of the overflow charge stored in charge storage device 605. Further, for a low intensity range in which the photodiode is not saturated by the residual charge and no overflow charge is accumulated in charge storage device 605, quantizer 607 can perform a digital process meter for analog sensors (PD ADC) operation to measure a quantity of the residual charge accumulated in photodiode 602. The output of one of TTS, FD ADC, or PD ADC operation can be output as measurement data 608 to represent the intensity of light.

FIG. 6B illustrates an example sequence of operations of pixel cell 601. As shown in FIG. 6B, the exposure period can be defined based on the timing of AB signal controlling electronic shutter switch 603, which can steer the charge generated by photodiode 602 away when enabled, and based on the timing of the TG signal controlling transfer switch 604, which be controlled to transfer the overflow charge and then the residual charge to charge storage device 605 for read out. For example, referring to FIG. 6B, the AB signal can be de-asserted at time T0 to allow photodiode 602 to generate charge. T0 can mark the start of the exposure period. Within the exposure period, the TG signal can set transfer switch 604 at a partially-on state to allow photodiode 602 to accumulate at least some of the charge as residual charge until photodiode 602 saturates, after which overflow charge can be transferred to charge storage device 605. Between times T0 and T1, quantizer 607 can perform a TTS operation to determine whether the overflow charge at charge storage device 605 exceeds the saturation limit, and then between times T1 and T2, quantizer 607 can perform a FD ADC operation to measure a quantity of the overflow charge at charge storage device 605. Between times T2 and T3, the TG signal can be asserted to bias transfer switch 604 in a fully-on state to transfer the residual charge to charge storage device 605. At time T3, the TG signal can be de-asserted to isolate charge storage device 605 from photodiode 602, whereas the AB signal can be asserted to steer the charge generated by photodiode 602 away. The time T3 can mark the end of the exposure period. Between times T3 and T4, quantizer 607 can perform a PD operation to measure a quantity of the residual charge.

The AB and TG signals can be generated by a controller (not shown in FIG. 6A) which can be part of pixel cell 601 to control the duration of the exposure period and the sequence of quantization operations. The controller can also detect whether charge storage device 605 is saturated and whether photodiode 602 is saturated to select the outputs from one of the TTS, FD ADC, or PD ADC operations as measurement data 608. For example, if charge storage device 605 is saturated, the controller can provide the TTS output as measurement data 608. If charge storage device 605 is not saturated but photodiode 602 is saturated, the controller can provide the FD ADC output as measurement data 608. If photodiode 602 is not saturated, the controller can provide the PD ADC output as measurement data 608. The measurement data 608 from each pixel cells of image sensor 600 generated within the exposure period can form an image frame. The controller can repeat the sequence of operations in FIG. 6B in subsequent exposure periods to generate subsequent image frames.

The image frame data from image sensor 600 can be processed by a hierarchical set of processing operations. In the hierarchical set of processing operations, a higher-level processing operation (e.g., a second-level processing operation) can be gated or otherwise has a dependency on a lower-level processing outputs by a lower-level processing operation (e.g., first-level processing operation). The higher-level processing outputs can then be provided to support an application, such as a VR/AR/MR application.

Figure 7A:
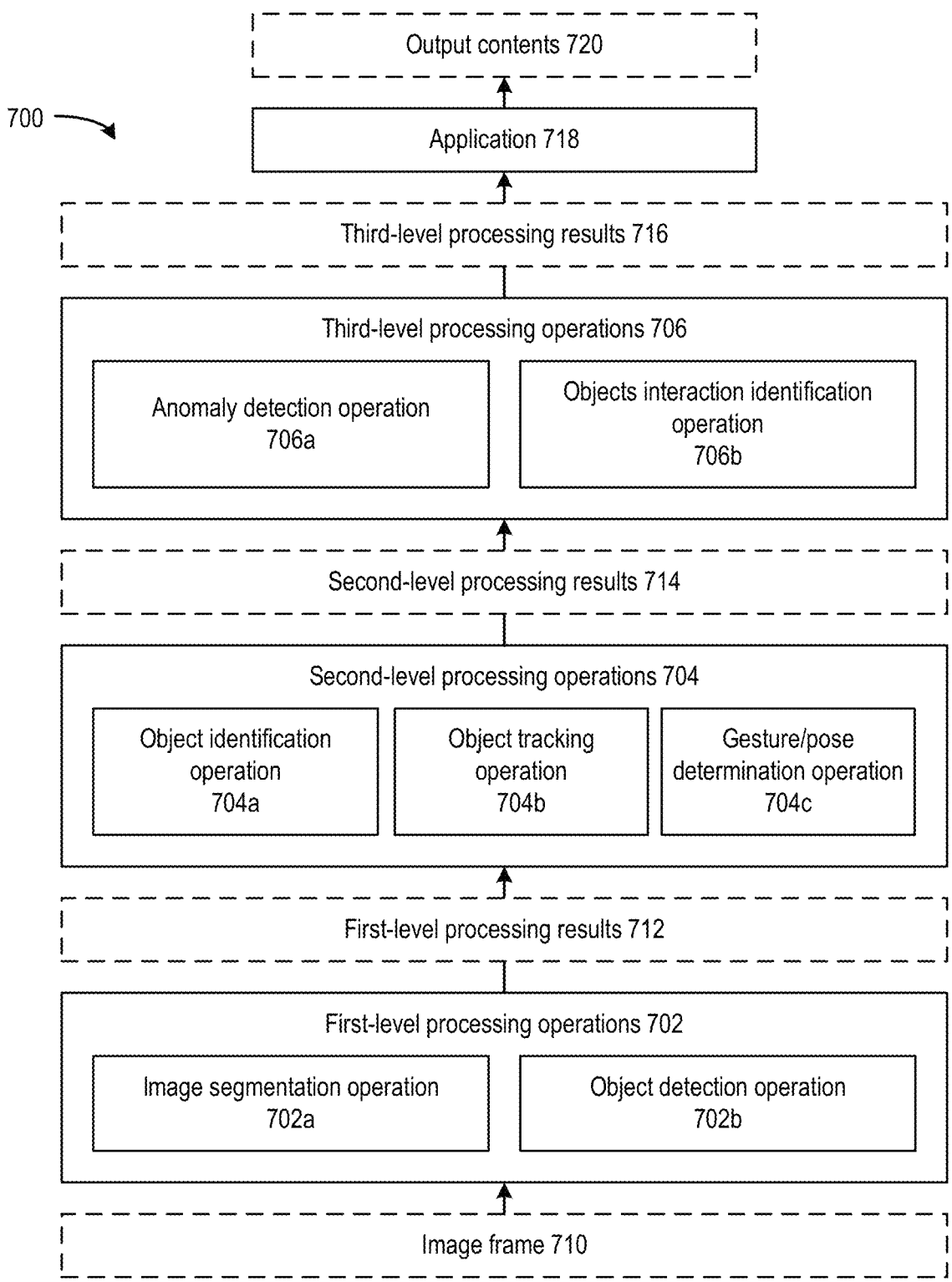
FIG. 7A, FIG. 7B, FIG. 7C, and FIG. 7D illustrate examples of applications supported by the output of image sensor of FIG. 6A and FIG. 6B.
Figure 7B:
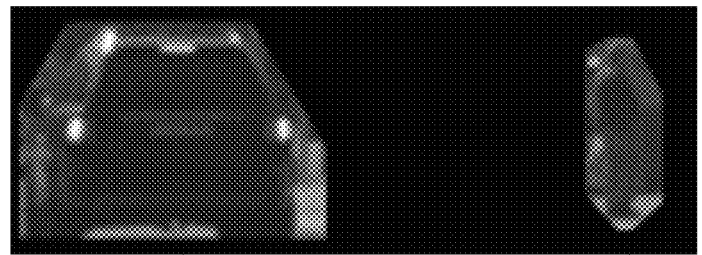
Figure 7B:
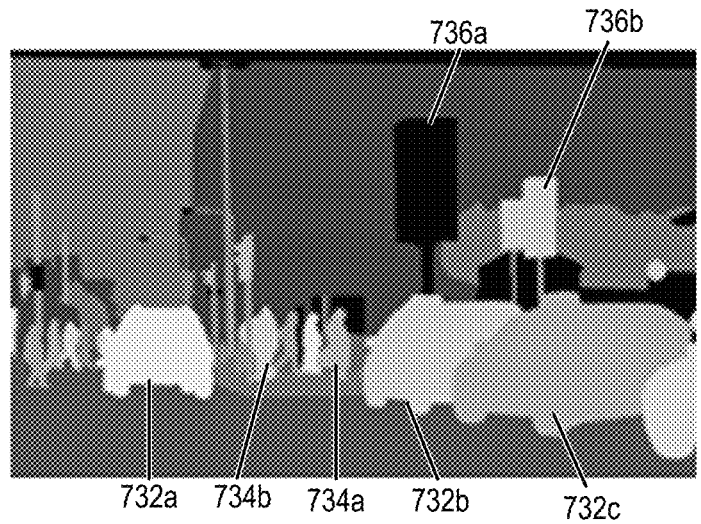
Figure 7B:
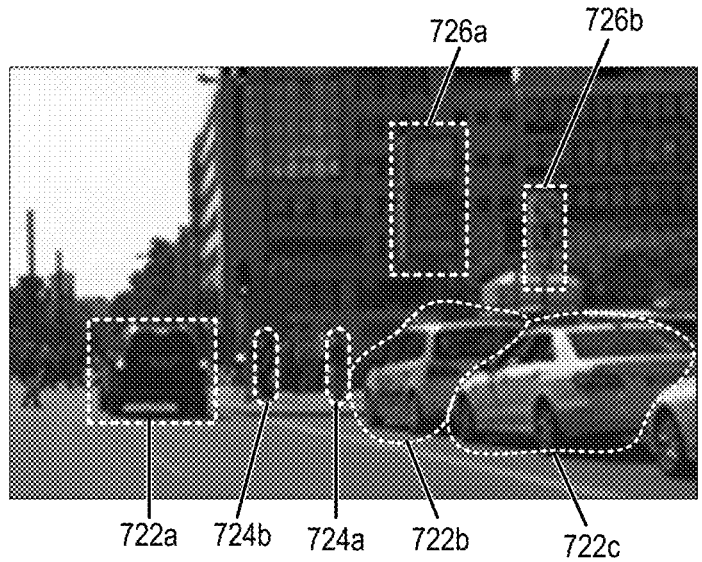

FIG. 7A and FIG. 7B illustrate an example hierarchical set of processing operations 700. As shown in FIG. 7A, hierarchical set of processing operations 700 can include first-level processing operations 702, second-level processing operations 704, and third-level processing operations 706. First-level processing operations 702 can be performed on image frame 710 to output candidate pixel locations of pixel segments of objects of interest in first-level processing outputs 712. Second-level processing operations 704 can process the pixels in those pixel segments to, for example, identify the pixels and pixel locations of the objects of interests, track the movements of the objects of interests, and/or identify a gesture/pose of an object if the object is a body part (e.g., a hand). The identification/tracking results of the objects of interest are included in second-level processing outputs 714. Third-level processing operations 706 can determine positional relationships among the identified objects of interest based on second-level processing outputs 714, and generate third-level processing outputs 716 based on the positional relationships. Third-level processing outputs 716 can include, for example, a contextual information of a scene imaged in image frame 710. Third-level processing outputs 716 can be forwarded to an application 718 to determine output contents 720.

Specifically, first-level processing operations 702 can be performed on image frame 710 to determine candidate pixel locations of objects of interest. First-level processing operations 702 may include, for example, an image segmentation operation 702a, an object detection operation 702b, etc. Image segmentation operation 702a can classify each pixel in image frame 710 to one of different classes of objects and, based on the classification, determine segments of pixels each belonging to a particular class of objects. The classification can be based on various techniques such as, for example, thresholding, clustering, etc., of the pixels. In addition, objection detection operation 702b can distinguish between different objects of the same class within a particular pixel segment. Object detection operation 702b can be performed based on, for example, identifying boundaries between objects based on color differences between pixels, pre-determined shapes/sizes of the objects of interest, etc.

For example, referring to FIG. 7B, image frame 710 can depict a scene including vehicles (e.g., vehicles 722a, 722b, and 722c), pedestrians (e.g., pedestrians 724a and 724b), and street fixtures (e.g., street fixtures 726a and 726b). As a result of image segmentation operation 702a and object detection operation 702b, image frame 710 can be partitioned into multiple pixel segments each corresponding to an object. For example, as shown in segmentation map 730, pixel segments 732a, 732b, 732c are determined to be pixel segments of three different vehicles, pixel segments 734a and 734b are determined to be pixel segments of two different pedestrians, whereas pixel segments 736a and 736b are determined to be pixel segments of two different street fixtures. In addition, first-level processing outputs 712 can also indicate a motion state of each pixel segment. For example, first-level processing outputs 712 can indicate that pixel segments 734a is moving (due to movement of vehicle 722a), while pixel segments 732b and 732c are static (due to vehicles 722b and 722c being parked). As such, first-level processing outputs 712 can indicate the pixel locations of pixel segments of different objects detected (e.g., vehicles, pedestrians, street fixtures, hands, rugs, utensil), the classes of the objects, and their motion states. The pixel locations can be candidate pixel locations for objects of interest.

Referring back to FIG. 7A, second-level processing operations 704 can process the pixel segments at the candidate pixel locations indicated in first-level processing outputs 712 to generate second-level processing outputs 714. Second-level processing operations 704 can include, for example, object identification operation 704a, object tracking operation 704b, and gesture/post determination operation 704c. Object identification operation 704a can determine the pixel segments corresponding to object of interests based on, for example, detecting certain image features in the pixel segments. For example, in the example of FIG. 7B, the objects of interests are vehicle 722a and pedestrian 724a. Object identification operation 704a can determine that pixel segment 732a corresponds to vehicle 722a based on, for example, determining the license plate number, make, model, of the vehicle depicted in pixel segment 732a and matching those information with those of vehicle 722a. Likewise, object identification operation 704a can determine that pixel segment 734a corresponds to pedestrian 724a based on, for example, determining the clothing, accessories, facial features, etc., of the pedestrian depicted in pixel segment 734a and matching those information with those of pedestrian 724a.

In addition, object tracking operation 704b can track the locations/movements of the identified objects of interest across multiple image frames including image frame 710. The tracking can be based on, for example, tracking a history of the pixel locations of the pixel segments for the objects of interest across the image frames. The tracking can also be assisted by motion state information provided in first-level processing operations 702. As shown in FIG. 7B, the tracking result including, for example, regions of interests (ROIs) identifying the objects (e.g., vehicle 722a and pedestrian 724a), their locations, speed and direction of movements, etc., can be included in second-level processing outputs 714. Further, in a case where the objects of interest being tracked include body parts (e.g., a hand), gesture/pose determination operation 704c can determine a gesture/pose of the body part based on, for example, matching the image of body part with different images representing different poses/gestures of the body part.

Referring back to FIG. 7A, third-level processing operations 706 can determine positional relationships among the identified objects of interest, represented by the regions of interests of those objects in image frame 710, based on second-level processing outputs 714. Third-level processing operations 706 can then determine contextual information of a scene imaged in image frame 710 based on the positional relationships as well as other information, such as location information (e.g., from a map), movement and orientation information (e.g., from a motion sensor, an inertia measurement unit (IMU)), and provide the contextual information as part of third-level processing outputs 716. Third-level processing operations 706 can include an anomaly detection operation 706a and an objects interaction identification operation 706b. Anomaly detection operation 706a can detect the occurrence of an anomaly event based on, for example, the positional relationship between ROIs of different classes of objects, trajectories/positions of ROIs of various objects departing from their expected trajectories/positions, etc. For example, referring to FIG. 7B, an anomaly event can be detected based on the following example positional relationships between regions of interests of a vehicle (e.g., vehicle 722a) and of a pedestrian (e.g., pedestrian 724a), and based on information indicating that image frame 710 of FIG. 7B depicts a street scene:

1. Object of certain class is occluded by another object/person: For example, ROI of pedestrian 724a is encircled by ROI of vehicle 722a.

2. Object of certain class is adjacent to a human: For example, ROI of pedestrian 724a is next to ROI of vehicle 722a, which may indicate that pedestrian 724a is manipulating vehicle 722a (e.g., to attempt a vehicle break-in).

3. Tracking failure of an object of interest: For example, the features of pedestrian 724a or vehicle 722a cannot be detected in their ROIs, the ROI of a supposed static object (e.g., vehicles 722b and 722c) moves across frames, etc.

4. Changes in segmentation map 730: For example, object of certain class, such as pedestrian 724*a* and vehicles 722*b* and 722*c* have disappeared in segmentation map 730.

In addition, objects interaction identification operation 706*b* can determine an interaction between objects, based on the positional relationships. For example, based on the distance between ROIs of two objects being below a threshold, objects interaction identification operation 706*b* can determine that there is an interaction between the two objects.

The contextual information can be provided to application 718, which can generate output contents 720 based on the contextual information. For example, in a case where an anomaly event is detected in FIG. 7B, application 718 can output a warning.

Figure 7C:
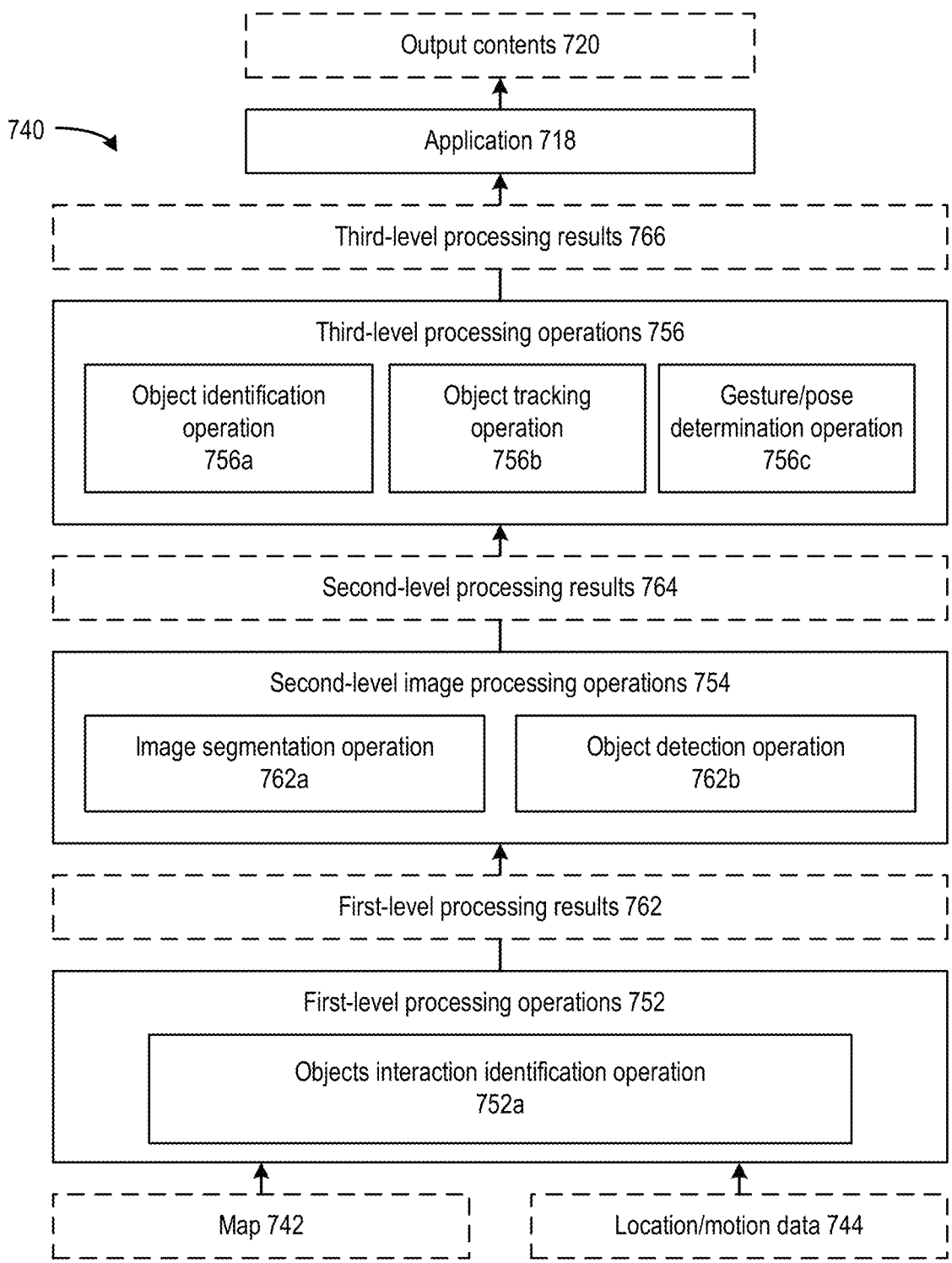
Figure 7D:
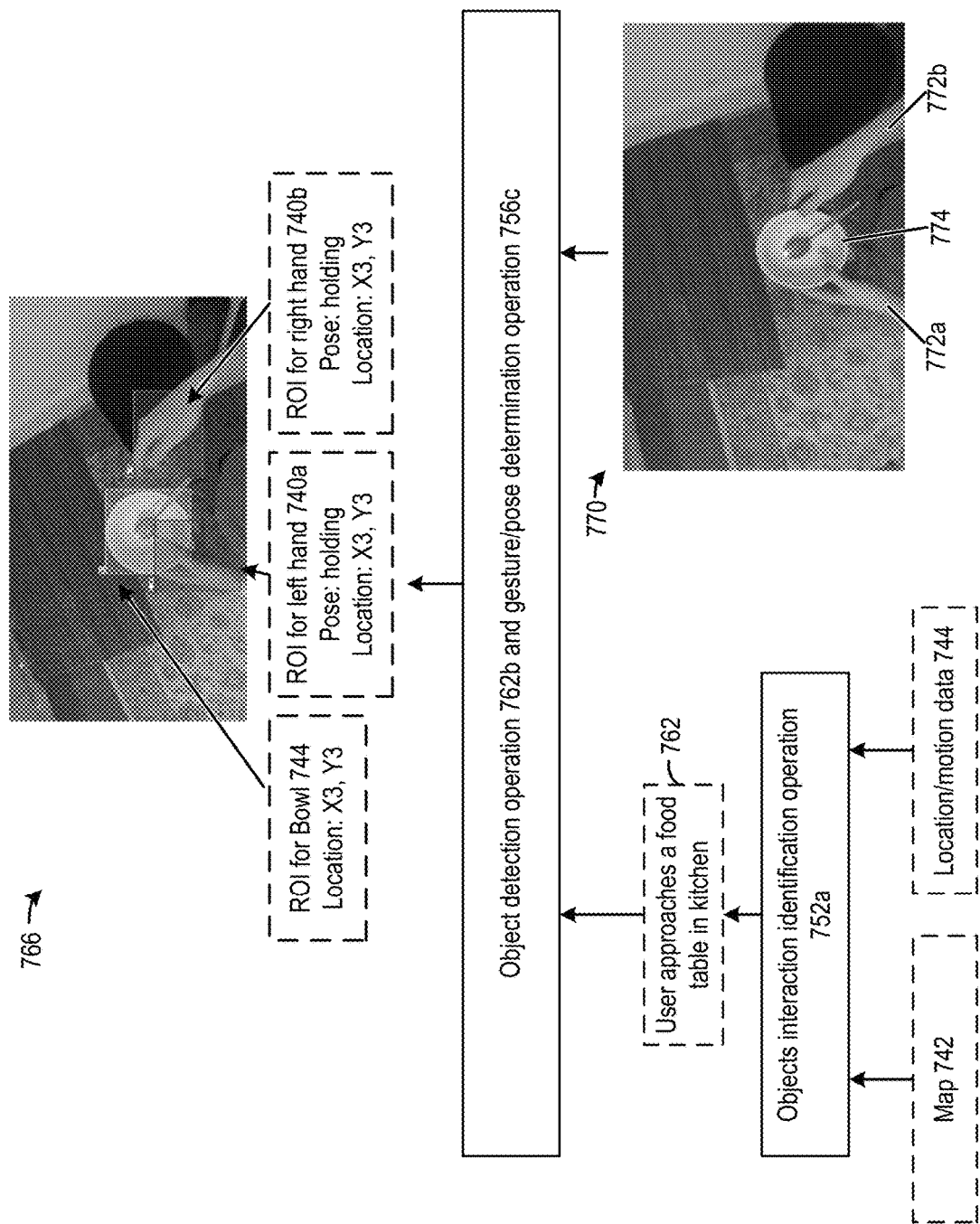

FIG. 7C and FIG. 7D illustrate another example hierarchical set of processing operations 740. As shown in FIG. 7C, hierarchical set of processing operations 750 can include first-level processing operations 752, second-level processing operations 754, and third-level processing operations 756. First-level processing operations 752 can be performed based on a pre-scanned map 742 of an environment including the locations of various physical objects, as well as location/motion data 744 of the user, to generate first-level processing outputs 762. The location/motion data 744 can be received from, for example, a motion sensor (e.g., an inertial measurement unit (IMU)). First-level processing operations 752 can include, for example, an objects interaction identification operation 752*a*, which can determine positional relationship between the user and the physical objects based on map 742 and location/motion data 744, and determine an interaction between the user and the physical objects. Referring to FIG. 7D, based on map 742 and location/motion data 744, objects interaction identification operation 752*a* can determine the user approaches a food table in a kitchen as part of first-level processing outputs 762. In some examples, first-level processing operations 752 can also be performed on samples of an image frame (e.g., image frame 770) to determine approximate locations of objects of interests (e.g., hands, food table, etc.), and determine the interaction based on the approximate locations.

Upon generating first-level processing outputs 762, second-level processing operations 754 can be performed. Second-level processing operations 754 can include, for example, an image segmentation operation 762*a*, an object detection operation 762*b*, etc. Both operations can be performed on an image frame, such as image frame 770, and based on first-level processing outputs 762. For example, referring to FIG. 7D, based on first-level processing outputs 762 indicating that the user approaches a food table in kitchen, object detection operation 762*b* can detect objects belonging to the class of hands and utensils, such as left hand 772*a*, right hand 772*b*, and a bowl 774. The detection result can be included in second-level processing outputs 764.

Following the generation of second-level processing outputs 764, third-level processing operations 756 can be performed. Third-level processing operations 756 can include, for example, object identification operation 756*a*, object tracking operation 756*b*, gesture/pose determination operation 756*c*, etc. Referring back to FIG. 7D, gesture/pose determination operation 756*c* can determine that both left hand 772*a* and right hand 772*b* are holding bowl 774, as third-level processing outputs 766. Third-level processing outputs 766 can be forwarded to an application 718 to determine output contents 720. For example, based on determining that the user is holding a bowl, application 718 can output assist information as part of output content 720, such as indicating the location of food table, to assist the user in locating the food table to pick up food.

The accuracy of hierarchical set of processing operations 700 and 740 (e.g., in detecting objects of interests, determining contextual information), as well as the performance of application 718 that relies on the processing outputs, can benefit from improved spatial and temporal resolutions of the imaging sensing operations. Specifically, by improving the spatial resolutions of the imaging sensing operations, each image frame can include more pixels to capture object features at high resolution, which can improve the accuracies of the aforementioned object/gesture detection and identification operations. Moreover, by improving the temporal resolution of the image sensing operations, the images can be captured and processed at a higher frame rate, which allow detection/tracking of high speed events/objects (e.g., a fast-moving object, an abrupt event) across image frames. All these can improve the accuracy of the processing operations, as well as the performance of the application that relies on the processing outputs However, the generation of high-resolution image frames at a high frame rate, as well as the transmission and processing of these high-resolution image frames, can lead to huge power consumption by the image sensor and by the image processor and require huge amount of computation and memory resources. Specifically, to increase the spatial resolution, the image sensor may need to include a larger number of pixel cells, which consumes more power. Moreover, a huge volume of pixel data is generated and transmitted for each image frame, more power is consumed in the transmission of the pixel data from the image sensor to the image processor. More memory resources are needed to store the huge volume of pixel data, and more computation resources are needed to perform the entire hierarchical set of image processing operations on the huge volume of pixel data. The power consumption of the image sensing and processing operations, as well as the amount of computation and memory resources required by the operations, can further increase when the high-resolution image frames are generated and processed at a high frame rate, as more pixel data are generated, transferred, and processed within a given period of time.

Moreover, statically capturing full-pixel image frames and performing the entire hierarchical set of image process operations on the full-pixel image frames can lead to inefficiency. Specifically, typically only a small subset of the pixels contains the image of the objects of interest, while the rest of the pixels either do not include relevant data for the contextual information or otherwise do not include useful information for the upstream application. Spending power to repeatedly capture and process pixels that are not useful for the upstream application can lead to waste of power and degrade the overall efficiency of the image sensing and processing operations. All these make it challenging to implement a high-resolution image sensing and processing system on a mobile/wearable platform where available power as well as computation and memory resources are limited.

Figure 8A:
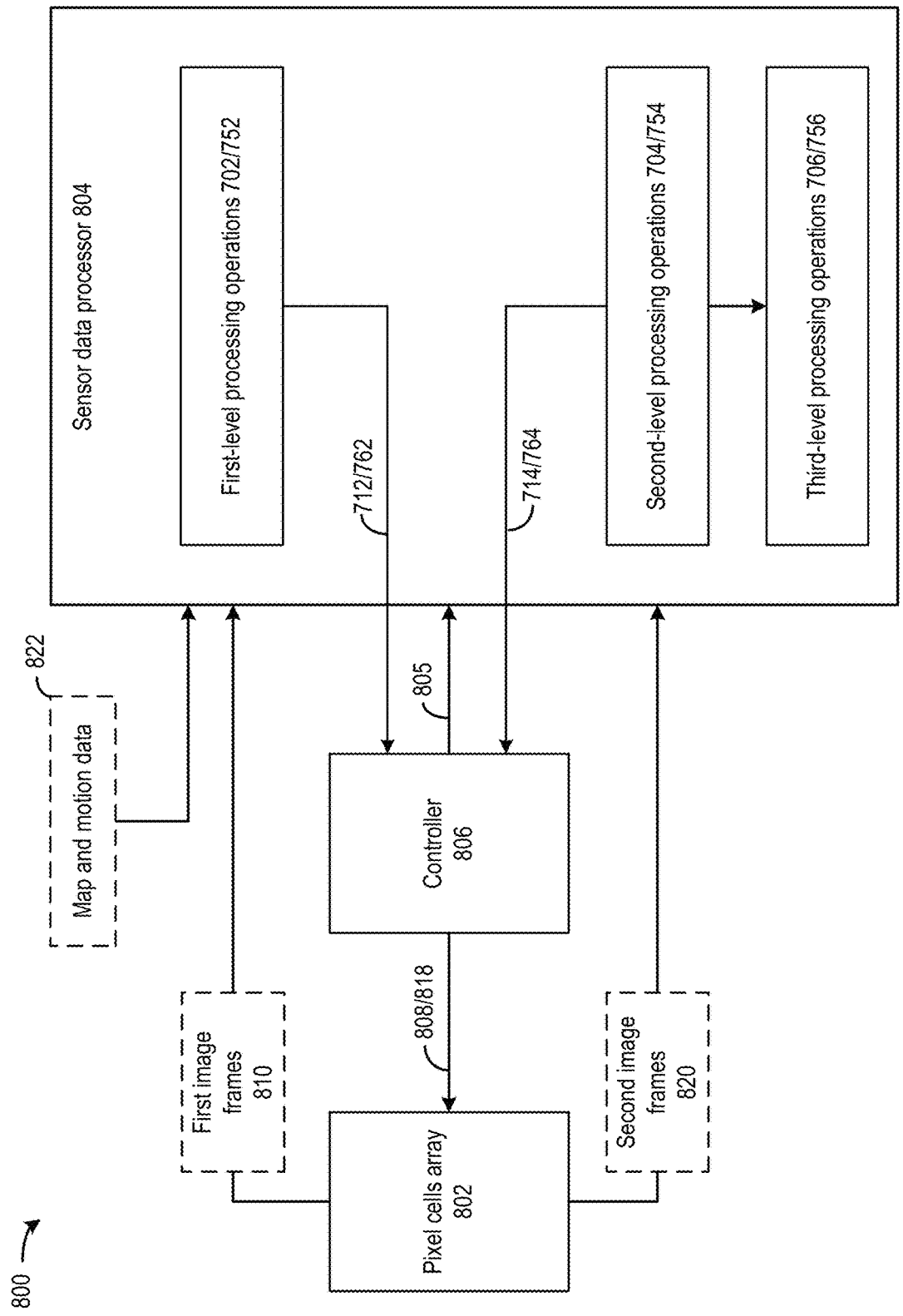
FIG. 8A, FIG. 8B, and FIG. 8C illustrate examples of an imaging system and its operations.

FIG. 8A illustrates an example imaging system 800 that can address at least some of the issues above. As shown in FIG. 8A, imaging system 800 includes an array of pixel cells 802, a sensor data processor 804, and a controller 806. Each pixel cell of array of pixel cells 802 can include, for example, some or all of the components of pixel 601 of FIG. 6A and is configured to perform an image sensing operation. As to be described below, one or more attributes of the image sensing operation is configurable based on an image sensing configuration from controller 806. The one or more attributes may include, for example, whether the entirety of the array of pixel cells or a subset of the pixel cells is enabled to perform the image sensing operation, a quantization resolution of the pixel cell output, exposure period duration, frame rate, etc., and can be configured based on different image sensing configurations. Moreover, image processor 804 is configured to execute a hierarchical set of image processing operations, such as hierarchical set of processing operations 700 of FIG. 7A, including first-level processing operations 702 and second-level processing operations 704. Based on a control signal 805 from controller 806, image processor 804 can execute one of first-level processing operations 702 and second-level processing operations 704.

Controller 806 is configured to control pixel cells array 802 and image processor 804 to perform a dynamic and hierarchical sensing and processing operation. In some example, controller 806 can transmit a first image sensing configuration 808 to pixel cells array 802, which can capture one or more first image frames 810 based on first image sensing configuration 808. Pixel cells array 802 can transmit first image frames 810 to sensor data processor 804, which can execute first-level processing operations 702 to generate first-level processing outputs 712. If first-level processing outputs 712 satisfy a certain condition, controller 806 can generate a second image sensing configuration 818 and transmit second image sensing configuration 818 to pixel cells array 802, which can capture one or more second image frames 820 based on second image sensing configuration 818. Controller 806 can also transmit control signal 805 to sensor data processor 804 to enable second-level processing operations 704 on second image frames 820 to generate second-level processing outputs 714.

Specifically, in some examples, first-image sensing configuration 808 can configure each pixel cell of pixel cells array 802 to perform an image sensing operation to generate pixel data of first image frames 810 as full-pixel images at a low frame rate (e.g., at 1-10 frames per second). Image processor 804 can perform first-level processing operations 702 at the low frame rate on first image frames 810, which contain full-pixel frames, to detect one or more objects of a target class (e.g., a vehicle, a person, a body part) from the first image frames. If controller 806 determines, based on first-level processing outputs 712, that a target object is in the first image frames, controller 806 can generate second-image sensing configuration 818. In some examples, controller 806 can determine pixel locations of ROI including the pixels of the target object in the first image frames, and include the pixel locations of the ROI in the second image sensing configuration. Using the second-image sensing configuration, controller 806 can select a subset of pixel cells of pixel cells array 802 corresponding to the ROIs to perform the image sensing operation, to generate second image frames 820 as sparse images at a high frame rate (e.g., 30-10,000 frames per second), while the rest of pixel cells array 802 are not selected to perform the image sensing operation. In some examples, controller 806 can also select the subset of pixel cells based on a sub-sampling operation to lower the spatial resolution of the image sensing operation. Controller 806 can then transmit control signal 805 to image processor 804 to start second-level processing operations 704 on second image frames 820 to, for example, identify the target object, track a movement of the target object, determine a gesture/pose of the target object, etc.

In some examples, imaging system 800 can implement a two-tier feedback system comprising a slow feedback loop and a fast feedback loop. Imaging system 800 can operate in a slow feedback loop when pixel cells array 802 performs the image sensing operations according to first-image sensing configuration 808 to generate first image frames 810 as full-pixel frames at the low frame rate, and when image processor 804 performs first-level processing operations 702 on first-image frames 810. Imaging system 800 can also operate in a fast feedback loop when pixel cells array 802 performs the image sensing operations according to second-image sensing configuration 818 to generate second-image frames 820 as sparse frames at the high frame rate, and when image processor 804 performs second-level processing operations 704 on second-image frames 820.

Figure 8B:
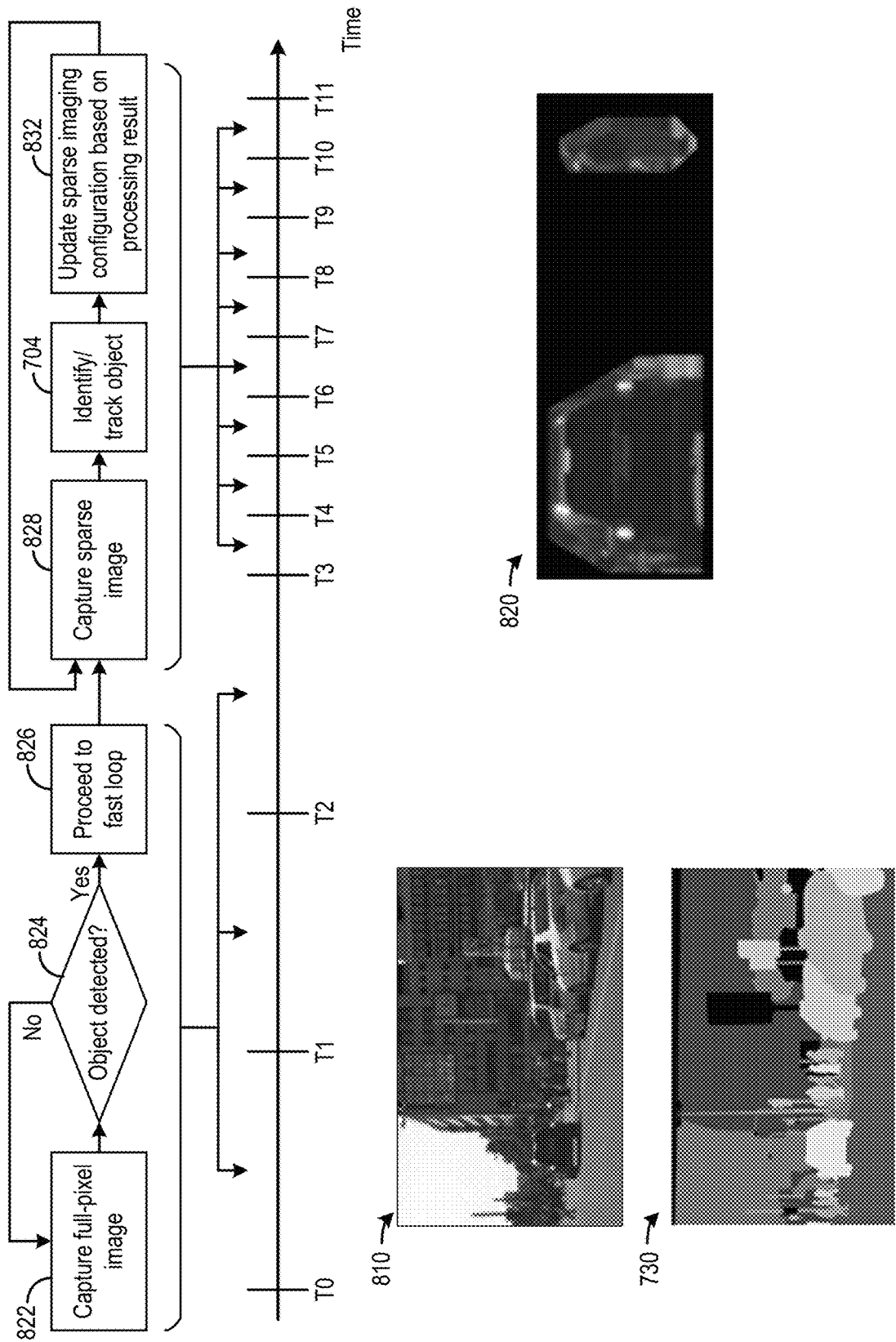

FIG. 8B illustrates an example of operations of imaging system 800 according to the two-tier feedback system. Referring to FIG. 8B, between each of time intervals T0-T1, T1-T2, and T2-T3, imaging system 800 can implement a slow feedback loop. Between each of the intervals, pixel cells array 802 can perform a first-image sensing operation 822 according to first-image sensing configuration 808 to capture a first-image frame 810 as a full-pixel image frame. The duration of each interval can be defined by the low frame rate (e.g., 1-10 frames per second) at which first image frames 810 are captured. Within time interval T0-T1, image processor 804 can perform first-level processing operations 702 on first-image frames 810 to generate, for example, segmentation map 730 and candidate pixel locations for pixel segments of objects of interest in first-level processing outputs 712, as described above. Controller 806 can examine the shape/size of pixel segments at the candidate pixel locations to determine whether a target object is detected in operation 824. If the target object is not detected, controller 806 can transmit first-image sensing configuration 808 to pixel-cells array 802 to repeat first-image sensing configuration 808 to capture a subsequent first-image frame 810, followed by first-level processing operations 702 on the subsequent first-image frame 810, at time interval T1-T2, and then again at time interval T2-T3.

On the other hand, if controller 806 determines that a target object is detected (in operation 824), controller 806 can stop the slow feedback loop and proceed to the fast feedback loop in operation 826. In FIG. 8B, controller 806 completes the slow feedback loop between time intervals T2-T3 and start the fast feedback loop between times T3-T4. To start the fastback loop, controller 806 can generate second-image sensing configuration 818 to select a subset of pixel cells of pixel cells array 802 to perform a second-image sensing operation 828 to capture a second-image frame 820 as a sparse image frame at a high frame rate (e.g., 30-10,000 frames per second). As described above, in some examples controller 806 can determine pixel locations of regions of ROI including the pixels of the target object in the first image frames, and include the pixel locations of the ROI in the second-image sensing configuration. The selected subset of pixels can correspond to the pixel locations of the ROI. In some examples, controller 806 can also select the subset of pixel cells based on a sub-sampling operation to lower the spatial resolution of the image sensing operation. Controller 806 can also control image processor 804 to perform second-level processing operations 704 on second image frame 820, to obtain second-level processing outputs 714.

At the interval between times T3 and T4, controller 806 can determine whether second-level processing outputs 714 indicate that subset of pixel cells captures the target object in the second image frames. The controller can make the determination based on, for example, whether the active pixel data in the sparse image frames include all (or a threshold amount) of features of the target object and update the selection of the subset of pixel cells in second-image sensing configuration 818 in operation 832. Specifically, the controller may maintain a motion model to determine the expected pixel locations of the target object in the second image frames, and update the selection of the subset of pixel cells for capturing of subsequent second image frames based on the motion model. If second-level processing outputs 714 indicate that the subset of pixel cells does not capture the target object in the second image frame, controller 806 can determine a deviation between the actual and expected pixel locations of the target object, update the motion model based on the deviation, and update the selection of the subset of pixel cells based on the updated motion model. Controller 806 can then restart second-image sensing operation 828 using the updated second-image sensing configuration 818 in the next time interval (e.g., between times T4 and T5). Operations 828, 704, and 832 can be performed in each of time intervals T3-T4, T4-T5, T5-T6, T6-T7, T7-T8, T8-T9, T9-T10, T10-T11, etc., with the duration of each time interval defined based on the high frame rate.

In the examples of FIG. 8A and FIG. 8B, following second-level processing operations 704 and the generation of second-level processing outputs 714, sensor data processor 804 can then perform third-level processing operations 706 to determine positional relationships among the identified objects of interest represented by the regions of interests of those objects in the image frames, and then determine contextual information based on the positional relationships as well as other information 822 such as location information (e.g., from a map), movement and orientation information (e.g., from a motion sensor, an inertia measurement unit (IMU)). The contextual information can include, for example, an interaction between objects, the occurrence of an event (e.g., an anomaly), etc. The contextual information can be provided to an upstream application to determine output contents, such as assistance data to assist a user (e.g., to look for food in a kitchen), warning about an anomaly event, etc. In some examples, third-level processing operations 706 can be performed as part of the fast feedback loop and based on second-level processing outputs 714 of each second image frame 820. In some examples, third-level processing operations 706 can also be performed outside the fast feedback loop and based on second-level processing outputs 714 of several second image frames 820 to determine contextual information.

In some examples, controller 806 can also control sensor data processor 804 to determine context information as part of first-level processing operations 752, followed by an image processing operation as second-level processing operation 754. For example, based on map and motion data 822, sensor data processor 804 can output, as part of first-level processing outputs 762, an indication that a substantial change in the user's location has occurred. Controller 806 can then generate first image sensing configuration 810 to control pixel cells array 802 to capture first image frames 810 as full-pixel frames to increase the spatial resolution and/or quantization resolution of the image sensing operations at the array of pixel cells, whereas if the user is static, the controller can reduce the spatial resolution and/or quantization of the image sensing operations. Controller 806 can then transmit control signals 805 to sensor data processor 804 to start an object detection operation as part of second-level processing operations 754 on first image frames 810. Controller 806 can also provide information of objects of interests to be detected/tracked based on first-level processing outputs 762. For example, if the first-level processing outputs indicate that the user is in a kitchen, controller 806 can configure sensor data processor 804 to detect/track objects related to kitchen, such as user's hands, utensils, etc.

Following the generation of second-level processing outputs 764, third-level processing operations 756, such as gesture/pose determination operation 756c, can be performed to identify the poses of the user's hand, the user's action of holding a bowl in a kitchen, etc.

Figure 8C:
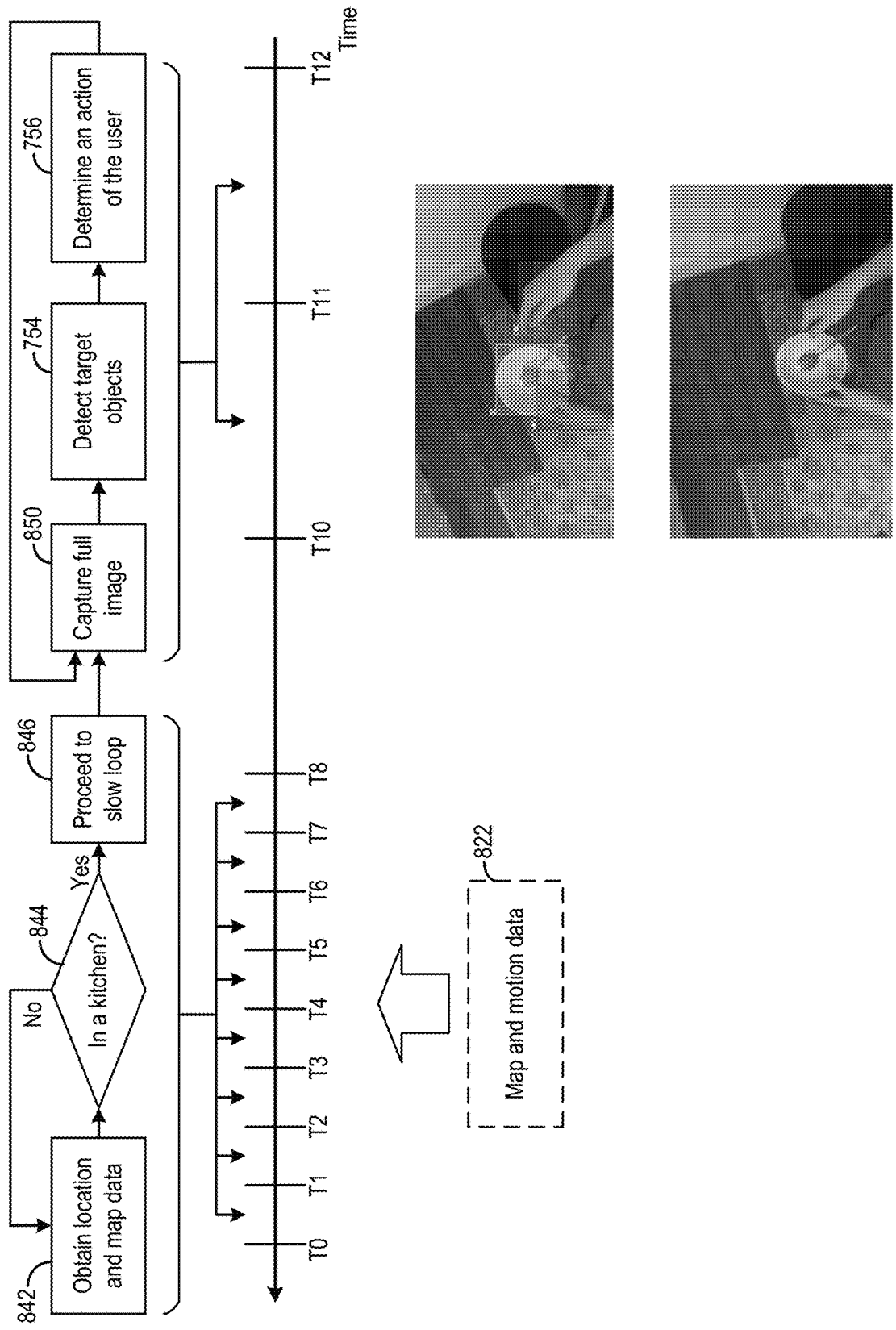

FIG. 8C illustrates another example of operations of imaging system 800 according to the two-tier feedback system, in which a fast feedback loop can control the start of a slow feedback loop. Referring to FIG. 8C, between each of time intervals T0-T1, T1-T2, T2-T3, T3-T4, T4-T5, T5-T6, T6-T7, and T7-T8, imaging system 800 can implement a fast feedback loop. Between each of the intervals, controller 806 can obtain map and motion data 822 in operation 842, and then provide the data to sensor data processor 804 to perform first-level processing operation 752 to determine context information, such as whether a user is in a kitchen, in operation 844. In some examples, controller 806 can also control pixel cells array 802 to capture low resolution/sparse image frames in operation 842, followed by sensor data processor 804 determining the contextual information based on the low resolution/sparse image frames, in operation 844. If the contextual information satisfy a condition, such as indicating that the user is in a kitchen, or that the user has experienced a huge location change, the controller can proceed to the slow loop, in operation 846, otherwise controller 806 can repeat operations 842 and 844 to obtain and process a new set of map and location data.

Upon entering the slow loop, in each of time intervals T10-T11 and T11-T12, controller 806 can control pixel cells array 802 to capture full-pixel frames (or frames with denser pixels than those captured in operation 842), in operation 850. Controller 806 can then control sensor data processor 804 to perform second-level processing operations 754 on the full-pixel frames to identify and detect target objects associated with kitchen, such as utensils, the user's hands, etc. Sensor data processor 804 can then perform third-level processing operations 756 to, for example, determine the poses of the user's hands, to track an action of the user (e.g., cooking), etc. Operations 850, 754, and 756 can be performed at a relatively low frequency based on the low frame rate (e.g., 1-10 frames per second) at which full-pixel frames are captured and processed. The slow feedback loop can stop when, for example, sensor data processor 804 determines that an action being tracked has ended.

Figure 9A:
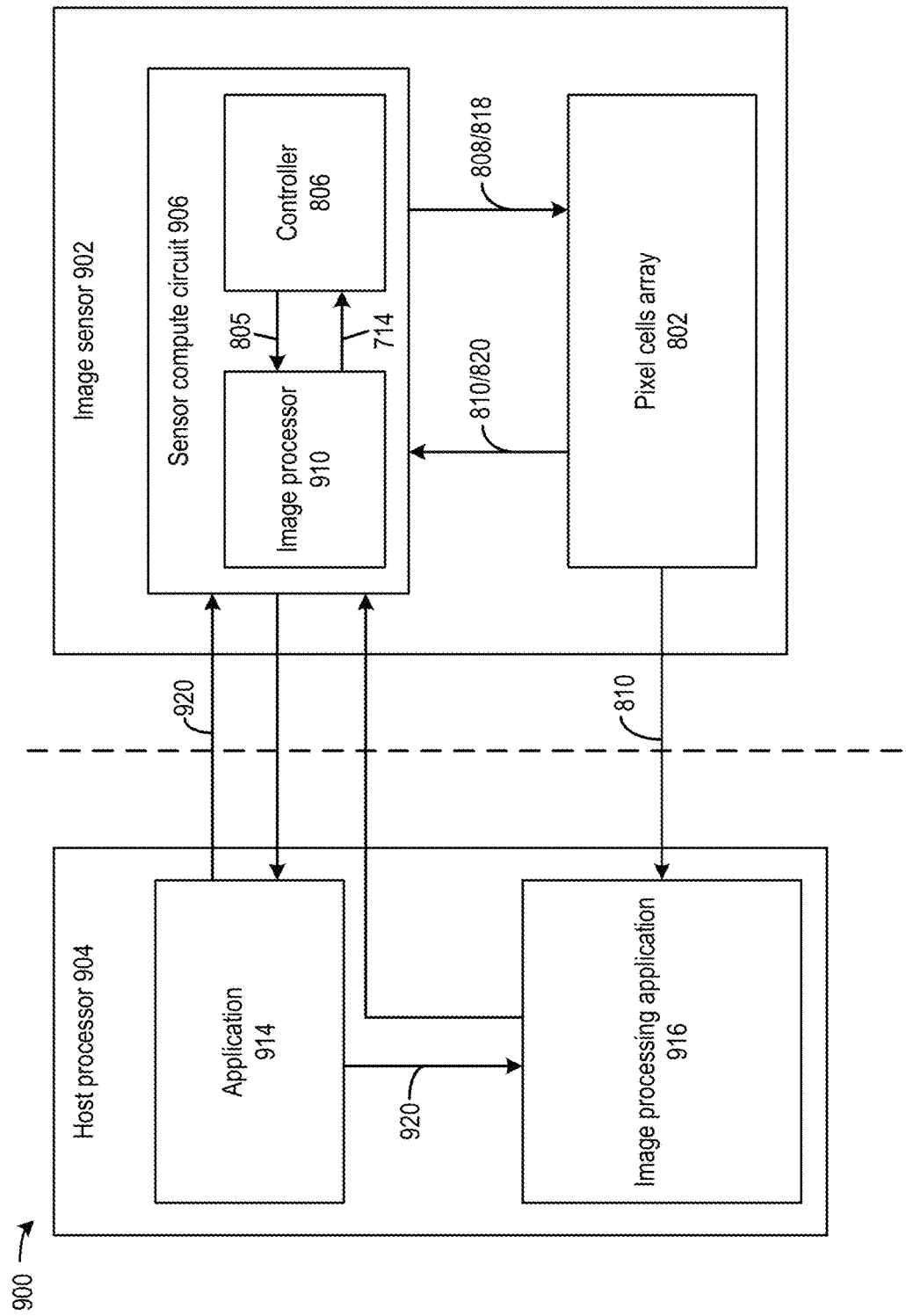
FIG. 9A, FIG. 9B, and FIG. 9C illustrate examples of a hardware system to implement the example imaging system of FIG. 8A, FIG. 8B, and FIG. 8C.
Figure 9B:
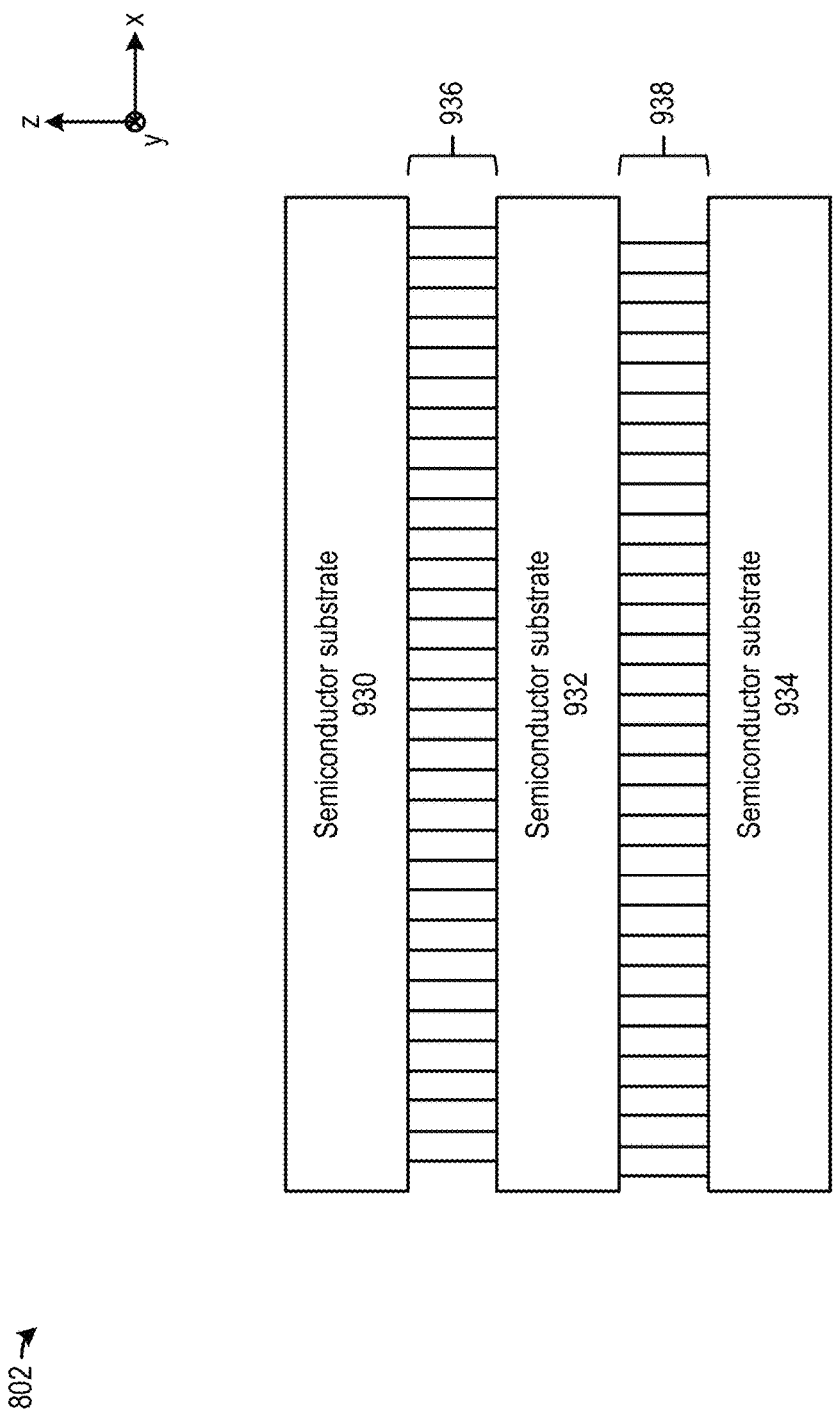
Figure 9C:
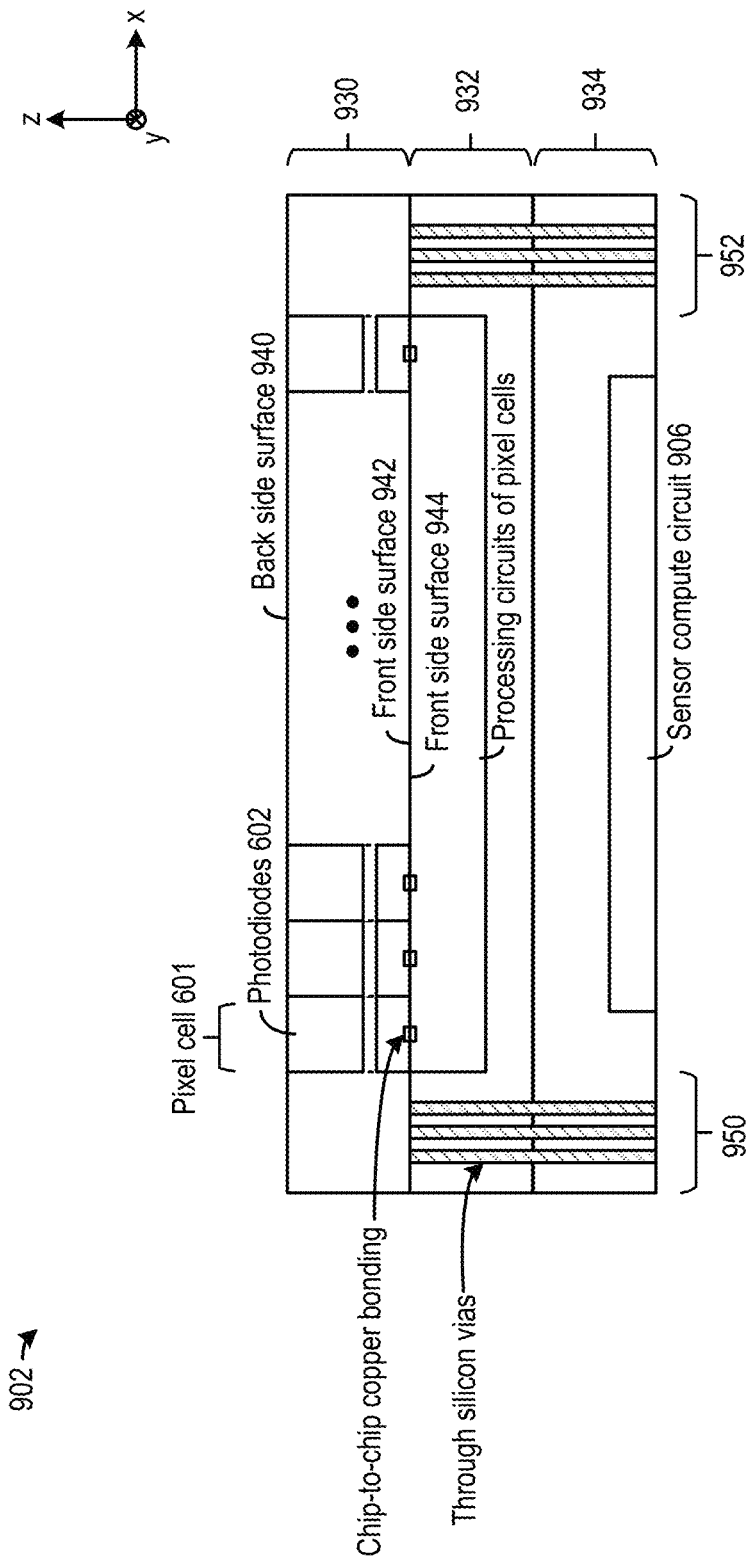

FIG. 9A, FIG. 9B, and FIG. 9C illustrate an example hardware system 900 that can implement imaging system 800 of FIG. 8A. In some examples, hardware system 900 can be implemented on a mobile/wearable platform, such as near-eye display 100. As shown in FIG. 9A, hardware system 900 includes an image sensor 902 and a host processor 904. Image sensor 902 includes a sensor-compute circuit 906 and pixel cells array 802. Sensor-compute circuit 906 includes an image processor 910 and controller 806. In some examples, sensor-compute circuit 906 can be implemented as an application specific integrated circuit (ASIC), a field programmable gate array (FPGA), or a hardware processor that executes instructions to implement the functions of image processor 910 and controller 806. In addition, host processor 904 includes a general purpose central processing unit (CPU) which can execute an application 914. In some examples, host processor 904 can also execute an image-processing application 916. Host processor 904 can be connected to image sensor 902 via an off-chip interconnect (e.g., I3C bus) which can support relatively low-speed data transmission.

FIG. 9B and FIG. 9C illustrate examples of physical arrangements of image sensor 902. As shown in FIG. 9B, image sensor 902 may include a semiconductor substrate 930 that includes some of the components of pixel cells array 802, such as photodiodes of the pixel cells, a semiconductor substrate 932 that includes the processing circuits of pixel cells array 802, such as buffer 606 and quantizer 607, and a semiconductor substrate 934 that includes sensor compute circuit 906. Semiconductor substrates 930, 932, and 934 can be housed within a semiconductor package to form a chip.

In some examples, semiconductor substrates 930, 932, and 934 can form a stack along a vertical direction (e.g., represented by z-axis), with vertical interconnects 936 and 938 to provide electrical connection among the substrates. Such arrangements can reduce the routing distance of the electrical connections between pixel cells array 802 and sensor compute circuit 906, which can increase the speed of transmission of data (especially pixel data) from pixel cells array 802 to sensor compute circuit 906 and reduce the power required for the transmission.

FIG. 9C illustrates examples of details of the stack structure of image sensor 902. As shown in FIG. 9C, semiconductor substrate 932 may include a back side surface 940 configured as a light receiving surface and includes photodiodes of each pixel cell, and a front side surface 942 on which transfer transistor 604 and charge storage device 605 (e.g., a floating drain of transfer transistor 604) are implemented, whereas the processing circuits of the pixel cells including buffer 606 and quantizer 607 are implemented below a front side surface 944 of semiconductor substrate 934. Front side surface 942 of semiconductor substrate 932 may be electrically connected with front side surface 944 of semiconductor substrate 934 by vertical interconnects 936 which can include chip-to-chip copper bonding. The chip-to-chip copper bonding can provide pixel interconnects between, for example, the transfer transistor 604 of each pixel cell and the buffer 606 of each pixel cell. In addition, image sensor 902 further includes through vertical interconnects, such as through silicon vias (TSVs), micro-TSVs, Copper-Copper bumps, etc., between pixel cells array 802 and sensor compute circuit 906. The vertical interconnects can be on shoulder regions 950 and 952 of the stack and penetrate through semiconductor substrate 934 and 936. The vertical interconnects can support high speed data transmission between pixel cells array 802 and sensor compute circuit 906.

Referring back to FIG. 9A, host processor 904 can execute application 914, which can be an VR/AR/MR application that operates based on contextual information included in third-level processing outputs 716 from controller 806. Application 914 can also provide guidance information 920, such as features, shapes, sizes, etc., of target objects to be detected, identified, and tracked, to image processing application 916 and image processor 910 of sensor compute circuit 906, which together can perform hierarchical set of processing operations 700. In some examples, image processing application 916 can perform first-level processing operations 702, whereas image processor 910 can perform second-level processing operations 704. In some examples, image processor 910 can perform both first-level processing operations 702 and second-level processing operations 704, and can receive full-pixel first image frames 810. In some examples, image processor 910 alone or in conjunction with image processing application 916 and controller 806 can also perform hierarchical set of processing operations 740.

Controller 806 can implement the aforementioned two-tier feedback system. Controller 806 can first start the slow feedback loop and transmit, via on-chip interconnects, first image sensing configuration 808 to pixel cells array 802 to capture full-pixel first image frames 810 at a low frame rate. Pixel cells array 802 can then transmit first image frames 810 to image processing application 916 via off-chip interconnects, which can support the transmission as first image frames 810 are generated at a low frame rate. Image processing application 916 can then process first image frames 810 based on target object information included in guidance information 920 from application 914 to generate first-level processing outputs 712, which can include candidate pixel locations of pixel segments of the target object, and transmit first-level processing outputs 712 back to sensor compute circuit 906 via off-chip interconnects.

Controller 806 can determine whether any of the pixel segments indicated in first-level processing outputs 712 includes the target object based on target object information included in guidance information 920 from application 914. For example, based on description of the pixel locations of the pixel segments indicated in first-level processing outputs 712, as well as shapes/sizes of the target object specified in guidance information 920, controller 806 can determine whether any of the pixel segments indicated in first-level processing outputs 712 includes the target object. If the target object is not included in first image frame 810, controller 806 can continue the slow feedback loop and control pixel cells array 802 to capture a new full-pixel first image frame 810 and transmit the new first image frame to image processing application 916.

But if the target object is included in first image frame 810, controller 806 can start the fast feedback loop and generate second image sensing configuration 818 to select a subset of pixel cells of pixel cells array 802 to capture second image frames 820 as sparse image frames and at a high frame rate. Pixel cells array 802 can transmit second image frames 820 back to image processor 910 of sensor compute circuit 906 via on-chip vertical interconnects 936 and 938, which can support the transmission of sparse image frames at the high frame rate. Controller 806 can also transmit control signal 805 to image processor 910 to perform second-level processing operations 704 on second image frames 820 to generate second-level processing outputs 714, and transmit second-level processing outputs 714 back to controller 806, which can then update second-image sensing configuration 818 based on second-level processing outputs 714 as part of the fast feedback loop operation. Controller 806 can also control pixel cells array 802 not to transmit second-image frames 820 to image processing application 916, thereby stopping the slow feedback loop.

In addition to implementing the two-tier feedback system, sensor compute circuit 906 can also generate global signals that are sent to each pixel cell of pixel cells array 802. The global signals can include, for example, threshold voltages used for quantization operations in TTS, FD ADC, and PD ADC operations (e.g., a global voltage ramp for FD ADC and PD ADC operation, a flat voltage for TTS operation), as well as global control signals such as AB and TG signals of FIG. 6B.

Figure 10A:
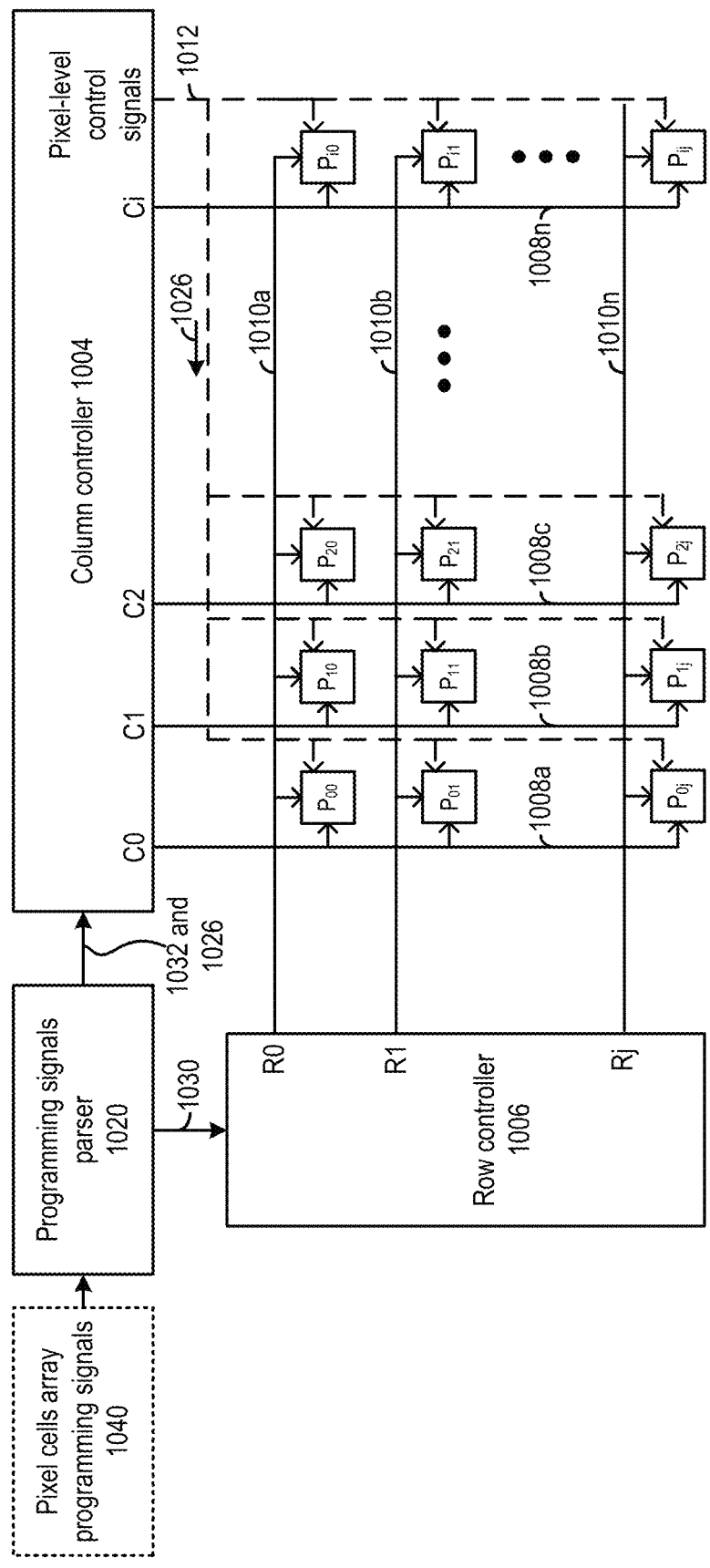
FIG. 10A, FIG. 10B, and FIG. 10C illustrate example internal components of pixel cells array of FIG. 8A-FIG. 9C.
Figure 10B:
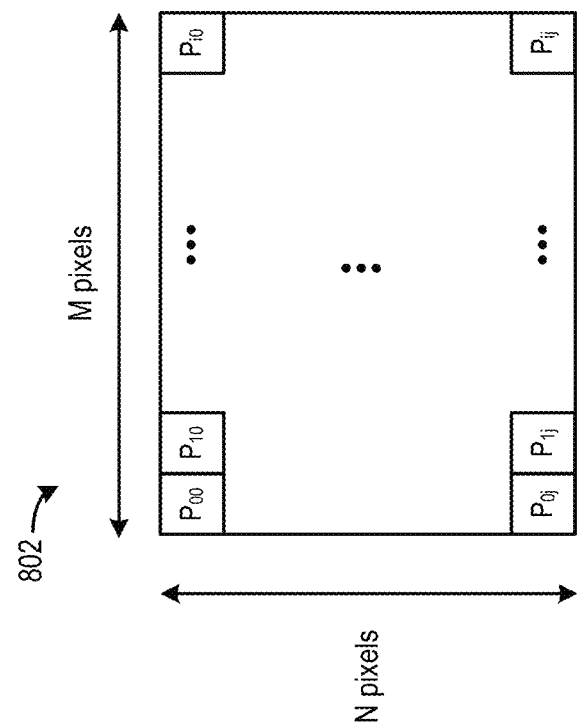
Figure 10B:
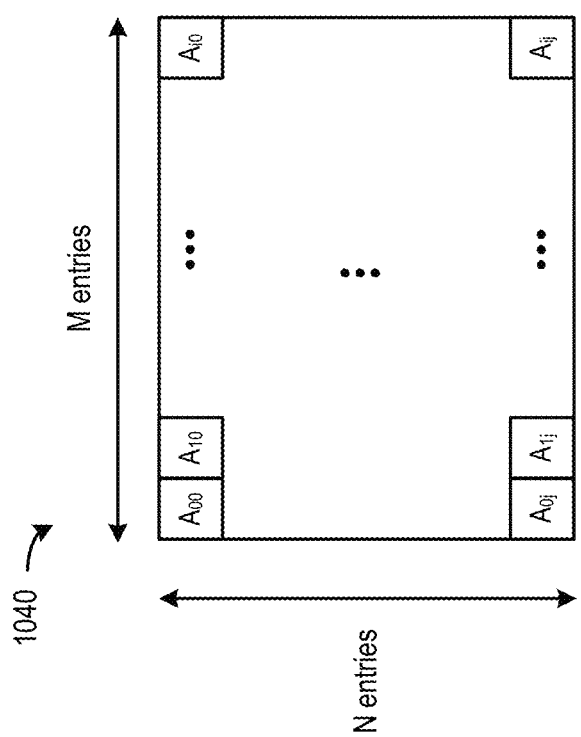
Figure 10C:
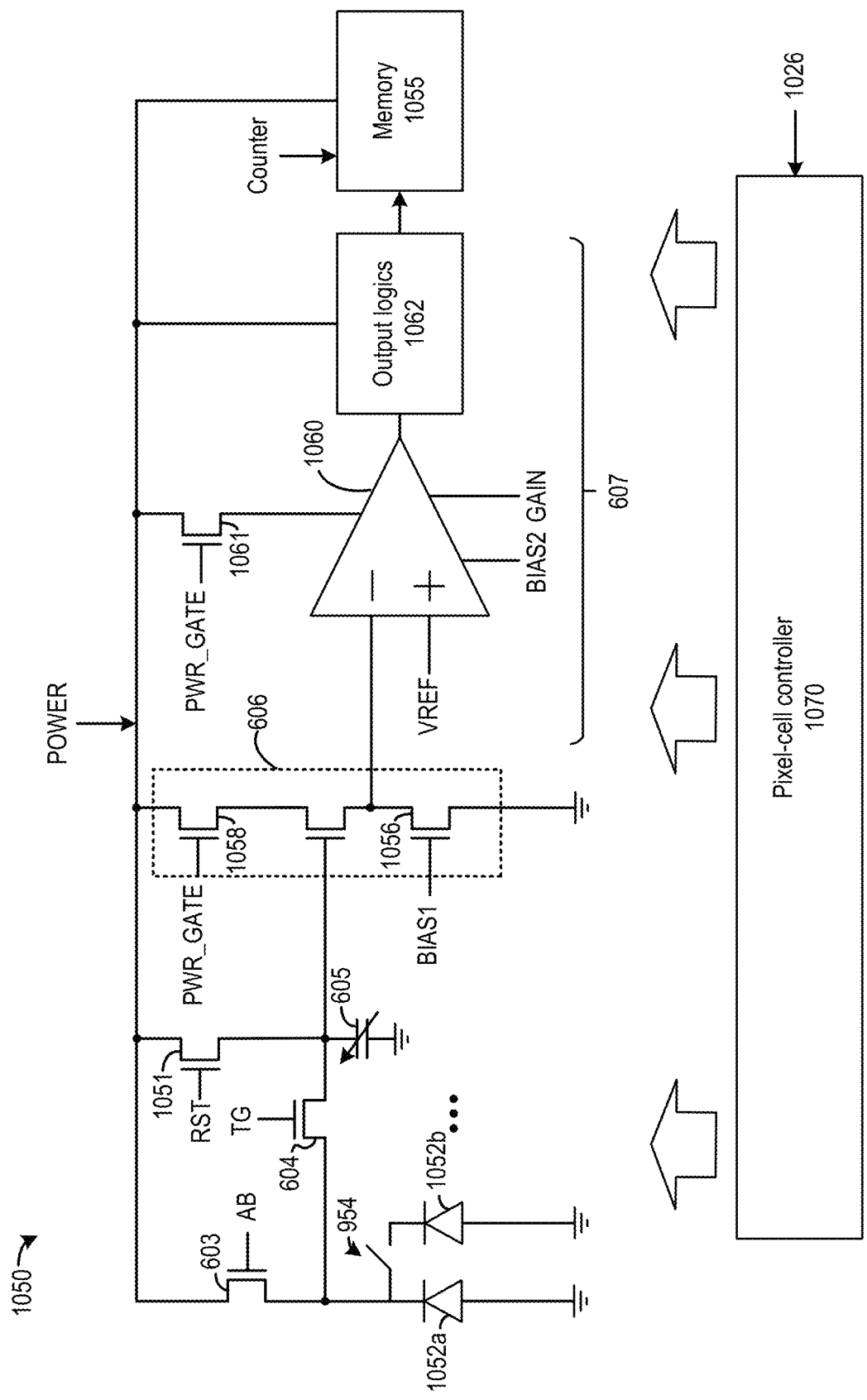

FIG. 10A, FIG. 10B, and FIG. 10C illustrate examples of internal components of pixel cells array 802. Specifically, each pixel cell of pixel cells array 802, or blocks of pixel cells, can be individually programmable to, for example, enable/disable outputting of a pixel value, set a quantization resolution of the pixel value output by the pixel cell, set a frame period (and the frame rate) to generate a frame, etc. As shown in FIG. 10A, pixel cells array 802 may include a column controller 1004, a row controller 1006, and a programming signals parser 1020. Column controller 1004 is connected with column buses 1008 (e.g., 1008a, 1008b, 1008c, . . . 1008n), whereas row controller 1006 is connected with row buses 1010 (e.g., 1010a, 1010b, . . . 1010n). One of column controller 1004 or row controller 1006 is also connected with a programming bus 1012 to transmit pixel-level programming signals 1026 targeted at a particular pixel cell or a group of pixel cells. Each box labelled $P_{00}$, $P_{01}$, $P_{01}$, etc. can represent a pixel cell or a group of pixel cells (e.g., a group of 2×2 pixel cells). Each pixel cell or group of pixel cells can be connected to one of column buses 1008, one of row buses 1010, programming bus 1012, and an output data bus to output pixel data (not shown in FIG. 10A). Each pixel cell (or each group of pixel cells) is individually addressable by column address signals 1030 on column buses 1008 provided by column controller 1004, and row address signals 1032 on row buses 1010 provided by row controller 1006, to receive pixel-level programming signals 1026 via pixel-level programming bus 1012 at a time. Column address signals 1030, row address signals 1032, as well as pixel-level programming signals 1026, can be generated based on pixel cells array programming signals 1040, which can be included in first sensing configuration 808, second image sensing configuration 818, etc.

Pixel cells array programming signals 1040 can be in the form of a programming map that contains programming data for each pixel cell, which can be extracted by programming signals parser 1020. FIG. 10B illustrates an example of pixel cells array programming signals 1040. As shown in FIG. 10B, pixel cells array programming signals 1040 can include a two-dimensional array of pixel-level programming data, with each pixel-level programming data of the two-dimensional array targeted at a pixel cell or a group of pixel cells of pixel cells array 802. For example, in a case where each pixel-level programming datum is targeted at a pixel cell, and assuming pixel cells array 802 has a width of M pixels (e.g., M columns of pixels) and a height of N pixels (e.g., N rows of pixels), pixel cells array programming signals 1040 can also have a width of M entries (e.g., M columns of entries) and a height of N entries (e.g., N rows of entries), with each entry storing pixel-level programming data for a corresponding pixel cell. For example, the pixel-level programming data $A_{00}$ at entry (0, 0) of pixel cells array programming signals 1040 is targeted at pixel cell $P_{00}$ at pixel location (0, 0) of pixel cells array 802, whereas the pixel-level programming data $A_{01}$ at entry (0, 1) of pixel cells array programming signals 1040 is targeted at pixel cell Poi at pixel location (0, 1) of pixel cells array 802. In a case where pixel-level programming data is targeted at a group of pixel cells, the number of entries of pixel cells array programming signals 1040 along the height and the width can be scaled based on a number of pixel cells in each group.

Pixel cells array programming signals 1040 can be configured to support the feedback operations described in FIG. 8A and FIG. 8B. For example, the pixel-level programming data stored at each entry can individually program each pixel cell (or each group of pixel cells) to, for example, power on or off, to enable or disable outputting of pixel data, to set a quantization resolution, to set a precision of output pixel data, to select a quantization operation (e.g., one of TTS, FD ADC, PD ADC), to set a frame rate, etc. As described above, controller 806 can generate pixel cells array programming signals 1040 based on, for example, prediction of one or more ROIs, in which the pixel-level programming data for pixel cells within an ROI are different from the pixel-level programming data for pixel cells outside the ROI. For example, pixel cells array programming signals 1040 can enable a subset of pixel cells (or groups of pixel cells) to output pixel data while the rest of the pixel cells do not output pixel data. As another example, pixel cells array programming signals 1040 can control a subset of pixel cells to output pixel data at a higher resolution (e.g., using a larger number of bits to represent each pixel), whereas the rest of pixel cells output pixel data at a lower resolution.

Referring back to FIG. 10A, programming signals parser 1020 can parse pixel cells array programming signals 1040, which can be in a serial data stream, to identify the pixel-level programming data for each pixel cell (or each group of pixel cells). The identification of the pixel-level programming data can be based on, for example, a predetermined scanning pattern by which the two-dimensional pixel array programming map is converted into the serial format, as well as the order by which the pixel-level programming data is received by programming signals parser 1020 from the serial data stream. For each entry of programming data, programming signals parser 1020 can generate a row address signal 1030 and a column address signal 1032, and transmit row address signal 1030 and column address signal 1032 to, respectively, row controller 1006 and column controller 1004 to select a pixel cells and transmit pixel-level programming signals 1026 to the selected pixel cell (or group of pixel cells).

FIG. 10C illustrates example internal components of a pixel cell 1050 of pixel cells array 802, which can be part of pixel cell 601 of FIG. 6A. Pixel cell 1050 can include one or more photodiodes, including photodiodes 1052a, 1052b, etc. In some examples, one or more of photodiodes of pixel cell 1050 can be configured to detect light of a different frequency range. For example, photodiode 1052a can detect visible light (e.g., monochrome, or one of red, green, or blue color), whereas photodiode 1052b can detect infrared light. In some examples, some or all of the photodiodes of pixel cell 1050 can detect light of the same wavelength. Pixel cell 1050 further includes a switch 1054 (e.g., a transistor, a controller barrier layer) to control which photodiode outputs charge for pixel data generation. In a case where the photodiodes detect light of different frequency ranges, the outputs from each photodiode can correspond to a pixel to support co-located 2D/3D sensing. In a case where the photodiodes detect light of the same frequency range, the outputs from the photodiodes can be combined in an analog binning operation to, for example, increase the signal-to-noise ratio (SNR) in measuring light of low intensity.

In addition, pixel cell 1050 further includes electronic shutter switch 603, transfer switch 604, charge storage device 605, buffer 606, quantizer 607 as shown in FIG. 6A, as well as a reset switch 1051 and memory 1055. Charge storage device 605 can have a configurable capacitance to set a charge-to-voltage conversion gain. In some examples, the capacitance of charge storage device 605 can be increased to store overflow charge for FD ADC operation for a medium light intensity to reduce the likelihood of charge storage device 605 being saturated by the overflow charge. The capacitance of charge storage device 605 can also be decreased to increase the charge-to-voltage conversion gain for PD ADC operation for a low light intensity. The increase in the charge-to-voltage conversion gain can reduce quantization error and increase the quantization resolution. In some examples, the capacitance of charge storage device 605 can also be decreased during the FD ADC operation to increase the quantization resolution. Reset switch 1051 can reset charge storage device 605 prior to capturing of an image frame and/or between FD ADC and PD ADC operations. Buffer 606 includes a current source 1056 of which the current can be set by a bias signal BIAS1, as well as a power gate 1058 which can be controlled by a PWR_GATE signal to turn on/off buffer 606. Buffer 606 can be turned off as part of disabling pixel cell 1050.

In addition, quantizer 607 includes a comparator 1060 and output logics 1062. Comparator 1060 can compare the output of buffer with a reference voltage (VREF) to generate an output. Depending on a quantization operation (e.g., TTS, FD ADC, and PD ADC operations), comparator 1060 can compare the buffered voltage with different VREF voltages to generate the output, and the output be further processed by output logics 1062 to cause memory 1055 to store a value from a free running counter or a digital ramp as the pixel output. The bias current of comparator 1060 can be controlled by a bias signal BIAS2 which can set the bandwidth of comparator 1060, which can be set based on the frame rate to be supported by pixel cell 1050. Moreover, the gain of comparator 1060 can be controlled by a gain control signal GAIN. The gain of comparator 1060 can be set based on a quantization resolution to be supported by pixel cell 1050. Comparator 1060 further includes a power switch 1061a and a power switch 1061b which can also be controlled by the PWR_GATE signal to turn on/off, respectively, comparator 1060 and memory 1055. Comparator 1060 can be turned off as part of disabling pixel cell 1050.

In addition, output logics 1062 can select the outputs of one of the TTS, FD ADC, or PD ADC operations and based on the selection, determine whether to forward the output of comparator 1060 to memory 1055 to store the value from the counter/digital ramp. Output logics 1062 can include internal memory to store indications, based on the output of comparator 960, of whether the photodiode 1052 (e.g., photodiode 1052a) is saturated by the residual charge, and whether charge storage device 605 is saturated by the overflow charge. If charge storage device 605 is saturated by the overflow charge, output logics 962 can select TTS output to be stored in memory 1055 and prevent memory 1055 from overwriting the TTS output by the FD ADC/PD ADC output. If charge storage device 605 is not saturated but the photodiodes 1052 are saturated, output logics 1062 can select the FD ADC output to be stored in memory 1055; otherwise output logics 1062 can select the PD ADC output to be stored in memory 1055. In some examples, instead of the counter values, the indications of whether photodiodes 1052 are saturated by the residual charge and whether charge storage device 605 is saturated by the overflow charge can be stored in memory 1055 to provide the lowest precision pixel data.

In addition, pixel cell 1050 may include a pixel-cell controller 1070, which can include logic circuits to generate control signals such as AB, TG, BIAS1, BIAS2, GAIN, VREF, PWR_GATE, etc. Pixel-cell controller 1070 can also be programmed by pixel-level programming signals 1026. For example, to disable pixel cell 1050, pixel-cell controller 1070 can be programmed by pixel-level programming signals 1026 to de-assert PWR_GATE to turn off buffer 606 and comparator 1060. Moreover, to increase the quantization resolution, pixel-cell controller 1070 can be programmed by pixel-level programming signals 926 to reduce the capacitance of charge storage device 605, to increase the gain of comparator 1060 via GAIN signal, etc. To increase the frame rate, pixel-cell controller 1070 can be programmed by pixel-level programming signals 1026 to increase BIAS1 signal and BIAS2 signal to increase the bandwidth of, respectively, buffer 606 and comparator 1060. Further, to control the precision of pixel data output by pixel cell 1050, pixel-cell controller 1070 can be programmed by pixel-level programming signals 1026 to, for example, connect only a subset of bits (e.g., most significant bits) of the counter to memory 1055 so that memory 1055 only stores the subset of bits, or to store the indications stored in output logics 1062 to memory 1055 as the pixel data. In addition, pixel-cell controller 1070 can be programmed by pixel-level programming signals 1026 to control the sequence and timing of AB and TG signals to, for example, adjust the exposure period and/or select a particular quantization operation (e.g., one of TTS, FD ADC, or PD ADC) while skipping the others based on the operation condition, as described above.

Figure 11A:
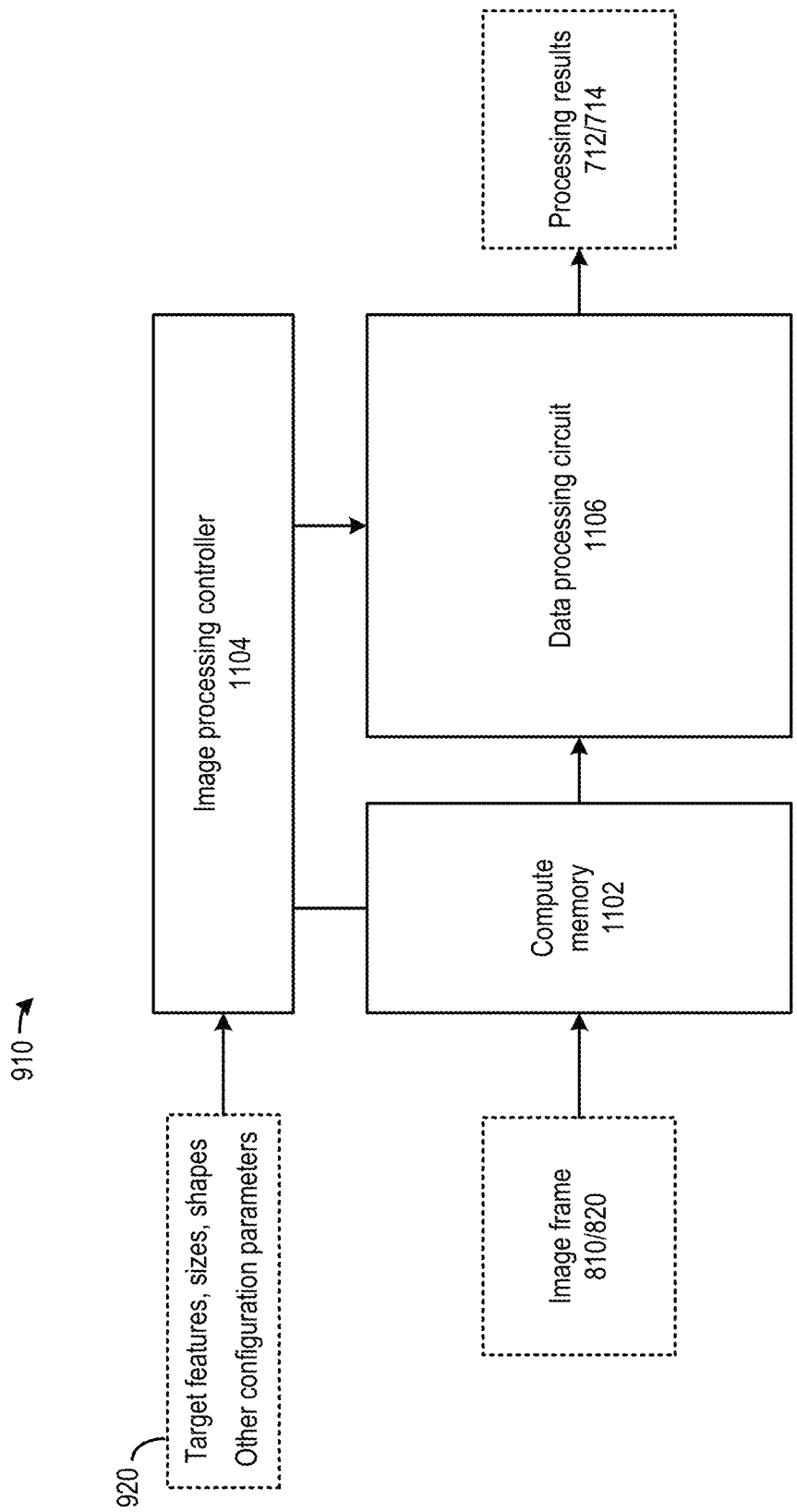
FIG. 11A, FIG. 11B, FIG. 11C, FIG. 11D, and FIG. 11E illustrate example internal components of an image processor of FIG. 8A-FIG. 9C and its operations.

FIG. 11A, FIG. 11B, FIG. 11C, FIG. 11D, and FIG. 11E illustrate examples of internal components of image processor 910. As shown in FIG. 11A, image processor 910 may include a compute memory 1102, a data processing controller 1104, and data processing circuit 1106. Compute memory 1102 can store pixels of an image frame to be processed by image processor 910, such as first image frames 810 and second image frames 820 of FIG. 8A. Data processing controller 1104 can receive, as part of guidance information 920, image processing configuration parameters such as features, sizes, and shapes of target objects. Data processing controller 1104 can then control data processing circuit 1106 to fetch the image frame from compute memory 1102 to perform second-level processing operations 704 based on the configuration parameters to generate second-level processing outputs 714.

Figure 11B:
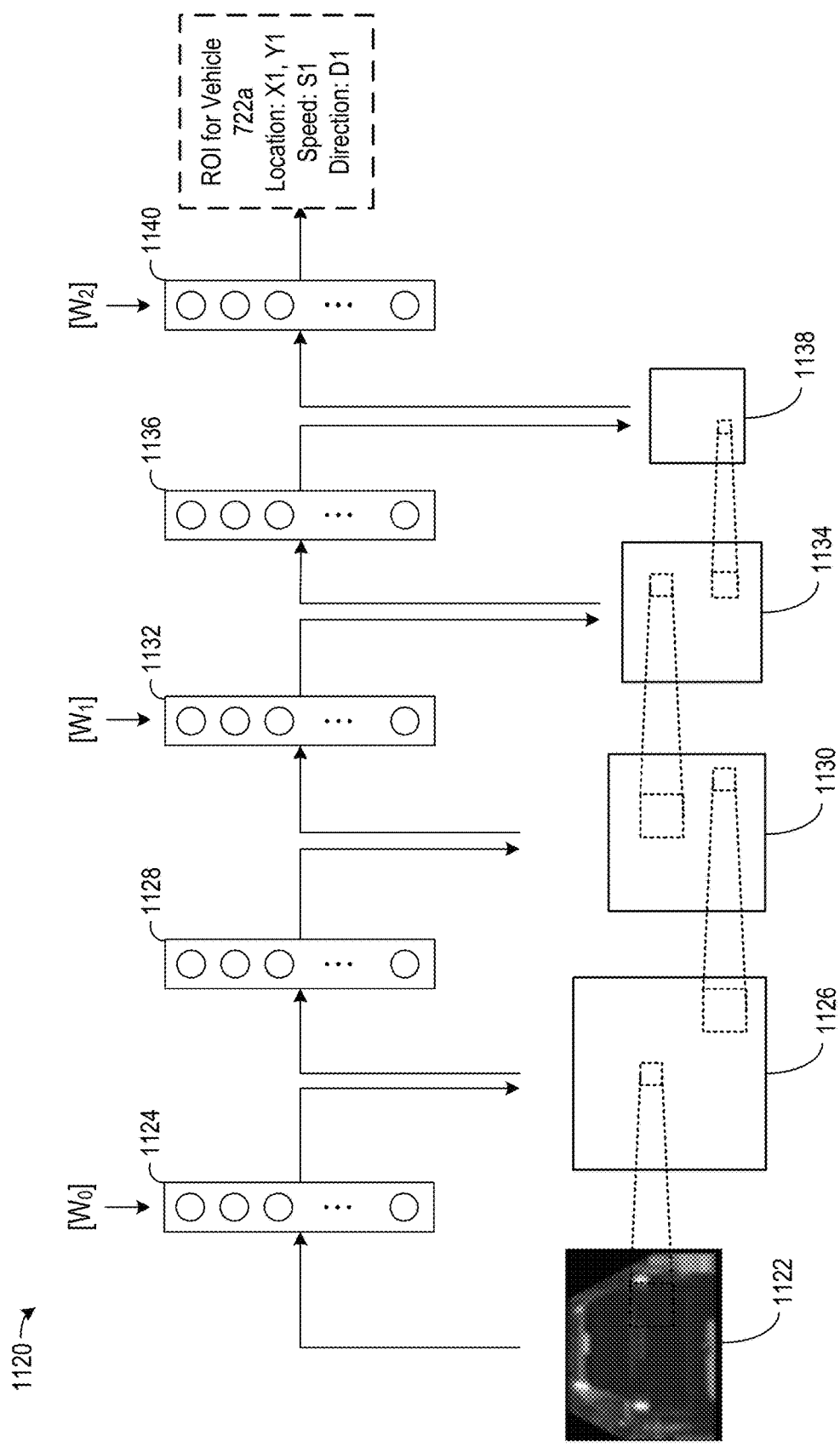

In some examples, data processing circuit 1106 can implement a machine learning model, such as a convolutional neural network (CNN) model, to perform the object detection and tracking operation. FIG. 11B illustrates an example architecture of CNN 1120 that can be implemented by data processing circuit 1106. Referring to FIG. 11B, CNN 1120 may include four main operations: (1) convolution; (2) processing by an activation function (e.g., ReLU); (3) pooling or sub-sampling; and (4) classification (fully-connected layer). These operations may be the basic building blocks of every convolutional neural network. Different CNNs may have different combinations of these four main operations.

An image to be classified, such as input image 1122, may be represented by a matrix of pixel values. Input image 1122 may include multiple channels, each channel representing a certain component of the image. For example, an image from a digital camera may have a red channel, a green channel, and a blue channel. Each channel may be represented by a 2-D matrix of pixels having pixel values in the range of 0 to 255 (i.e., 8-bit). A gray-scale image may have only one channel. In the following description, the processing of a single image channel using CNN 1120 is described. Other channels may be processed similarly.

As shown in FIG. 11B, input image 1122 may be processed by a first convolution layer (e.g., an input layer) 1124 using a first weight array (labelled [W0] in FIG. 11B). First convolution layer 1124 may include multiple nodes, with each node assigned to multiply a pixel of input image 1122 with a corresponding weight in first weights array. As part of the convolution operation, blocks of pixels of input image 1122 can be multiplied with first weights array to generate a product, and the products are then accumulated to generate a sum, in a multiply-and-accumulate (MAC) operation. Each sum can then post-processed by an activation function to generate an intermediate output. The activation function can simulate the behavior of the linear perceptron in neural network. The activation function can include a linear function or a non-linear function (e.g., ReLU, softmax). The intermediate outputs can form an intermediate output tensor 1126. The first weights array can be used to, for example, extract certain basic features (e.g., edges) from input image 1122, and intermediate output tensor 1126 can represent a distribution of the basic features as a basic feature map. Intermediate output tensor 1126 may be passed to a pooling layer 1128, where intermediate output tensor 1126 may be subsampled or down-sampled by pooling layer 1128 to generate an intermediate output tensor 1130.

Intermediate output tensor 1130 may be processed by a second convolution layer 1132 using a second weights array (labelled [$W_1$] in FIG. 11B). The second weights array can be used to, for example, identify patterns of features specific for an object, such as a hand, from intermediate output tensor 1130. As part of the convolution operation, blocks of pixels of tensor 1130 can be multiplied with the second weights array to generate a product, and the products can be accumulated to generate a sum. Each sum can also be then processed by an activation function to generate an intermediate output, and the intermediate outputs can form an intermediate output tensor 1134. Intermediate output tensor 1134 may represent a distribution of features representing a hand. Intermediate output tensor 1134 may be passed to a pooling layer 1136, where intermediate output tensor 1134 may be subsampled or down-sampled to generate an intermediate output tensor 1138.

Intermediate output tensor 1138 can then be passed through a fully-connected layer 1140, which can include a multi-layer perceptron (MLP). Fully-connected layer 1140 can perform a classification operation based on intermediate output tensor 1138 to, for example, classify whether the object in image 1122 represents a hand, the likely pixel location of the hand in image 1122, etc. Fully-connected layer 1140 can multiply intermediate output tensor 1138 with a third weights array (labelled [$W_2$] in FIG. 11B) to generate sums, and the sums can be processed by an activation function to generate a neural network output 1142. Neural network output 1142 can indicate, for example, whether an object of interest (e.g., vehicle 722a) is present in the image frame and its pixel location, speed and direction of movement, etc.

Figure 11C:
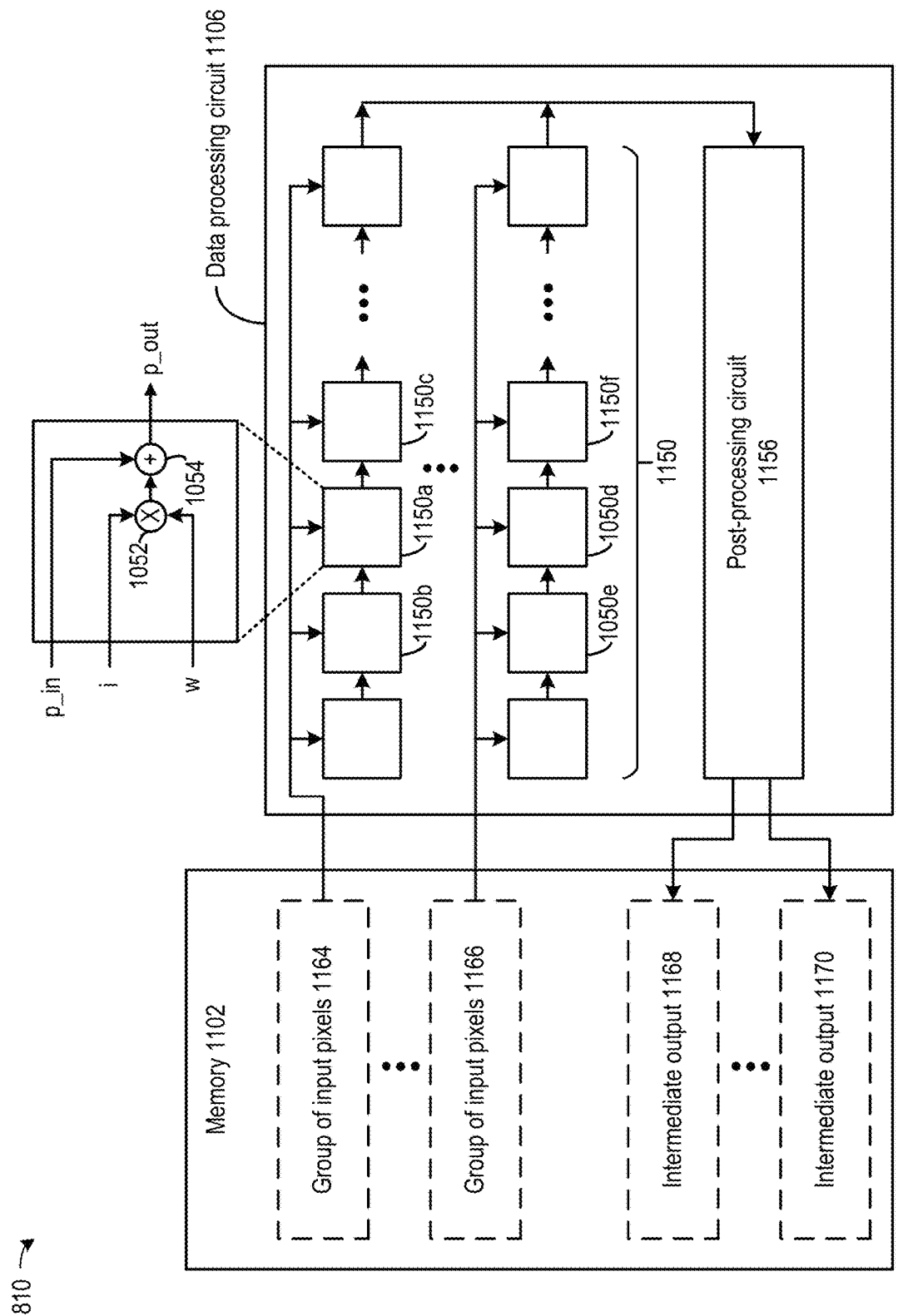

FIG. 11C illustrates an example of internal components of data processing circuit 1106 and their operations to implement CNN 1120. As shown in FIG. 11C, data processing circuit 1106 can include an array of arithmetic circuits 1150. Each arithmetic circuit, such as 1150a-1150f, can include a multiplier 1154 to multiply an input data element (represented with "i") and a weight data element (represented with "w") to generate a local partial sum. The input data element can correspond to, for example, a pixel in the image frame, whereas the weight data element can be a corresponding weight in the weight matrix (e.g., [$W_0$], [$W_1$], [$W_2$]) of a neural network layer. Each arithmetic circuit 1150 can also include an adder 1152 to add the local partial sum with an input partial sum (labelled "p_in") received from a neighboring arithmetic circuit and generate an output partial sum (labelled "p_out"). The output partial sum is then input to another neighboring arithmetic circuit. For example, arithmetic circuit 1150a can receive an input partial sum from arithmetic circuit 1150b, add its local partial sum to the input partial sum to generate an output partial sum, and provide the output partial sum to arithmetic circuit 1150c. As such, each arithmetic circuit generates a local partial sum, and the local partial sums are accumulated in the array of arithmetic circuits to form an intermediate output. Data processing circuit 1106 further includes a post-processing circuit 1156 to perform post-processing (e.g., activation function processing, pooling) on the intermediate outputs. In some examples, data processing circuit 1106 can include other types of circuits, such as look-up tables, to implement multiplier 1154 and post-processing circuit 1156.

To perform the convolution and post-processing operations of first input convolution layer 1124 and pooling layer 1128, data processing controller 1104 (not shown in FIG. 11C) can control data processing circuit 1106 to fetch input data from compute memory 1102 based on predetermined mapping between the input data and the arithmetic circuits according to CNN 1120. For example, a first group of arithmetic circuits, including arithmetic circuits 1150a, 10150b, and 1150c, can fetch a group of input pixels 1064 from compute memory 1102, whereas a second group of arithmetic circuits, including arithmetic circuits 1150d, 1150e, and 1150f, can fetch a group of input pixels 1166 from compute memory 1102. Each group of arithmetic circuits can perform a convolution operation between the group of input pixels and the weight array based on the multiplication-and-accumulation operations to generate an intermediate output, as described above. The intermediate output can then be post-processed by post-processing circuit 1156. The post-processed output can be stored back to compute memory 1102. For example, an intermediate output 1168 can be generated from the convolution and post-processing of group of input pixels 1164, whereas an intermediate output 1170 can be generated from the convolution and post-processing of group of input pixels 1166. After the operations of first convolution layer 1124 and pooling layer 1128 complete and the intermediate outputs are stored in compute memory 1102, controller 10104 can control the array of arithmetic circuits 1150 to fetch the intermediate outputs to perform the convolution and post-processing operations of second convolution layer 1132 and pooling layer 1136 to generate and store a second set of intermediate outputs in compute memory 1102. The controller can then control the array of arithmetic circuits to fetch the second set of intermediate outputs, based on the topology of fully-connected layer 1140, to generate neural network output 1142.

As described in FIG. 8A, image processor 910 may receive a sparse image, such as a second image frame 820, which includes active pixels and inactive pixels. The active pixels may correspond to one or more objects of interests, whereas the inactive pixels may contain no image information (e.g., having completely dark or other predetermined colors). The group of active pixels can be generated and transmitted by pixel cells array 802 based on second image sensing configuration 818. Pixel values representing the active pixels and inactive pixels of the image frame can then be stored in compute memory 1102 of image processor 910.

Figure 11D:
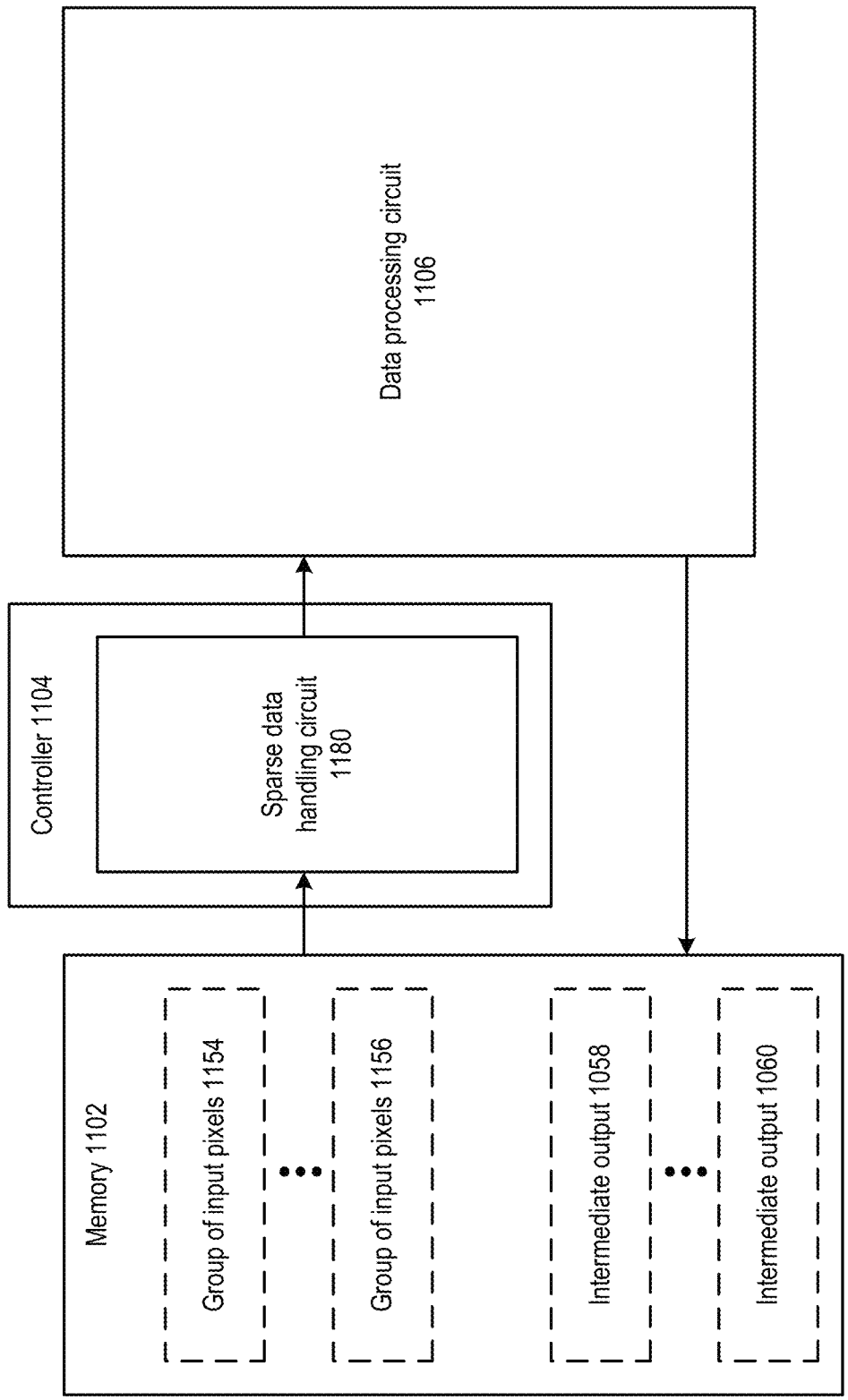
Figure 11E:
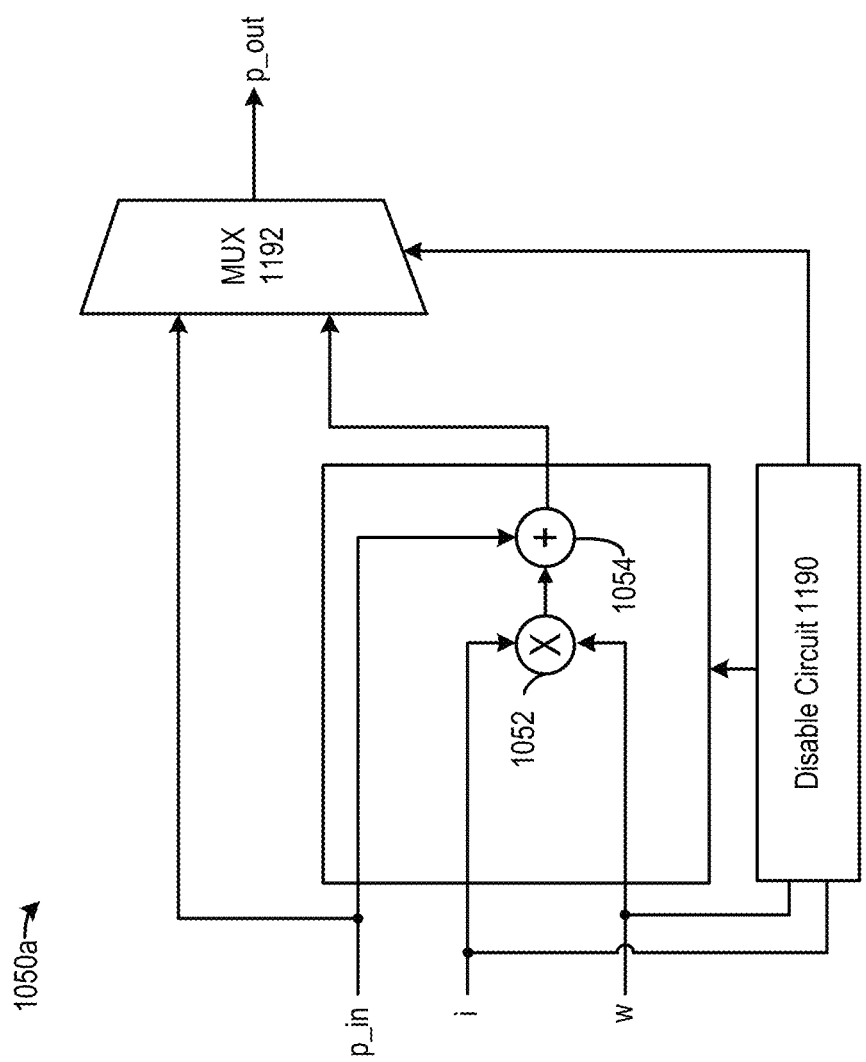

Although generation and transmission of sparse images can reduce the power consumption by pixel cells array 802, and if data processing circuit 1106 is to perform an processing operation (e.g., convolution operation) on each and every pixel of the sparse image, data processing circuit 1106 may still consume a lot of power. Referring to FIG. 11D, to improve the overall power and computation efficiencies, data processing controller 1104 can include a sparse data handling circuit 1180. In some examples, sparse data handling circuit 1180 can fetch groups of input data from memory 1102 to a neural network layer (e.g., pixels, intermediate outputs) and detect a subset of the groups of input data where the entire group of input data have inactive values (e.g., zero), or otherwise contain no image information. Sparse data handling circuit 1180 can exclude those groups of inactive input data from data processing circuit 1106, and data processing circuit 1106 do not generate and write the intermediate outputs for those groups of inactive input data back to compute memory 1102. On the other hand, groups of input data that include active values (e.g., non-zero) representing image information can be forwarded by sparse data handling circuit 1180 to data processing circuit 1106, which can then process the group of active input data to generate and write the intermediate outputs back to compute memory 1102.

In some examples, sparse data handling circuit 1180 can also receive information about the sparsity of the image frame stored in memory 1102. The sparsity information can be based on, for example, programming map information included in the image sensing configuration data provided by controller 806 of sensor compute circuit 906 or based on neural network model topology as to be described below. Sparse data handling circuit 1180 can determine the memory addresses of memory 1102 that store active pixel data, and fetch the active pixel data from those memory addresses.

In a case where compute memory 1102 is reset/re-initialized (e.g., to logical zeroes) between different image frames, memory devices of compute memory 1102 that are assigned to store the intermediate outputs for groups of inactive input data (assigned based on mapping between inputs and outputs of the neural network layer) can retain their initialized/reset state and not accessed for the groups of inactive input data. Meanwhile, memory devices of compute memory 1102 that are assigned to store the intermediate outputs for groups of active input data can be updated by data processing circuit 1106. Such arrangements can reduce the access to compute memory 1102 for the processing of the sparse image data, which can further reduce power consumption by compute memory 1102 and image processor 910 as a whole.

For example, sparse data handling circuit 1180 can detect that a first group of input pixels may be entirely inactive and contain no image information, whereas a second group of input pixels contain active pixels and image information. Sparse data handling circuit 1180 can exclude the first group of input pixels and the corresponding weights from the first group of arithmetic circuits (including arithmetic circuits 1050a-1050c), or otherwise disable the first group of arithmetic circuits, such that no intermediate output is written back to compute memory 1102 for the first group of input pixels. Intermediate output 1168 for the first group of input pixels can retain a reset value (e.g., a logical zero) at the end of the processing for first convolution layer 1124. On the other hand, sparse data handling circuit 1180 can provide the second group of input pixels and the corresponding weights to the second group of arithmetic circuits (including arithmetic circuits 1050d-1050f) to generate intermediate output 1170, which can then be written to compute memory 1102. Sparse data handling circuit 1180 can also repeat the sparse data handling for other neural network layers based on detecting inactive groups of input data and excluding them from data processing circuit 1106, to prevent data processing circuit 1106 from performing computations and writing the intermediate outputs to compute memory 1102 for those inactive groups of input data.

In addition, data processing circuit 1106 can also include bypass mechanisms to reduce power consumption associated with processing of inactive/zero input data within a group of active input data forwarded by sparse data handling circuit 1180. Specifically, referring to FIG. 11E, arithmetic circuit 1150a can include a disable circuit 1190 and a multiplexor 1192. When one or more of the input data element (i) or the weight data element (w) is a zero, the product will be zero. To avoid arithmetic circuit 1150a wasting power in computing a zero, disable circuit 1190 can disable adder 1152 and multiplier 1154 (e.g., based on cutting off their power supply) upon detecting that one or more of the input data element (i) or the weight data element (w) is a zero. Moreover, as the product will be zero, multiplexor 1192 can be controlled to directly pass input partial sum (p_in) as output partial sum (p_out).

Figure 12:
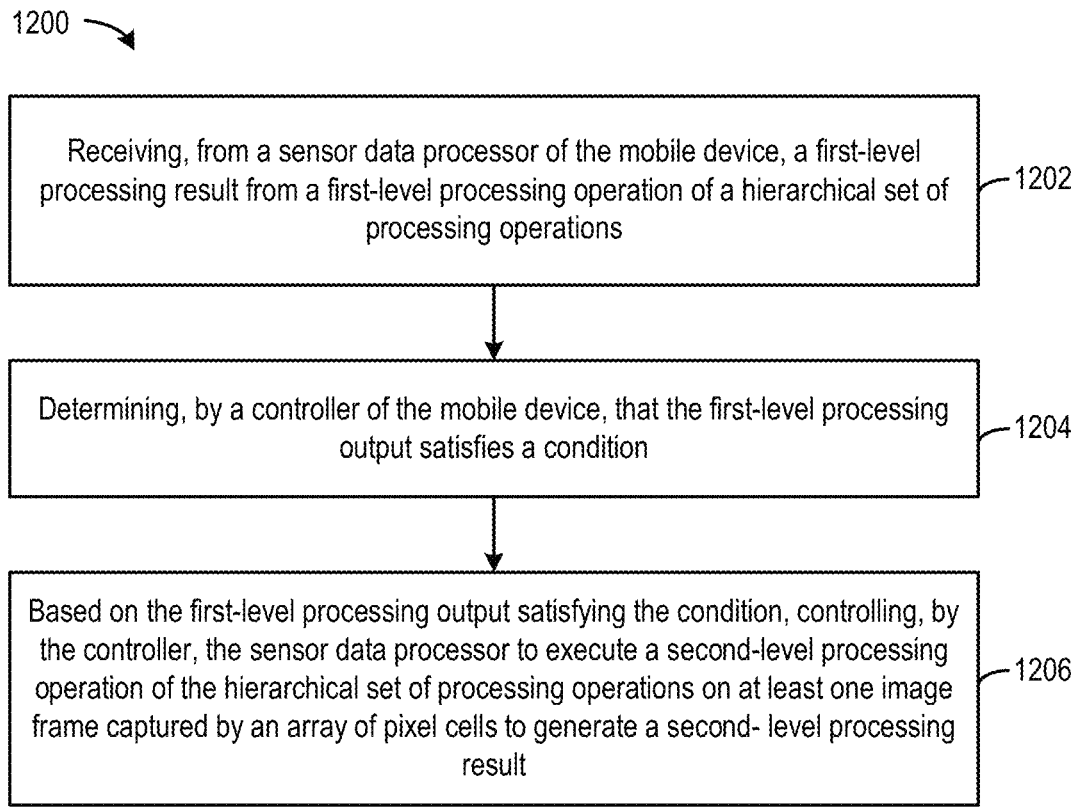
FIG. 12 illustrates a flowchart of an example process of operating an imaging system.

FIG. 12 illustrates an example method 1200 of operating an imaging system, such as imaging system 800. Method 1200 can be performed by, for example, controller 806 in conjunction with other components, such as sensor data processor 804 and pixel cells array 802. Imaging system 800 can be part of a mobile device, such as a head-mounted display (HMD) device.

In step 1202, the controller can receive, from the sensor data processor, a first-level processing output from a first-level processing operation of a hierarchical set of processing operations. As described above, the hierarchical set of operations may include, for example, a first-level processing operation to generate first-level processing outputs, a second-level processing operation to generate second-level processing outputs, etc. In the hierarchical set of processing operations, a higher level processing operation (e.g., second-level processing operation) can be gated or otherwise has a dependency on lower level processing outputs by a lower level processing operation (e.g., first-level processing operation). The first-level processing operation may also have a different computational complexity from the second-level processing operation. Different levels of processing operations may process different amounts/types of data, or otherwise require different amounts of computation/memory resources and/or different amounts of computation time to complete.

Referring to FIG. 7A, the first-level processing operations can include an image segmentation operation to segment an image into pixel segments belonging to objects of different classes, an image detection operation to distinguish different objects of the same class within a pixel segment, etc. The first-level processing operations can be performed on a full-pixel image frame, and the first-level processing outputs can indicate pixel locations of segments of pixels of a particular class of objects (e.g., a vehicle, a person, a body part, etc.). The second-level processing operations can include an object identification operation to identify a particular object among the different objects detected by the image detection operation, a tracking operation to track the movement of an identified object across image frames, a gesture identification operation (if the identified object is a hand), etc. The second-level processing operations can be performed on, for example, segments of pixels of a particular objects instead of the full-pixel image frame. In such examples, the first-level processing operations can process more data and can have a higher computational complexity than the second-level processing operations.

Referring to FIG. 7C, the first-level processing operations can include a context determination operation. For example, based on a pre-scanned map of an environment including the locations of various physical objects, as well as location/motion data of the user, a context determination operation can be performed to determine, for example, a location of the user within the environment, a positional relationship between the user and the physical objects, an interaction of the user with one of the physical objects in the environment, etc. As another example, the first-level processing operation can be performed on samples of a full-pixel image frame to determiner approximate locations of objects of interests. The second-level processing operations can include an image processing operation on an image frame based on the output of the context determination operation output. For example, first-level processing outputs can indicate a particular class of objects to be detected and tracked in the image frame given the location of the user in the environment, whiles the second-level processing operations performs the detection and tracking of a particular object of the class.

In step 1204, the controller can determine that the first-level processing output satisfies a condition. In a case where the first-level processing operation is performed on images captured by the array of pixel cells, the condition may include the images including objects of a particular class. In a case where the first-level processing operation is performed on an environment map and location/motion data, the condition may include the mobile device having a certain positional relationship with one or more physical objects in the environment.

In step 1206, based on the first-level processing output satisfying the condition, controlling, by the controller, the sensor data processor to execute a second-level processing operation of the hierarchical set of processing operations on at least one image frame captured by an array of pixel cells to generate a second-level processing result.

In some examples, if the controller determines, based on the first-level processing results, that a target object is in the first image frames, the controller can generate the second image sensing configuration to indicate pixel locations of regions of interests (ROI) including the pixels of the target object in the first image frames. Using the second image sensing configuration, the controller can select a subset of the array of pixel cells corresponding to the ROIs to perform the image sensing operation to generate the one or more second image frames as sparse images at a high frame rate, while the rest of the array of pixel cells are not selected to perform the image sensing operation. In some examples, the controller can also select the subset of pixel cells based on a sub-sampling operation to lower the spatial resolution of the image sensing operation, where the first and second image sensing configurations have different sampling rate and different spatial resolutions. The controller can then control the sensor data processor to perform the second-level processing operations on the active pixels of the second image frames to, for example, identify the target object, track a movement of the target object, determine a gesture/pose of the target object, etc. A context determination operation can also be performed based on the second-level processing operations to detect, for example, the occurrence of an event (e.g., an anomaly event) based on positional relationships among target objects.

As another example, the controller can control the array of pixel cells and the sensor data processor to perform the context determination operation as the first-level processing operation and an image processing operation as the second-level processing operation. For example, based on a pre-scanned map of an environment including the locations of various physical objects, as well as location/motion data of the user, the sensor data processor can perform a context determination operation to generate the first processing outputs including, for example, a location of the user within the environment, a positional relationship between the user and the physical objects, an interaction of the user with one of the physical objects in the environment, etc. The controller can then determine an image sensing configuration based on the first processing outputs. For example, if the first processing outputs indicate that a substantial change in the user's location has occurred, the controller can change the image sensing configuration to increase the spatial resolution and/or quantization resolution of the image sensing operations at the array of pixel cells, whereas if the user is static, the controller can reduce the spatial resolution and/or quantization of the image sensing operations. The controller can also provide information of objects of interests to be detected/tracked based on the first processing outputs. For example, if the first processing outputs indicate that the user is in a kitchen, the controller can configure the sensor data processor to detect/track objects related to kitchen, such as user's hands, utensils, etc.

Some portions of this description describe the examples of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, and/or hardware.

Steps, operations, or processes described may be performed or implemented with one or more hardware or software modules, alone or in combination with other devices. In some examples, a software module is implemented with a computer program product comprising a computer-readable medium containing computer program code, which can be executed by a computer processor for performing any or all of the steps, operations, or processes described.

Examples of the disclosure may also relate to an apparatus for performing the operations described. The apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples of the disclosure may also relate to a product that is produced by a computing process described herein. Such a product may comprise information resulting from a computing process, where the information is stored on a non-transitory, tangible computer readable storage medium and may include any example of a computer program product or other data combination described herein.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the examples is intended to be illustrative, but not limiting, of the scope of the disclosure, which is set forth in the following claims.

What is claimed is:

1. An apparatus being part of a mobile device, comprising:
- an array of pixel cells each configured to perform an image sensing operation, one or more attributes of the image sensing operation being configurable based on an image sensing configuration;
- a sensor data processor configured to execute a hierarchical set of processing operations; and
- a controller configured to:
  - receive, from the sensor data processor, a first-level processing output from a first-level processing operation of the hierarchical set of processing operations, wherein the first-level processing operation is performed on one or more first image frames captured by the array of pixel cells based on a first image sensing configuration; and
  - based on the first-level processing output satisfying a condition;
  - generate a second image sensing configuration;
  - control the array of pixel cells to capture one or more second image frames based on the second image sensing configuration, and
  - control the sensor data processor to execute a second-level processing operation on the one or more second image frames to generate a second-level processing output.

2. The apparatus of claim 1, wherein the first-level processing operation and the second-level processing operation has different computational complexities.

3. The apparatus of claim 2, wherein the sensor data processor is configured to execute the first-level processing operation at a lower speed than the second-level processing operation.

4. The apparatus of claim 2, wherein the sensor data processor is configured to execute the first-level processing operation at a higher speed than the second-level processing operation.

5. The apparatus of claim 1, wherein the first image sensing configuration selects a first subset of pixel cells of the array of pixel cells to perform the image sensing operation;
- wherein the second image sensing configuration selects a second subset of pixel cells of the array of pixel cells to perform the image sensing operation; and
- wherein the second subset is determined based on the first subset.

6. The apparatus of claim 1, wherein the first image sensing configuration configures each pixel cell of the array of pixel cells to perform the image sensing operation to generate pixel data of the one or more first image frames, and to generate the one or more first image frames at a first frame rate;
- wherein the second image sensing configuration configures a first subset of the array of pixel cells to perform the image sensing operation to generate pixel data of the one or more second image frames and to disable a second subset of the array of pixel cells, and to generate the one or more second image frames at a second frame rate; and
- wherein the first frame rate is lower than the second frame rate.

7. The apparatus of claim 6, wherein the first image sensing configuration further configures each pixel cell of the array of pixel cells to generate the pixel data of the one or more first image frames at a first quantization resolution;
- wherein the second image sensing configuration further configures the first subset of the array of pixel cells to generate the pixel data of the one or more second image frames at a second quantization resolution; and
- wherein the first quantization resolution is lower than the second quantization resolution.

8. The apparatus of claim 1, wherein the controller is configured to update the second image sensing configuration for capturing subsequent one or more second image frames based on the second-level processing output from the one or more second image frames.

9. The apparatus of claim 1, wherein the first-level processing output indicates first pixel locations of one or more objects belonging to a particular class;
- wherein the condition comprises the one or more first image frames including pixels of a target object; and
- wherein the controller is configured to, based on determining that the one or more first image frames include the pixels of the target object:
  - determine second pixel locations of the target object in the one or more first image frames; and
  - generate the second image sensing configuration to select a first subset of the array of pixel cells corresponding to the second pixel locations.

10. The apparatus of claim 9, wherein the second-level processing operation comprises identifying the target object in the one or more second image frames; and
- wherein the second-level processing output indicates a result of identifying the target object in the one or more second image frames.

11. The apparatus of claim 10, wherein the controller is configured to update the second image sensing configuration to select a different first subset of the array of pixel cells for capturing subsequent one or more second image frames based on the result of identifying the target object in the one or more second image frames, and based on a motion model of the target object.

12. The apparatus of claim 1, wherein the first-level processing output indicates first pixel locations of a body part;
- wherein the condition comprises the body part corresponding to a hand; and
- wherein the controller is configured to generate the second image sensing configuration to select a first subset of the array of pixel cells corresponding to the hand.

13. The apparatus of claim 12, wherein the second-level processing operation comprises identifying a gesture of the hand in the one or more second image frames; and
- wherein the second-level processing output indicates a result of identifying the gesture of the hand in the one or more second image frames.

14. The apparatus of claim 1, wherein the second-level processing output indicates a first image location of a first object and a second image location of a second object in the one or more second image frames; and
- wherein the sensor data processor is configured to perform a third-level processing operation of the hierarchical set of processing operations based on the first image location and the second image location to generate contextual information of a scene.

15. The apparatus of claim 14, wherein the context information includes at least one of: an interaction between the first object and the second object, or an anomaly event.

16. The apparatus of claim 1, wherein the first-level processing operation is performed on a map of an environment including locations of one or more physical objects and location data of the apparatus; and wherein the condition comprises the first-level processing output indicating a particular positional relationship between the apparatus and the one or more physical objects.

17. A method being performed at a mobile device, comprising:
receiving, from a sensor data processor of the mobile device, a first-level processing output from a first-level processing operation of a hierarchical set of processing operations, wherein the first-level processing operation is performed on one or more first image frames captured by an array of pixel cells based on a first image sensing configuration;
determining, by a controller of the mobile device, that the first-level processing output satisfies a condition; and
based on the first-level processing output satisfying the condition:
generating a second image sensing configuration;
controlling the array of pixel cells to capture one or more second image frames based on the second image sensing configuration, and
controlling, by the controller, the sensor data processor to execute a second-level processing operation of the hierarchical set of processing operations on the one or more second image frames to generate a second-level processing output.

18. The method of claim 17, wherein the first-level processing operation is performed on a map of an environment including locations of one or more physical objects and location data of the mobile device; and
wherein the condition comprises the first-level processing output indicating a particular positional relationship between the mobile device and the one or more physical objects.

* * * * *